United States Patent
Wang et al.

(10) Patent No.: US 12,509,704 B2
(45) Date of Patent: Dec. 30, 2025

(54) ONCOLYTIC VACCINIA VIRUS WITH MODIFIED B5R GENE FOR THE TREATMENT OF CANCER

(71) Applicant: Queen Mary University of London, London (GB)

(72) Inventors: Yaohe Wang, London (GB); Ming Yuan, London (GB)

(73) Assignee: Queen Mary University of London, London (GB)

( * ) Notice: Subject to any disclaimer, the term of this patent is extended or adjusted under 35 U.S.C. 154(b) by 949 days.

(21) Appl. No.: 17/284,169

(22) PCT Filed: Oct. 10, 2019

(86) PCT No.: PCT/GB2019/052877
§ 371 (c)(1),
(2) Date: Apr. 9, 2021

(87) PCT Pub. No.: WO2020/074902
PCT Pub. Date: Apr. 16, 2020

(65) Prior Publication Data
US 2021/0332384 A1    Oct. 28, 2021

(30) Foreign Application Priority Data
Oct. 10, 2018 (GB) ..................... 1816547

(51) Int. Cl.
| | |
|---|---|
| *A61K 39/285* | (2006.01) |
| *A61P 35/00* | (2006.01) |
| *C07K 14/54* | (2006.01) |
| *C07K 14/705* | (2006.01) |
| *C12N 7/00* | (2006.01) |
| *C12N 15/86* | (2006.01) |

(52) U.S. Cl.
CPC .............. *C12N 15/86* (2013.01); *A61P 35/00* (2018.01); *C07K 14/5434* (2013.01); *C07K 14/70521* (2013.01); *C07K 14/70532* (2013.01); *C12N 7/00* (2013.01); *C12N 2710/24143* (2013.01)

(58) Field of Classification Search
CPC .......... C12N 15/86; C12N 7/00; A61P 35/00; C07K 14/5434; C07K 14/70521; C07K 14/70532
See application file for complete search history.

(56) References Cited

U.S. PATENT DOCUMENTS

| | | | |
|---|---|---|---|
| 5,364,773 | A | 11/1994 | Paoletti et al. |
| 5,547,862 | A | 8/1996 | Meador et al. |
| 6,475,996 | B1 | 11/2002 | Cazaux et al. |
| 6,489,252 | B2 | 12/2002 | Goo et al. |
| 8,323,663 | B2 | 12/2012 | Brough et al. |
| 8,580,276 | B2 | 11/2013 | Diamond et al. |
| 9,284,588 | B2 | 3/2016 | Merino et al. |
| 2005/0048099 | A1 | 3/2005 | Shiah et al. |
| 2005/0063947 | A1 | 3/2005 | Hwu et al. |
| 2005/0197313 | A1 | 9/2005 | Roelvink et al. |
| 2008/0131484 | A1 | 6/2008 | Robinson et al. |
| 2009/0098529 | A1 | 4/2009 | Chen et al. |
| 2009/0148527 | A1 | 6/2009 | Robinson et al. |
| 2009/0196905 | A1 | 8/2009 | Spada et al. |
| 2011/0238075 | A1 | 9/2011 | Clauson et al. |
| 2013/0216623 | A1 | 8/2013 | Yamamoto et al. |
| 2013/0289467 | A1 | 10/2013 | Haffner et al. |
| 2017/0340687 | A1* | 11/2017 | Kawase ................. C12N 7/00 |
| 2018/0208904 | A1* | 7/2018 | Nakamura ............. C12N 15/09 |

FOREIGN PATENT DOCUMENTS

| | | |
|---|---|---|
| CN | 101658670 | 3/2010 |
| EP | 2007353 | 12/2008 |
| EP | 2485711 | 8/2012 |
| EP | 2981248 | 2/2016 |
| JP | 2008-509727 A | 4/2008 |
| JP | 2009-531298 A | 9/2009 |
| JP | 2012116863 A | 6/2012 |
| JP | 2012513208 | 6/2012 |
| JP | 2012-527318 A | 11/2012 |
| JP | 2013-511527 A | 4/2013 |
| JP | 2013-543418 A | 12/2013 |

(Continued)

OTHER PUBLICATIONS

Non-Final Office Action dated Jul. 21, 2022 in related U.S. Appl. No. 15/301,304.

(Continued)

*Primary Examiner* — Evelyn Y Pyla
*Assistant Examiner* — Katherine R Small
(74) *Attorney, Agent, or Firm* — Armstrong Teasdale LLP

(57) ABSTRACT

The present invention relates to a vaccinia virus vector comprising a nucleic acid sequence encoding a SCR1-, SCR2-, SCR3-, and SCR4- domain deleted B5R gene (B5R SCR1$^-$ SCR2$^-$ SCR3$^-$ SCR4$^-$) inserted into the TK gene of the vaccinia virus. The invention also relates to compositions comprising the vaccinia virus vector, methods of treatment using the compositions, medical uses of the compositions and kits comprising the vaccinia virus vector. The invention also relates to a nucleic acid sequence encoding a SCR1-, SCR2-, SCR3-, and SCR4- domain deleted B5R gene (B5R SCR1$^-$ SCR2$^-$ SCR3$^-$ SCR4$^-$) of vaccinia virus.

13 Claims, 24 Drawing Sheets
Specification includes a Sequence Listing.

(56) References Cited

FOREIGN PATENT DOCUMENTS

| WO | 1999043835 | 9/1999 | | |
|---|---|---|---|---|
| WO | 2007030668 | 3/2007 | | |
| WO | WO-2010031837 A1 * | 3/2010 | ............ | C12N 15/86 |
| WO | 2011125469 | 7/2013 | | |
| WO | 2014063601 | 5/2014 | | |
| WO | 2018049261 | 3/2018 | | |

OTHER PUBLICATIONS

Mathew et al., "The extracellular domain of vaccinia virus protein B5Raffects plague phenotype, extracellular enveloped virus release, and intracellular actin tail formation", Journal of Virology, 1998, 72(3), pp. 2429-2438.
Nakatake et al., "Partial Deletion of Glycoprotein B5R Enhances Vaccinia Virus Neutralization Escape while Preserving Oncolytic Function", Molecular Therapy, 2019, 14, pp. 159-171.
Qin et al., "Genomic Analysis of the Vaccinia Virus Strain Variants Found in Dryvax Vaccine", Journal of Virology, 2011, 85(24), pp. 13049-13060.
Sanderson et al., "Roles of vaccinia virus EEV-specific proteins in intracellular actin tail formation and low pH-induced cell-cell fusion", Journal of General Virology, 1998, 79(6), pp. 1415-1425.
Final Office Action dated Nov. 30, 2021 in related U.S. Appl. No. 15/301,304 (2028)).
Li et al. "High-Yield Fabrication of PLGA Non-Spherical Microarchitectures by Emulsion-Solvent Evaporation Method", Macromol Rapid Commun, 2010, 31, pp. 1981-1986.
Hoeh et al., "Early postoperative safety and surgical outcomes after implantation of a suprachoroidal micro-stent for the treatment of open-angle glaucoma concomitant with cataract surgery", J Cataract Refract Surg, 2013, 39, pp. 431-437.
Lazzeri et al., "Biodegradable hollow microfibres to produce bioactive scaffolds", Polym Int, 2005, 54, pp. 101-107.
Mack et al., "A biodegradable filament for controlled drug delivery", Journal of Controlled Release, 2009, 139, pp. 205-211.
Herrero-Vanrell et al., "The potential of using biodegradable microspheres in retinal diseases and other intraocular pathologies", Progress in Retinal and Eye Research, 42, 2014, pp. 27-43.
Kompella et al., "Nanomedicines for back of the eye drug delivery, gene delivery, and imaging", Progress in Retinal and Eye Research, 2013, 36, pp. 172-198.
Kotwal et al., "Mapping and insertional mutagenesis of a vaccinia virus gene encoding a 13,800-Da secreted protein", Virology, 1989, 171, pp. 579-587.
Ahmed et al., "A novel tumour selective oncolytic vaccinia virus lacking the N1L gene enhances the anti-tumour immune response when used as an anticancer therapeutic", Mol Therap, 2014, 22(Suppl 1), pp. S248-S249.
Bartlett et al., "The vaccinia virus N1L protein is an intracellular homodimer that promotes virulence", Journal of General Virology, 2002, 83, pp. 1965-1976.
Billings et al., "Lack of N1L gene expression results in a significant decrease of vaccinia virus replication in mouse brain", Annals NY Academy Sci, 2004, 1030, pp. 297-302.
Dimier et al., "Deletion of major nonessential genomic regions in the vaccinia virus lister strain enhances attenuation without altering vaccine efficacy in mice", Journal of Virology, 2011, 85(10), pp. 5016-5026.
Du et al., "Construction and evaluation of a new triple-gene expression cassette vaccinia virus shuttle vector", Journal of Virological Methods, 2012, 185, pp. 175-183.
Hiley et al., "Lister strain vaccinia virus, a potential therapeutic vector targeting hypoxic tumours", Gene Therapy, 2010, 17, pp. 281-287.
Postigo et al., "The vaccinia virus-encoded Bcl-2 homologues do not act as direct as difrect Bax inhibitors", Journal of Virology, 2012, 86(1), pp. 203-213.
Non-Final Office Action dated Sep. 20, 2024 in related U.S. Appl. No. 18/156,184.
Chakrabarti et al., "Compact, Synthetic, Vaccinia Virus Early/Late Promoter for Protein Expression", Bio Techniques, 1997, 23, pp. 1094-1097.
Final Office Action dated Mar. 19, 2025 in related U.S. Appl. No. 18/156,184.
Advisory Action dated May 30, 2025 in related U.S. Appl. No. 18/156,184.

* cited by examiner

VVL15-TK-RFP  VVL15-TK-STC

MKTISVVTLLCVLPAVVYST atgaaaacgatttccgttgttacgttgttatgcgtactacctgctgttgtttattca

Fig. 28(b) SCR1(aa 20-72):

TCTVPTMNNAKLTSTETSFNDKQKVTFTCDQGYHSSDPNAVCETD
KWKYENP acaactgtaccactatgaataacgctaaattaacgtctaccgaaacatcgtttaatgataaacagaaagttacattacatgtgatcagggatatcattc
ttcggatccaaatgctgtctgcgaaacagataaatggaaatacgaaaatcca

Fig. 28(c) STALK(aa 237-275)

CVRTNEKFDPVDDGPDDETDLSKLSKDVVQYEQEIESLE tgtgtacgaactaacgaaaatttgatccagtggatgatggtcccgacgatgagacagatttgagcaaactctcgaaagacgttgtacaatatgaaca
agaaatagaatcgttagaa

Fig. 28(d) TM(aa 276-303)

A T Y H I I I V A L T I M G V I F L I gcaacttatcatatcatagtggcgttgacaattatgggcgtcatattttaatc

Fig. 28(e) CT(aa 304-317)

S V I V L V C S C D K N N D Q Y K F H K L L P tccgttatagttgtttcctgtgacaaaaataatgaccaatataagttccataaattgctaccgtga

Fig. 28(f) H5 aaaaattgaaaataaatacaaaggttcttgagggttgtgttaaattgaaagcgagaataatcataaata

Fig. 28(h)

SP(aa 1-19)-SCR1(aa 20-72)-STALK(aa 237-275)-TM(aa 276-303)-CT(aa 304-317)

MKTISVVTLLCVLPAVVYSTTCTVPTMNNAKLTSTETSFN

Fig 29(b) RFP aa 1-225

MASSENVITEFMRFKVRMEGTVNGHEFEIEGEGEGRPYEGHNTVK
LKVTKGGPLPFAWDILSPQFQYGSKVYVKHPADIPDYKKLSFPEGF
KWERVMNFEDGGVATVTQDSSLQDGCFIYKVKFIGVNFPSDGPVM
QKKTMGWEASTERLYPRDGVLKGETHKALKLKDGGHYLVEFKSI
YMAKKPVQLPGYYYVDAKLDITSHNEDYTIVEQYERTEGRHHLFL atggcctcctccgagaacgtcatcaccgagttcatgcgcttcaaggtgcgcatggagggcaccgtgaacggccacgagttcgagatcgagggcg
agggcgagggccgcccctacgagggccacaacaccgtgaagctgaaggtgaccaagggcggccccctgccctttgcctgggacatcctgtccc
ccagttccagttcagtacggctccaaggtgtacgtgaagcaccccgccgacatcccgactacaagaagctgtccttccccgagggcttcaagtgggag
cgcgtgatgaacttcgaggacggcggcgtggccacagtgacccagagccagccagttgcaggactcctccctgcaggacggctgcttcatctacaaggtgaagttcatcgg
cgtgaacttccccctccgacggccccgtgatgcagaagaagaccatgggctggagccctccaccgagcgcctgtaccccgcgacggcgtgct
gaagggcgagacccacaaggccctgaagctgaaggacggcggccactacctggtggagttcaagtccatctacatggccaagaagccgtgca
gctgccggctactacgtggacgccaagctggacatcaccccacaacgaggactacaccaacatcgtggagcagtacgagcgcaccgagggc
cgccaccctgttcctgtag

Fig. 29(c) H5:

aaaaattgaaaataatacaaagttcttgaggggtgtgtaaattgaaagcgagaaataatcataaata

Fig. 29(d) SP(aa 1-19):

MKTISVVTLLCVLPAVVYST atgaaaacgattccgttgttacgttgttatgcgtactacctgctgttgttattca

Fig. 29(e) STALK(aa 237-275)

CVRTNEKFDPVDDGPDDETDLSKLSKDVVQYEQEIESLE tgtgtacgaactaacgaaaaatttgatccagtggatgatggtcccgacgatgagacagatttgagcaaactctgaaagacgttgtacaatatgaaca
agaaatagaatcgttagaa Fig. 29(f) TM(aa 276-303)

ATYHIIIVALTIMGVIFLI gcaacttatcatataatagtggcgttgacaattatgggcgtcatatttaatc

Fig. 29(g) CT(aa 304-317)

SVIVLVCSCDKNNDQYKFHKLLP tccgttatagtattagttgttcctgtgacaaaaataatgaccaatataagttccataaattgctaccgtga

Fig. 30

Fig. 30(a) Loxp acttcgtatagcatacattatacgaagttat

Fig. 30(b) H5:

aaaaattgaaaataatacaaaggttcttgagggttgtgttaaattgaaagcgagaaataatcataaata

Fig. 30(c) RFP aa 1-225:

MASSENVITEFMRFKVRMEGTVNGHEFEIEGEGEGRPYEGHNTVK
LKVTKGGPLPFAWDILSPQFQYGSKVYVKHPADIPDYKKLSFPEGF
KWERVMNFEDGGVATVTQDSSLQDGCFIYKVKFIGVNFPSDGPVM
QKKTMGWEASTERLYPRDGVLKGETHKALKLKDGGHYLVEFKSI
YMAKKPVQLPGYYYVDAKLDITSHNEDYTIVEQYERTEGRHHLFL atggcctctcgagaacgtcatcaccgagttcatgcgcttcaaggtgcgcatggaggtgcacgagttcgagatcgagggcg
agggcgagggccgcccatacgagggccacaacaccgtgaagctgaagttgaccaaggtgaccccctgcccttgcctgtccc
cccagttcagtacggctccaaggtgtacgtgaagttcaagcccgacatcccgacatacaagaagctgtccttcccgagggcttcaagtgggag
cgcgtgatgaacttcgaggacggcggcgtggccgtgaccgtgacccaggacctccctgcaggacggcgccgacagttcatcgg
cgtgaacttccctccgacggcccgtgatgcagaagaagaccatgggctgggaggccagcaccgagggcctctaccacgagcctgtaccccgcgacggcgtgct
gaagggcgagacccacaaggccctgaagctgaaggacggcggccactaccttggagttcaagttcatctacatggccaagaagccgtgca
gctgcccggctactactgtggacgccaagctggacatcatcccaacgagcttggactacaccaccatcgtgagcagtacgagcgccaccgaggc
cgccacctgtttctgtag

Fig. 30(d) Loxp:

acttcgtatagcatacattatacgaagttat

Fig. 30(e) H5:

aaaaattgaaaataatacaaaggttcttgagggttgtgttaaattgaaagcgagaaataatcataaata

Fig. 30(f) SP(aa 1-19):

M K T I S V V T L L C V L P A V V Y S T atgaaaacgatttccgttgttacgttgttatgcgtactacctgctgttgtttattca

Fig. 30(g) STALK(aa 237-275):

C V R T N E K F D P V D D G P D D E T D L S K L S K D V V Q Y E Q E I E S L E tgtgtacgaactaacgaaaaatttgatccagtggatgatggtcccgacgatgagacagatttgagcaaactctcgaaagacgttgtacaatatgaaca
agaaatagaatcgttagaa

Fig. 30(h) TM(aa 276-303):

A T Y H I I I V A L T I M G V I F L I gcaacttatcatatatcatagtggcgttgacaattatgggcgtcatattttaatc

Fig. 30(i) CT(aa 304-317):

S V I V L V C S C D K N N D Q Y K F H K L L P tccgttatagtattagtttgttcctgacaaaaataagttccataaattgctaccgtga

Fig.31

(a) STC nucleic acid tgtgtacgaactaacgaaaaatttgatccagtggatgatggtcccgacgatgagacagatttgagcaaactctcgaaagacgttgtacaatatgaaca
agaaatagaatcgttagaagcaacttatcatatcatatcatagtggcgttgacaattatgggcgtcatatttttaatctccgttatagtattagtttgttcctgtg
acaaaaataatgaccataaagttccataaattgctaccgtga (b) STC protein sequence C V R T N E K F D P V D D G P D D E T D L S K L S K D V V Q Y E Q E I E S L E A T Y H I I I V
A L T I M G V I F L I S V I V L V C S C D K N N D Q Y K F H K L L P

ONCOLYTIC VACCINIA VIRUS WITH MODIFIED B5R GENE FOR THE TREATMENT OF CANCER

REFERENCE TO AN ELECTRONIC SEQUENCE LISTING

The contents of the electronic sequence listing (Sequence Listing_88326-2080.txt; Size: 28, 171 bytes; and Date of Creation: Jul. 18, 2024) are herein incorporated by reference in their entirety.

The present disclosure relates to modified oncolytic viruses for use in the treatment of cancer.

Despite advances in new therapeutics, the survival rates for patients with many solid tumour types remain as one of the biggest challenges. More effective therapeutics are in much need. Oncolytic viruses are attractive therapeutics for treatment of cancers that are resistant to conventional therapies (Wong et al., Viruses 2, 78-106 (2010)).

Oncolytic viruses are viruses that can specifically target and kill cancer cells. Additionally, oncolytic viruses provide the danger signals essential for induction and amplification of the host's anti-tumour immune response.

Vaccinia virus (VV) is a virus with double stranded DNA bearing many features that make it an attractive candidate for oncolytic therapy (Al Yaghchi C. et al., Immunotherapy 7 (12): 1249-58 (2015)). It can replicate rapidly in the cells, spread efficiently within tumours and is able to lyse infected cells. Additionally, VV has been studied extensively and has a well-defined molecular biology with a large cloning capacity and a variety of natural and synthetic promoters making it ideal as a vector for carrying heterologous nucleic acid sequences. W has well established safety profile subsequent to its use for the eradication of small pox, and as such, treatments for uncontrolled infections are readily available. Furthermore, the hypoxic microenvironment commonly found in solid tumours is detrimental to the replication and efficacy of many types of oncolytic viruses, but VV replicates effectively in this environment (Hiley et al., Gene Therapy 17, 281-287 (2010)). Early clinical results using either vaccine strains or genetically modified strains have demonstrated antitumor effects (Haddad et al., Annals of Surgical Oncology 19 Suppl 3, S665-674 (2012); Park et al., Lancet Oncol 9:533-542, 2008; Breitbach et al., Nature 477:99-102, 2011)).

Various deletion mutants of vaccinia virus have been reported. Western Reserve strain mutants with the deletion of the thymidine kinase (TK) gene and the viral growth factor (VGF) gene are capable of efficiently priming the immune system against tumour antigens (McCart et al., Cancer Res 61, 8751-8757 (2001)). In addition, arming the virus with heterologous genes for example cytokine encoding genes can further activate the anti-tumour immune response.

Release of VV from infected cells via cell lysis enables the virus to infect more cells locally and distantly via circulating blood. There are two major forms of infectious VV, intracellular mature virus (IMV) and extracellular enveloped virus (EEV) (Appleyard et al., J. Gen. Virology 13, 9-17 (1971)), IMV is the first infectious form of virus and represents the majority of infectious progeny. EEV is coated with host cellular proteins and is relatively quiet antigenically, with the ability to antagonise innate (complement) and adaptive (neutralising antibodies) systemic host defences that permits widespread and long-distance dissemination within the host (Smith, G. L. & Vanderplasschen, A. & Law, M., J. Gen. Virol. 83, 2915-2931 (2002); Payne, L. G. & Kristensson, K, J. Gen. Virol. 66 (3), 643-646 (1985)). However, EEV is produced only in low numbers by most strains of VV (<1% of all infectious progeny).

Six genes are known to encode EEV-specific proteins. These are A56R, F13L, B5R, A34R, A36R and A33R. B5R, encodes a 42-kDa glycoprotein which contains four copies of a 50- to 70-amino-acid repeat called 'short consensus repeat' (SCR). Deletion of B5R leads to a small plaque size and a huge decrease (≤10-fold) in EEV formation (Blasco, R. & Moss, B., J. Virol. 65, 5910-5920 (1991); Engelstad, M. & Smith, G. L., Virology 194, 627-637 (1993)). Sequences within the transmembrane and cytoplasmic tail of B5R are important for targeting the protein to the wrapping membrane (Katz et al., J. Virol. 71, 3178-3187 (1997)). Mutant VV with deletion of SCR4, SCR3, 4 or SCR 2, 3, 4 generate small plaques, but produce approximately 50-fold more infectious EEV than wild-type virus and formed comet-shaped plaques (Sanderson et al., J. Gen. Virol. 79 (6), 1415-1425 (1998); Mathew et al., J. Virol. 72, 2429-2438 (1998)).

Despite the progress that has been made in the field of oncolytic viruses, no therapeutic product based on vaccinia has yet reached the market. There is therefore an unmet need for more effective forms of oncolytic vaccinia virus for use in the treatment of cancer.

According to a first aspect of the invention there is provided a vaccinia virus vector comprising a nucleic acid sequence encoding a SCR1–, SCR2–, SCR3–, and SCR4– domain deleted B5R gene (B5R SCR1$^-$ SCR2$^-$ SCR3$^-$ SCR4$^-$) inserted into the TK gene of the vaccinia virus.

The nucleic acid sequence may be natural, synthetic or recombinant. It may, for example, be cDNA, PCR product or a genomic sequence. It may be isolated, or as part of a plasmid, vector or host cell. A plasmid is a circular extra-chromosomal DNA molecule with the ability to replicate independently of chromosomal DNA.

The term "nucleic acid," in its broadest sense, refers to any compound and/or substance that is or can be incorporated into an oligonucleotide chain. In some embodiments, a nucleic acid is a compound and/or substance that is or can be incorporated into an oligonucleotide chain via a phosphodiester linkage. In some embodiments, "nucleic acid" refers to individual nucleic acid residues (e.g., nucleotides and/or nucleosides). In some embodiments, "nucleic acid" refers to an oligonucleotide chain comprising individual nucleic acid residues. As used herein, the terms "oligonucleotide" and "polynucleotide" can be used interchangeably. In some embodiments, "nucleic acid" encompasses RNA as well as single and/or double-stranded DNA and/or cDNA.

Furthermore, the terms "nucleic acid," "DNA," "RNA," and/or similar terms include nucleic acid analogs, i.e., analogs having other than a phosphodiester backbone. For example, the so-called "peptide nucleic acids," which are known in the art and have peptide bonds instead of phosphodiester bonds in the backbone, are considered within the scope of the present invention. The term "nucleotide sequence encoding an amino acid sequence" includes all nucleotide sequences that are degenerate versions of each other and/or encode the same amino acid sequence. Nucleotide sequences that encode proteins and/or RNA may include introns. Nucleic acids can be purified from natural sources, produced using recombinant expression systems and optionally purified, chemically synthesized, etc. Where appropriate, e.g., in the case of chemically synthesized molecules, nucleic acids can comprise nucleoside analogs such as analogs having chemically modified bases or sugars, backbone modifications, etc. A nucleic acid sequence is presented in the 5' to 3' direction unless otherwise indicated. The term "nucleic acid segment" is used herein to refer to a nucleic acid sequence that is a portion of a longer nucleic acid sequence. In many embodiments, a nucleic acid segment comprises at least 3, 4, 5, 6, 7, 8, 9, 10, or more residues. In some embodiments, a nucleic acid is or comprises natural nucleosides (e.g., adenosine, thymidine, guanosine, cytidine, uridine, deoxyadenosine, deoxythymidine, deoxyguanosine, and deoxycytidine); nucleoside analogs (e.g., 2-aminoadenosine, 2-thiothymidine, inosine, pyrrolo-pyrimidine, 3-methyl adenosine, 5-methylcytidine, C-5 propynyl-cytidine, C-5 propynyl-uridine, 2-aminoadenosine, C5-bromouridine, C5-fluorouridine, C5-iodouridine, C5-propynyl-uridine, C5-propynyl-cytidine, C5-methylcytidine, 2-aminoadenosine, 7-deazaadenosine, 7-deazaguanosine, 8-oxoadenosine, 8-oxoguanosine, O (6)-methylguanine, and 2-thiocytidine); chemically modified bases; biologically modified bases (e.g., methylated bases); intercalated bases; modified sugars (e.g., 2'-fluororibose, ribose, 2'-deoxyribose, arabinose, and hexose); and/or modified phosphate groups (e.g., phosphorothioates and 5'-N-phosphoramidite linkages). In some embodiments, the present invention is specifically directed to "unmodified nucleic acids," meaning nucleic acids (e.g., polynucleotides and residues, including nucleotides and/or nucleosides) that have not been chemically modified in order to facilitate or achieve delivery.

The B5R gene of vaccinia virus has an open reading frame (ORF) which encodes a membrane protein that is essential for EEV formation. Deletion of the B5R ORF results in a dramatic reduction of EEV, and as a consequence, the virus produces small plaques in vitro and is highly attenuated in vivo. The extracellular portion of B5R is composed mainly of four domains that are similar to the short consensus repeats (SCRs) present in complement regulatory proteins. The partial B5R gene of the invention suitably comprises nucleic acid regions encoding the signal peptide (SP), the stalk region (STALK), the transmembrane region (TM) and the cytoplasmic tail (CT) of the native B5R protein of vaccinia virus.

The partial B5R gene may be present in the form of an expression cassette with an upstream promoter to drive expression. The nucleic acid sequence of the first aspect may therefore be part of an expression cassette. An expression cassette may be part of a vector. It comprises a promoter, an open reading frame and a 3' untranslated region. A promoter is a region of DNA with a specific sequence that initiates the transcription of a particular gene or genes. Promoters used for the expression of heterologous genes in vaccinia include promoters controlling early and late transcriptional activity, for example mH5, H5, P7.5 and PE/L. A heterologous gene, as used herein, is a gene that is not normally found in the virus. The modified H5 promoter, mH5, has a predominantly early activity and shows greater stability than the naturally occurring H5.

Suitably, the promoter may be an H5 promoter or p7.5 Early/late synthetic or pH5R promoter. The expression cassette may further comprise a reporter protein, such Red Fluorescent Protein (RFP). A second promoter may be provided upstream of the reporter protein and used to drive expression of the reporter protein, such as an H5 promoter or p7.5 Early/late synthetic or pH5R promoter.

In an embodiment of the first aspect, the nucleic acid sequence may be present in a vector. A vector as used herein refers to a construct for introducing a nucleic acid sequence into a cell or a virus for expression or replication. It refers to a recombinant construct for example a plasmid, a virus or any other construct capable of expression or replication of the nucleic acid sequence upon introduction into a cell or virus.

A plasmid may therefore be used to introduce an expression cassette into a host cell. Plasmids may also be used to express a polypeptide in a host cell. For example, a host cell may be transfected with a plasmid capable of encoding a particular polypeptide, in order to express that polypeptide.

The expression cassette may be inserted into the Thymidine Kinase (TK) gene of a vaccinia virus. Any convenient site-specific recombination or gene insertion technology may be used. Suitably, the insertion is made using homologous recombination. Any suitable homologous recombination system may be used, such as for example Cre-Lox, or Flp/FRT systems. For example, the integration sites may be added to the expression cassette around a nucleic acid sequence encoding a reporter protein and upstream of the promoter region driving expression of the partial B5R gene.

In a preferred embodiment of the invention the vaccinia virus vector comprises a nucleotide sequence that is substantially homologous to the sequence set forth in any one of FIG. 31. Nucleic acid sequences with greater than 20% identity (for example 25%, 30%, 40%, 50%, 60%, 70%, 80%, 90%, 95% or 99%) are considered to be homologous sequences. As used herein, substantially homologous refers to sequences exhibiting at least 60% or 70%, preferably means at least 80%, more preferably at least 90%, and most preferably at least 95%, 96%, 97%, 98%, 99% or greater identity. In an embodiment of the invention the sequence has at least 80% or more (e.g., 85%, 90%, 95%, 96%, 97%, 98%, 99%, 99.5%, etc.) homology with the sequence set forth in any one of FIG. 31.

As used herein, the terms homology and identity are interchangeable.

Sequence comparisons to determine homology can be carried out using readily available sequence comparison software. Examples include but are not limited to BLAST (see Ausubel et al., 1999 Short Protocols in Molecular Biology, 4th Ed-Chapter 18) and FASTA (Altschul et al., 1990 J. Mol. Biol. 403-410). Both BLAST and FASTA are available for offline and online searching (see Ausubel et al., 1999, Short Protocols in Molecular Biology, pages 7-58 to 7-60).

In one embodiment of the invention the vaccinia virus vector comprises a nucleotide sequence that has at least 80% or more (e.g., 85%, 90%, 95%, 96%, 97%, 98%, 99%, 99.5%, etc.) homology with the sequence set forth in any one of FIG. 31.

As used herein, the term "identity" refers to the overall relatedness between polymeric molecules, e.g., between nucleic acid molecules (e.g., DNA molecules and/or RNA molecules) and/or between polypeptide molecules. Calculation of the percent identity of two nucleic acid sequences, for example, can be performed by aligning the two sequences for optimal comparison purposes (e.g., gaps can be introduced in one or both of a first and a second nucleic acid sequences for optimal alignment and non-identical sequences can be disregarded for comparison purposes).

In certain embodiments, the length of a sequence aligned for comparison purposes is at least 30%, at least 40%, at least 50%, at least 60%, at least 70%, at least 80%, at least 90%, at least 95%, or substantially 100% of the length of the reference sequence. The nucleotides at corresponding nucleotide positions are then compared. When a position in the first sequence is occupied by the same nucleotide as the corresponding position in the second sequence, then the molecules are identical at that position. The percent identity between the two sequences is a function of the number of identical positions shared by the sequences, taking into account the number of gaps, and the length of each gap, which needs to be introduced for optimal alignment of the two sequences. The comparison of sequences and determination of percent identity between two sequences can be accomplished using a mathematical algorithm. For example, the percent identity between two nucleotide sequences can be determined using the algorithm of Meyers and Miller (CABIOS, 1989, 4:11-17), which has been incorporated into the ALIGN program (version 2.0) using a PAM 120 weight residue table, a gap length penalty of 12 and a gap penalty of 4. The percent identity between two nucleotide sequences can, alternatively, be determined using the GAP program in the GCG software package using an NWSgapdna. CMP matrix.

In one embodiment of the invention the vaccinia virus vector comprises a nucleotide sequence that has at least 80% or more (e.g., 85%, 90%, 95%, 96%, 97%, 98%, 99%, 99.5%, etc.) identity with the sequence set forth in any one of FIG. 31.

As used herein, the term "isolated" refers to a substance and/or entity that has been (1) separated from at least some of the components with which it was associated when initially produced (whether in nature and/or in an experimental setting), and/or (2) produced, prepared, and/or manufactured by the hand of man. Isolated substances and/or entities may be separated from about 10%, about 20%, about 30%, about 40%, about 50%, about 60%, about 70%, about 80%, about 90%, about 91%, about 92%, about 93%, about 94%, about 95%, about 96%, about 97%, about 98%, about 99%, or more than about 99% of the other components with which they were initially associated. In some embodiments, isolated agents are about 80%, about 85%, about 90%, about 91%, about 92%, about 93%, about 94%, about 95%, about 96%, about 97%, about 98%, about 99%, or more than about 99% pure. As used herein, a substance is "pure" if it is substantially free of other components. As used herein, calculation of percent purity of isolated substances and/or entities should not include excipients (e.g., buffer, solvent, water, etc.).

As used herein, a "polypeptide", generally speaking, is a string of at least two amino acids attached to one another by a peptide bond. In some embodiments, a polypeptide may include at least 3-5 amino acids, each of which is attached to others by way of at least one peptide bond. Those of ordinary skill in the art will appreciate that polypeptides sometimes include "non-natural" amino acids or other entities that nonetheless are capable of integrating into a polypeptide chain, optionally.

As used herein, the term "protein" refers to a polypeptide (i.e., a string of at least two amino acids linked to one another by peptide bonds). Proteins may include moieties other than amino acids (e.g., may be glycoproteins, proteoglycans, etc.) and/or may be otherwise processed or modified. Those of ordinary skill in the art will appreciate that a "protein" can be a complete polypeptide chain as produced by a cell (with or without a signal sequence), or it can be a characteristic portion thereof. Those of ordinary skill will appreciate that a protein can sometimes include more than one polypeptide chain, for example linked by one or more disulfide bonds or associated by other means. Polypeptides may contain l-amino acids, d-amino acids, or both and may contain any of a variety of amino acid modifications or analogs known in the art. Useful modifications include, e.g., terminal acetylation, amidation, methylation, etc. In some embodiments, proteins may comprise natural amino acids, non-natural amino acids, synthetic amino acids, and combinations thereof. The term "peptide" is generally used to refer to a polypeptide having a length of less than about 100 amino acids, less than about 50 amino acids, less than 20 amino acids, or less than 10 amino acids. In some embodiments, proteins are antibodies, antibody fragments, biologically active portions thereof, and/or characteristic portions thereof.

There are multiple strains of vaccinia with varying levels of virulence for humans and animals. A number of strains of the virus were used around the world as part of the smallpox eradication programme in the 1950s. Different strains were used in different areas of the world, for example, the New York City Board of Health (NYCBOH) strain and its derivative, Wyeth, were popular in the United States, whereas Copenhagen (CPN) and Lister strains were predominant in Europe. In a preferred embodiment the vaccinia strain is the Lister strain.

The vaccinia virus vector is a thymidine-kinase deficient (TK-deficient) vaccinia virus. A TK-deficient vaccinia virus as used herein refers to a vaccinia virus that shows a phenotype consistent with a lack of endogenous thymidine kinase (TK). A TK-deficient vaccinia virus is dependent on thymidine kinase produced by the host cell. Thymidine kinase is constitutively produced in tumour cells but not in normal cells. A TK-deficient vaccinia virus can therefore survive selectively in tumour cells, especially with activation of EGFR/Ras/ERK pathways.

In order to target the TK gene (L090) of vaccinia virus for homologous recombination, the expression cassette used to create the vector of the invention may be provided with additional sequences complementary to the TK gene and/or the gene adjacent to the TK gene. For example, the additional sequences may be provided on the upstream and downstream ends of the expression cassette respectively. In other words, a TK left arm (L-arm) may be provided to target the left side (L089) of the TK gene and a TK right arm (R-arm) to target the right side (L091) of the TK gene. The actual expression cassette comprising the partial B5R gene and gene insertion elements may then be located between TK L-arm and TK-R arm ready for insertion into the TK region of the vaccinia virus. The expression cassette may be suitably inserted into a shuttle vector prior to transformation of the vaccinia virus vector.

The expression cassette may therefore be composed of the following nucleic acid sequence elements:

INT-PRO-REP-INT-PRO—SP-STC where INT is a gene insertion element, PRO is an optional promoter, REP is an optional nucleic acid sequence encoding a reporter protein, SP is a nucleic acid sequence encoding a signal peptide and STC is a nucleic acid encoding a partial B5R gene of the invention as defined above. The optional promoter is only present when the sequence encoding optional reporter protein is present. The signal peptide (SP) domain will not appear in the protein expressed by the recombinant virus since the SP (signal peptide) directs the modification of the partial B5R gene (STC) after protein synthesis in a cell infected by the virus. The signal protein (SP) will be cleaved from the STC after the partial B5R protein is expressed and subject to post-translational modification.

In one embodiment, the expression cassette may be composed of the following elements:

Loxp-H5-RFP-Loxpwhere the gene insertion element is a Loxp site, the promoter is an H5 promoter, and the optional reporter protein is RFP.

The nucleic acid sequence encoding the SCR1–, SCR2–, SCR3–, and SCR4− domain deleted B5R gene (B5R SCR1$^-$ SCR2$^-$ SCR3$^-$ SCR4$^-$) is therefore an exogenous sequence which is inserted into the TK gene of the vaccinia virus.

Inactivation as described herein refers to silencing of the gene at the transcriptional or post transcriptional level, deletion of the gene, mutation in the gene, disruption of the gene by insertion of a nucleic acid sequence or any other method that renders the virus unable to create a fully functional gene product. Inactivation of a gene can be partial or complete. As described herein, the inactivation of the TK gene in the vaccinia virus of the invention is caused by insertion of a nucleic acid sequence encoding the partial B5R gene. The insertion can be facilitated by homologous recombination as described herein.

The vaccinia virus vector of the invention can be prepared as described above by means of insertion of the nucleic acid sequence encoding the partial B5R gene into the TK gene of the vaccinia virus. The insertion of the partial B5R nucleic acid sequence may be achieved by any suitable method of site-specific recombination. However, homologous recombination may be a generally applicable method for this purpose.

In one embodiment, the native B5R gene of the vaccinia virus vector may remain intact.

The vaccinia virus vector of the invention may further comprise additional nucleic acid sequences encoding further proteins. Suitably the protein may be a biologically active protein, i.e. it has a therapeutic effect, and/or it may be a reporter protein. It may be convenient for the nucleic acid sequence encoding the protein(s) to inserted into the vaccinia virus vector by site-specific recombination.

Any convenient site-specific recombination or gene insertion technology may be used. Suitably, the insertion is made using homologous recombination. Insertion of a nucleic acid sequence into a target sequence can be facilitated by methods well known to the person skilled in the art. For example, methods described in Molecular Cloning, A Laboratory Manual, Second Edition, by J. Sambrook, E. F. Fritsch and T. Maniatis (2003), Cold Spring Harbor Laboratory Press, Virology Methods Manual, edited by Brian W J Mahy and Hillar O Kangro (1996) Academic Press and Expression of genes by Vaccinia virus vectors. Current Protocols in Molecular Biology, published by John Wiley and Son (1998), Chapter 16.

Any suitable homologous recombination system may be used, such as for example Cre-Lox, or Flp/FRT systems for removing reporter genes. The gene insertion elements may be added to the expression cassette around the nucleic acid sequence encoding the protein(s) and upstream of the promoter region driving expression of the protein(s).

It may be suitable for further heterologous protein(s) to be inserted into the N1L gene of the vaccinia virus vector. In order to target the N1L gene (L025) of vaccinia virus for homologous recombination, the expression cassette may be provided with additional sequences complementary to the N1L gene and/or the gene adjacent to the N1L gene. For example, the additional sequences may be provided on the upstream and downstream ends of the expression cassette respectively. In other words, a N1L left arm (L-arm) may be provided to target the left side of the N1L gene and/or the next gene (L024) and a N1L right arm (R-arm) to target the right side of the N1L gene and/or the next gene (L026). The actual expression cassette comprising the nucleic acid sequence(s) encoding the protein(s) and gene insertion elements may then be located between N1L L-arm and N1L R-arm ready for insertion into the N1L gene of the vaccinia virus. The expression cassette may be suitably inserted into a shuttle vector prior to transformation of the vaccinia virus vector.

The expression cassette may therefore be composed of the following nucleic acid sequence elements:

INT-PRO-REP-INT-PRO-X where INT is a gene insertion element, PRO is an optional promoter, REP is an optional nucleic acid sequence encoding a reporter protein, and X is nucleic acid sequence encoding a heterologous protein, for example a biologically active protein. The optional promoter is only present when the sequence encoding optional reporter protein is present. The heterologous protein may be a therapeutic protein with an anti-cancer activity, e.g. a cytostatic, cytotoxic, or immunogenic activity.

A polypeptide as used herein refers to a plurality of amino acid residues joined together by peptide bonds. It is used interchangeably with protein, peptide, oligopeptide and includes glycoproteins and derivatives thereof. The term "polypeptide" is also intended to cover analogues and derivatives of polypeptides which retain the same biological function or activity as the original polypeptide. A heterologous polypeptide as used herein refers to any polypeptide that is not normally expressed by the virus in nature. The heterologous polypeptide can be biologically active. A biologically active polypeptide as used herein refers to a polypeptide that has a biological function or activity.

The heterologous protein may be a cytokine or a protein which acts to neutralise suppressive cytokines in order to promote anti-tumour immunity, for example an antibody or antibody fragment such as fragment antigen-binding (Fab) or single-chain variable fragment (scFv), a cytokine receptor or cytokine receptor fragment.

The terms "antibody" and "immunoglobulin" are used herein interchangeably. An antibody molecule is made up of two identical heavy (H) and two identical light (L) chains held together by disulphide bonds. Each heavy chain comprises an Fc polypeptide. The two Fc polypeptides from the two heavy chains dimerise to form the Fc region of the antibody molecule. The term "Fc region" refers to the constant region of an antibody excluding the first constant region immunoglobulin domain of the heavy chain (CH1) that interacts with the constant portion of the light chain (CL) forming a CH1-CL domain pair. Thus, Fc region comprises the last two constant region immunoglobulin domains (CH2 and CH3) of IgA, IgD, and IgG, and the last three constant region immunoglobulin domains of IgE and IgM (CH2, CH3 and CH4), Any polypeptide of the various immunoglobulin constant domains may therefore be used in accordance with the present invention as a dimerisation domain.

Several antibody effector functions are mediated through the binding of the Fc region to Fc receptors (FcR) found on the surface of many cells for example lymphocytes, macrophages, natural killer cells, etc. FcRs are defined by their specificity for antibody isotypes. For example, Fc receptors for IgG antibodies are referred to as FcγR.

An "antibody fragment" as referred to herein means any portion of a full length antibody. Examples of antibody fragments include, but are not limited to, Fab, Fab', F(ab')2, scFv, Fv, dsFv diabody and Fd fragments.

The term "single chain variable fragment" or "scFv" refers to an Fv fragment in which the heavy chain domain and the light chain domain are linked. One or more scFv fragments may be linked to other antibody fragments (such as the constant domain of a heavy chain or a light chain) to form antibody constructs having one or more antigen recognition sites.

The heterologous protein may be a cytokine selected from the group consisting of IL-21, GM-CSF, IL-2, IL-7, IL-12, IL-15, IL-18 and IFN-α, or any combinations thereof. Other suitable heterologous proteins include antigen presentation enhancing molecule (HSP96), or immune checkpoint blocking inhibitors such as PD-L1 or anti-PD-1 inhibitors (for example anti-PD-L1 or anti-PD-1 antibodies). Example anti-PD-L1 antibodies include atezolizumab, avelumab and durvalumab. Example anti-PD-1 antibodies include pembrolizumab, nivolumab, pidilizumab and cemiplimab. Other suitable PD-L1 or anti-PD-1 inhibitors include fusion proteins of fragments of antibodies, e.g. the Fc domain of an antibody fused to the extracellular domain of the PD-1 ligand programmed cell death ligand 2 (PD-L2), such as AMP-224. Other immune checkpoint blocking inhibitors include PD-1, PD-L1, TIM-3 or CTLA-4, or any combinations thereof. The immune checkpoint blocking inhibitor molecules may be soluble. Immune checkpoint blocking inhibitors can also be referred to as immune checkpoint blocking molecules.

The terms "antibody" and "immunoglobulin" are used herein interchangeably. An antibody molecule is made up of two identical heavy (H) and two identical light (L) chains held together by disulphide bonds. Each heavy chain comprises an Fc polypeptide. The two Fc polypeptides from the two heavy chains dimerise to form the Fc region of the antibody molecule. The term "Fc region" refers to the constant region of an antibody excluding the first constant region immunoglobulin domain of the heavy chain (CH1) that interacts with the constant portion of the light chain (CL) forming a CH1-CL domain pair. Thus, Fc region comprises the last two constant region immunoglobulin domains (CH2 and CH3) of IgA, IgD, and IgG, and the last three constant region immunoglobulin domains of IgE and IgM (CH2, CH3 and CH4), Any polypeptide of the various immunoglobulin constant domains may therefore be used in accordance with the present invention as a dimerisation domain.

Several antibody effector functions are mediated through the binding of the Fc region to Fc receptors (FcR) found on the surface of many cells for example lymphocytes, macrophages, natural killer cells, etc. FcRs are defined by their specificity for antibody isotypes. For example, Fc receptors for IgG antibodies are referred to as FcγR.

An "antibody fragment" as referred to herein means any portion of a full length antibody. Examples of antibody fragments include, but are not limited to, Fab, Fab', F(ab')2, scFv, FV, dsFv diabody and Fd fragments.

The term "single chain variable fragment" or "scFv" refers to an Fv fragment in which the heavy chain domain and the light chain domain are linked. One or more scFv fragments may be linked to other antibody fragments (such as the constant domain of a heavy chain or a light chain) to form antibody constructs having one or more antigen recognition sites.

In one embodiment, the expression cassette encoding the heterologous protein may be composed of the following elements:

FRT-H5-RFP-FRT-H5-X where the gene insertion element is a FRT site, the promoter is an H5 promoter, and the optional reporter protein is RFP. In some further embodiments, the heterologous protein (X) may be a cytokine, for example an interleukin, such as IL-21, IL-15, IL-12 or GM-CSF.

In a further embodiment, the cytokine may be an IL-15/Receptor fused gene. The IL-15/Receptor fused gene may encode an IL-15/IL-15 Receptor fusion protein. For example, the fusion protein may be a soluble IL-15/IL-15Ralpha complex. Without being bound by theory, IL-15 has substantial potential as an immunotherapeutic agent for augmenting immune responses. However, the activity of IL-15 is mediated by a unique mechanism in which the cytokine is transpresented by cell-bound high-affinity IL-15Ralpha to target cells expressing the IL-15Rbeta and the common gamma-chain. Thus, the efficacy of administered IL-15 alone may be limited by the availability of free IL-15Ralpha. Soluble IL-15/IL-15Ralpha complexes may greatly enhance IL-15 half-life and bioavailability in vivo, thus maximizing IL-15 activity.

References to IL-12 herein include IL-12A (for example GenBank Accession no. AF404773.1 GI: 15128214) and/or IL-12B (for example GenBank Accession no. AY008847.1 GI: 11192034). The mature IL-12 protein includes both subunits. References to IL-21 herein include isoform 1 (for example GenBank Accession no. NP_068575.1/GI: 11141875) and/or isoform 2 (GenBank Accession no. NP_001193935.1/GI: 333033767). References to GM-CSF herein include GenBank Accession no. AF373868.2/GI: 14278709. References to IL-15 herein include GenBank Accession no. U14407.1. Generally, the sequences are human sequences.

Reporter polypeptide as used herein refers to a polypeptide whose expression is indicative of the presence of the nucleic acid sequence, expression cassette or vector in a host cell or virus. Examples of reporter polypeptides include but are not limited to fluorescent polypeptides, chemiluminescent polypeptides, bioluminescent polypeptides, phosphorescent polypeptides as well as enzymes.

In an embodiment of the invention the reporter polypeptide is a fluorescent polypeptide. Fluorescent polypeptides include but are not limited to green fluorescent protein, red fluorescent protein, yellow fluorescent protein, cyan fluorescent protein and their derivatives.

However, in clinical use for the treatment of cancer in patient, it is preferred that the expression cassette does not include a reporter protein.

Restriction sites are specific nucleotide sequences that are recognised and cleaved by restriction enzymes. Examples of restriction enzymes are SalI, BgIII, HindIII, SmaI, BamHI and MluI. A BamHI restriction site is a restriction site recognised by BamHI. The restriction sites for other enzymes are similarly named.

In an embodiment of the invention, the nucleic acid sequence or vector comprises one or more restriction sites. A preferred embodiment of the invention is a nucleic acid sequence or vector comprising SalI, BgIII, HindIII, SmaI, BamHI and MluI restriction sites.

In an embodiment of the invention the nucleic acid sequence or vector is comprised within a vaccinia virus. In a specific embodiment of the invention the nucleic acid sequence has the formula shown in any one of FIG. 31.

According to a second aspect of the invention there is provided a composition comprising a vaccinia virus vector of the first aspect of the invention. In an embodiment of the invention according to this aspect the composition optionally comprises a pharmaceutically acceptable carrier, diluent or excipient. The invention therefore includes a pharmaceutical composition as described herein.

The composition may be adapted for administration by any appropriate route, for example by the oral (including buccal or sublingual), topical (including buccal, sublingual or transdermal), or parenteral (including subcutaneous, intramuscular, intravenous, intra-arterial, intra-thecal, intra-pleural, intra-ophthalmological, intra-cardiac, intraperitoneal or intradermal) route.

Pharmaceutical compositions adapted for parenteral administration include aqueous and non-aqueous sterile injection solution which may contain anti-oxidants, buffers, bacteriostats and solutes which render the formulation substantially isotonic with the blood of the intended recipient; and aqueous and non-aqueous sterile suspensions which may include suspending agents and thickening agents.

Excipients which may be used for injectable solutions include water, alcohols, polyols, glycerine and vegetable oils, for example. The compositions may be presented in unit-dose or multidose containers, for example sealed ampoules and vials, and may be stored in a freeze-dried (lyophilized) condition requiring only the addition of the sterile liquid carried, for example water for injections, immediately prior to use. Extemporaneous injection solutions and suspensions may be prepared from sterile powders, granules and tablets.

The pharmaceutical compositions may contain preserving agents, solubilising agents, stabilising agents, wetting agents, emulsifiers, sweeteners, colourants, odourants, salts (substances of the present invention may themselves be provided in the form of a pharmaceutically acceptable salt), buffers, coating agents or antioxidants. They may also contain therapeutically active agents in addition to the substance of the present invention.

According to a third aspect of the invention there is provided a method of treatment comprising administering a composition of the second aspect of the invention to a subject in need thereof for the treatment of cancer. The composition may be optionally formulated with a pharmaceutically acceptable adjuvant, diluent and/or buffer. The composition may therefore be formulated as a pharmaceutical composition.

Embodiments of this aspect of the invention extend to a composition comprising a vaccinia virus vector as defined herein for use in the treatment of cancer. Such embodiments include a nucleic acid sequence or a vaccinia virus vector as defined herein in the manufacture of a medicament for use in the treatment of cancer.

As used herein, a subject refers to an animal, including a human being. An animal can include mice, rats, fowls such as chicken, ruminants such as cows, goat, deer, sheep and other animals such as pigs, cats, dogs and primates such as humans, chimpanzees, gorillas and monkeys.

A therapeutically effective amount is the dose sufficient to induce oncolysis. Doses for delivery and administration can be based upon current existing protocols, empirically determined, using animal disease models or optionally in human clinical trials. Initial study doses can be based upon animal studies set forth herein, for a mouse, for example. Doses can vary and depend upon whether the treatment is prophylactic or therapeutic, the type, onset, progression, severity, frequency, duration, or probability of the disease to which treatment is directed, the clinical endpoint desired, previous or simultaneous treatments, the general health, age, gender, race or immunological competency of the subject and other factors that will be appreciated by the skilled artisan. The dose amount, number, frequency or duration may be proportionally increased or reduced, as indicated by any adverse side effects, complications or other risk factors of the treatment or therapy and the status of the subject. The skilled artisan will appreciate the factors that may influence the dosage and timing required to provide an amount sufficient for providing a therapeutic or prophylactic benefit. In an embodiment of this aspect of the invention, the method further comprises administering to the subject an additional cancer therapy. Cancer therapy as used herein refers to refers to treatment of cancer by any medical or physical means. The additional cancer therapy can be chemotherapy, biological therapy, radiotherapy, immunotherapy, hormone therapy, anti-vascular therapy, cryotherapy, toxin therapy and/or surgery, including combinations thereof.

Methods and uses of the invention as disclosed herein can be practiced immediately or days, months or years after a subject has been identified as having the disease targeted for treatment.

The methods include administering the virus at different schedules. A single dose of the virus may be administered to a subject or a tumour over a 1, 2, 5, 10, 15, 20, or 24-hour period. The virus may be administered over 1, 2, 3, 4, 5, 6, 7 or more days or weeks. The interval between injections can be 1, 2, 3, 4, 5, 6, 7 days or weeks. Typically, multiple doses are administered to the same general target region, such as in the proximity of a tumour or in the case of intravenous administration a particular entry point in the blood stream or lymphatic system of a subject. The vaccinia virus vector may be administered 2, 3, 4, 5, or more times. The vaccinia virus vector could be given before resection of tumours at different schedule and doses.

The methods and uses may also include administering one, two, three or four different embodiments of the virus separately, subsequently or simultaneously. A first virus comprising a nucleic acid sequence encoding a first heterologous protein and a second virus comprising a nucleic acid sequence encoding a second heterologous protein may be administered separately, subsequently or simultaneously. The interval between subsequent administration of the different embodiments of the virus may be 1, 2, 3, 4, 5, 6, 7, 8, 9, 10, 15, 20, or 24 hours.

For example, a first virus comprising a nucleic acid sequence encoding an immune checkpoint inhibitor may be administered subsequent to a second virus comprising a nucleic acid sequence encoding a cytokine.

The immune checkpoint inhibitor protein may be PD1, PD-L1, TIM-3 or CTLA-4, or any combinations thereof. The immune checkpoint inhibitor protein may be soluble.

The cytokine may be IL-21, GM-CSF, IL-2, IL-7, IL-12, IL-15, IL-18 and IFN-α, or any combinations thereof.

In one embodiment, a vaccinia virus vector in which the biologically active protein is soluble PD1 is administered subsequently to a vaccinia virus vector in which the biologically active protein is IL-12.

The methods and uses may also include administering a virus and a heterologous protein separately, subsequently or simultaneously. The interval between subsequent administration may be 1, 2, 3, 4, 5, 6, 7, 8, 9, 10, 15, 20, or 24 hours. For example, an antibody may be administered subsequent to a virus comprising a nucleic acid sequence encoding a cytokine.

The separate, subsequent or simultaneous administration of the first or second aspect of the invention or the heterologous protein may be achieved by any convenient route whereby the administration is intravenously, intraperitoneally, intramuscularly, orally, intranasally or subcutaneously.

The first or second aspect of the invention and the heterologous protein may be prepared as a combined preparation or may be prepared as separate components.

The methods include administering the virus at different viral concentrations. In certain aspects, the subject is administered at least $5\times10^7$, $1\times10^8$, $2\times10^8$, $5\times10^8$, $1\times10^9$, $2\times10^9$, $5\times10^9$, $1\times10^{10}$, $5\times10^{10}$, $1\times10^{11}$, $5\times10^{11}$, $1\times10^{12}$ or more viral particles or plaque forming units (pfu), including the various values and ranges there between. The viral dose can be administered in 0.1 mL, 1 mL, 2 mL, 3 mL, 4 mL, 5 mL, 6 mL, 7 mL, 8 mL, 9 mL, 10 mL or more, including all values and ranges there between. The dose may be spread over time or by separate injection.

In certain embodiments the subject is a human with cancer and/or a tumour. The cancer may be a gastrointestinal cancer, a respiratory tract cancer, a genitourinary tract cancer, a hematopoietic cancer, a sarcoma, an adenocarcinoma, a squamous cell carcinoma or a non-malignant tumor/hyperplasia. The tumour may be non-resectable prior to treatment and resectable after treatment. The tumour can be a recurrent, primary, metastatic, and/or multi-drug resistant tumour. In certain aspects the tumor is located on or in the pancreas. In other aspects, the tumour can be a neuroendocrine tumour, an endocrine tumour, a peripheral central nervous system tumour, a brain cancer tumor, a head and neck cancer tumor, an esophageal cancer tumour, a skin cancer tumor, a lung cancer tumor, a liver tumour, a thymic tumor, a stomach cancer tumor, a colon cancer tumour, an ovarian cancer tumor, a uterine cancer tumor, a bladder cancer tumor, a testicular cancer tumour, a bladder tumour, a rectal cancer tumour, melanoma or a breast cancer tumour.

The compositions and methods disclosed in the present invention may be used in different types of gene therapy for example tumor suppressor gene therapy, suicide gene therapy, viral vector immunisation strategies, anti-angiogenic therapy, pro-apoptosis gene therapy and gene replacement therapy. "Oncolytic Viruses for Cancer Therapy: Overcoming the Obstacles" (Wong et al. Viruses 2010, 2, 78-106) is incorporated herein by reference in its entirety.

The compositions and methods disclosed in the present invention may be used in combination with additional therapeutic means or methods in the treatment of cancer, for example surgery, chemotherapy, radiation therapy, molecular cancer therapy or a further gene therapy, which may be used for administering genes that are different from the herein described nucleic acids of the invention.

According to a fourth aspect of the invention there is provided a nucleic acid sequence encoding a SCR1-, SCR2-, SCR3-, and SCR4- domain deleted B5R gene (B5R SCR1⁻ SCR2⁻ SCR3⁻ SCR4⁻) of vaccinia virus.

According to a fifth aspect of the invention there is provided a kit comprising a vaccinia virus vector as defined herein and a pharmaceutically acceptable adjuvant, diluent and/or buffer. The kit may therefore be useful in the treatment of cancer. The kit may further comprise a further therapeutic agent, such as a chemotherapeutic agent, and/or instructions for use.

The present disclosure describes a novel recombinant vaccinia virus expression vector and its application in cancer treatment and vaccination. The inventive vector (named VVL15TK STC) is derived from a vaccine strain Lister vaccinia virus that has been safely used in hundreds of millions of people for prevention of small pox, more particularly comprising deletion of one viral gene (Thymidine kinase gene). This novel mutant VV results in 10-30-fold more infectious EEV produced than its parental virus while the total replication of the mutant VV is not attenuated.

In one embodiment of this disclosure, a replication-competent Lister strain vaccinia virus (VV15 TK-STC) is described comprising a part of B5R gene (STC) in thymidine kinase (TK) region and intact B5R gene, which shows a better comet tail formation and EEV production with normal size of plaques. The partial B5R gene (STC) can be inserted into any non-vital region of vaccinia virus genome with B5R gene intact, such a modification would render the modified virus the same features as VV15 TK-STC. VV15 TK-STC virus has an enhanced anti-tumour efficacy in vivo. VV15 TK-STC virus armed with therapeutic gene IL-21 improves anti-tumour immunity. VV15 TK-STC virus can carry any other therapeutic gene, such as IL-12. The VV15 TK-STC virus can be administered locally (intra-tumoural injection) and systemically (intravenous injection).

In one embodiment of this disclosure, a novel VV vector is described which is derived from a Lister strain W, with particular manipulations of viral genes, insertion of a partial B5R gene (STC) in the thymidine kinase region and its use for cancer treatment.

Introducing a mutant B5R gene (STC) into the TK region with retention of the original B5R gene at its original position creates a virus that produces normal plaque sizes in vitro, which is important for better virus spreading. This modification results in the production of more EEV, which benefits the ability of the virus for long range dissemination. Thus, this modification enhances the virus's anti-tumour potency and creates a virus more suitable for intravenous delivery, as shown in the present disclosure.

Intravenous delivery of oncolytic viruses is desirable for improved anti-tumour efficacy in vivo as i.v. delivered virus can be expected to more readily target metastatic and circulating tumour cells, in addition to the primary tumour within the patient. A key advantage of the present disclosure is that the oncolytic virus can be delivered more effectively intravenously. The mutant virus described herein has an enhanced ability to form EEV which is further advantageous since EEV forms of Vaccinia virus are inherently more resistant to immune-mediated virus clearance. The present disclosure shows that a tumour tropic (by virtue of TK and N1L deletions) VV can be modified to enhance EEV formation by incorporation of a second copy of the STC region of the viral B5R gene within the modified VV, while maintaining expression of the original, full length B5R region. This disclosure represents a step forward for i.v.—deliverable oncolytic virotherapies, which have yet to demonstrate efficacy when delivered i.v. clinically. The modified virus can also incorporate further transgenes to enhance immune responses against the tumor at both the primary and metastatic sites.

Preferred features for the second and subsequent aspects of the invention are as for the first aspect mutatis mutandis.

The present invention will now be described by way of reference to the accompanying drawings with are included for the purposes of illustration only and are not to be construed as being limitations to the invention.

BRIEF DESCRIPTION OF THE DRAWINGS

FIG. 28 shows the nucleic acid sequence for the construct B5R—S-STC from FIG. 1 including the corresponding amino acid sequence encoded by the nucleic acid sequence. The construct B5R—S-STC comprises the domains SP-SCR1-STALK-TM-CT-H5-RFP as shown. (a) The signal peptide domain SP consists of amino acid residues 1-19 (SEQ ID NO: 27) encoded by the nucleic acid sequence as indicated (SEQ ID NO:28). (b) The domain SCR1 consists of amino acid residues 20-72 (SEQ ID NO:29) encoded by the nucleic acid sequence as indicated (SEQ ID NO:30). (c) The domain STALK consists of amino acid residues 237-275 (SEQ ID NO:31) encoded by the nucleic acid sequence as indicated (SEQ ID NO:32). (d) The transmembrane domain TM consists of amino acid residues 276-303 (SEQ ID NO:33) encoded by the nucleic acid sequence as indicated (SEQ ID NO:34). (e) The C-terminal domain CT consists of amino acid residues 304-317 (SEQ ID NO:35) encoded by the nucleic acid sequence as indicated (SEQ ID NO:36). The numbering of the amino acid residues in the construct B5R—S-STC is given with respect to the amino acid sequence of the native B5R protein encoded by the unmodified B5R gene. (f) The H5 promoter has the nucleic acid sequence as indicated (SEQ ID NO:37). (g) The Red Fluorescent Protein (RFP) expressed by the construct when present consists of amino acid residues 1-225 (SEQ ID NO:38) encoded by the nucleic acid sequence as indicated (SEQ ID NO:39). The domain H5-RFP may be replaced by a single H5 promoter. (h) SP (aa 1-19)-SCR1 (aa 20-72)-

STALK (aa 237-275)-TM (aa 276-303)-CT (aa 304-317) (SEQ ID NO: 40) encoded by the nucleic acid sequence as indicated (SEQ ID NO:41).

Figure 1:
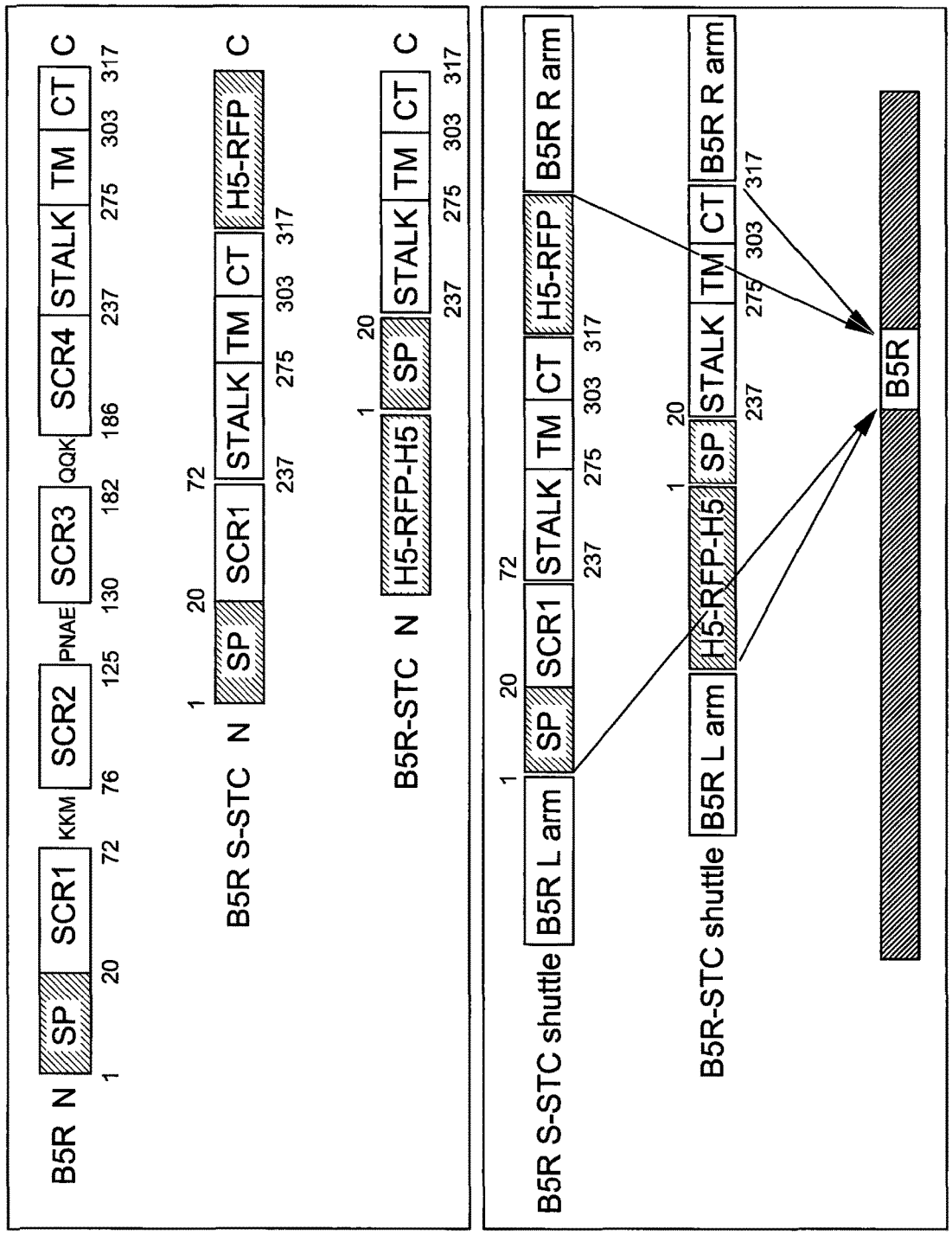
FIG. 1 shows the expression cassette in the pGEMT-B5R-STC and pGEMT-B5R S-STC shuttle vector. The top panel shows the structure of B5R protein and the expression cassette in the pGEMT-B5R STC and S-STC shuttle vector. The expression STALK-TM-CT (STC) containing signal peptide (SP) and SCR1-STALK-TM-CT (S-STC) containing signal peptide (SP). The bottom panel is the expression cassette in the pGEMT-B5R STC shuttle vector, both the marker gene RFP and the STALK-TM-TC (STC) are driven by H5 promotor. The expression STALK-TM-CT (STC) containing signal peptide (SP) is driven by the H5 promoter and SCR1-STALK-TM-CT (S-STC) containing signal peptide (SP) is driven by the native B5R promoter, the marker gene RFP is driven by H5 promotor. SP=the signal peptide of B5R gene. Homologous recombination section of pGEMT-B5R-STC and pGEMT-B5R S-STC shuttle vector. TK L arm is to target the left side (L089) of the TK gene, TK R arm is to target the right side (L091) of the TK gene. Expression cassette is located between TK L arm and TK R arm.

FIG. 29 shows the nucleic acid sequence for the construct B5R-STC from FIG. 1 including the corresponding amino acid sequence encoded by the nucleic acid sequence. The construct B5R-STC comprises the domains (H5-RFP-H5)-SP-STALK-TM-CT as shown. The optional domain H5-RFP-H5 consists of 2 copies of the nucleic acid sequence of the H5 promoter (a) (SEQ ID NO:42) and (c) (SEQ ID NO:45) as shown either side of a nucleic acid sequence encoding the Red Fluorescent Protein (RFP) (b) expressed by the construct when present consists of amino acid residues 1-225 (SEQ ID NO:43) encoded by the nucleic acid sequence as indicated (SEQ ID NO:44). The domain H5-RFP-H5 may be replaced by a single H5 promoter. (d) The signal peptide domain SP consists of amino acid residues 1-19 (SEQ ID NO:46) encoded by the nucleic acid sequence as indicated (SEQ ID NO: 47). (e) The domain STALK consists of amino acid residues 237-275 (SEQ ID NO: 48) encoded by the nucleic acid sequence as indicated (SEQ ID NO:49). (f) The transmembrane domain TM consists of amino acid residues 276-303 (SEQ ID NO:50) encoded by the nucleic acid sequence as indicated (SEQ ID NO:51). (g) The C-terminal domain CT consists of amino acid residues 304-317 (SEQ ID NO:52) encoded by the nucleic acid sequence as indicated (SEQ ID NO:53). The numbering of the amino acid residues in the construct B5R-STC is given with respect to the amino acid sequence of the native B5R protein encoded by the unmodified B5R gene.

Figure 2:
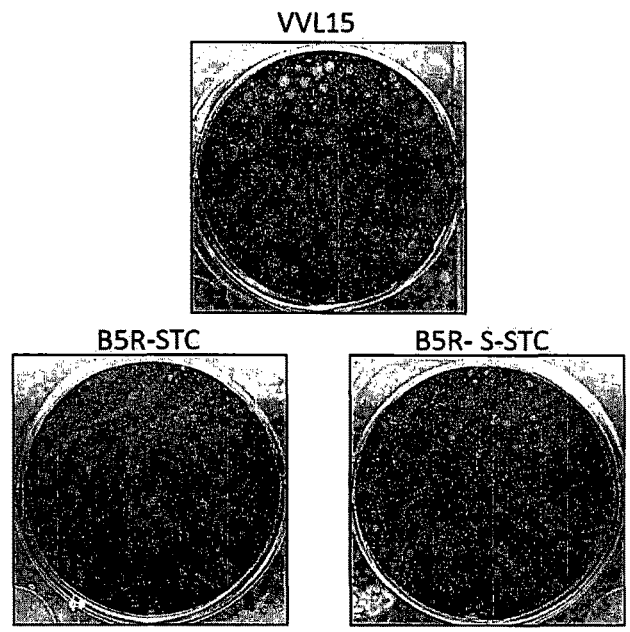
FIG. 2 shows a comparison of the plaque and comet tail formation of vaccinia viruses in vitro. CV-1 cells in 6-well plates were infected by diluted control virus VVL15, recombinant VVL15 B5R-STC, recombinant VVL15 B5R S-STC. Three days post infection, the infected cells were stained using crystal violet as described previously. The plates were photo scanned.
Figure 3:
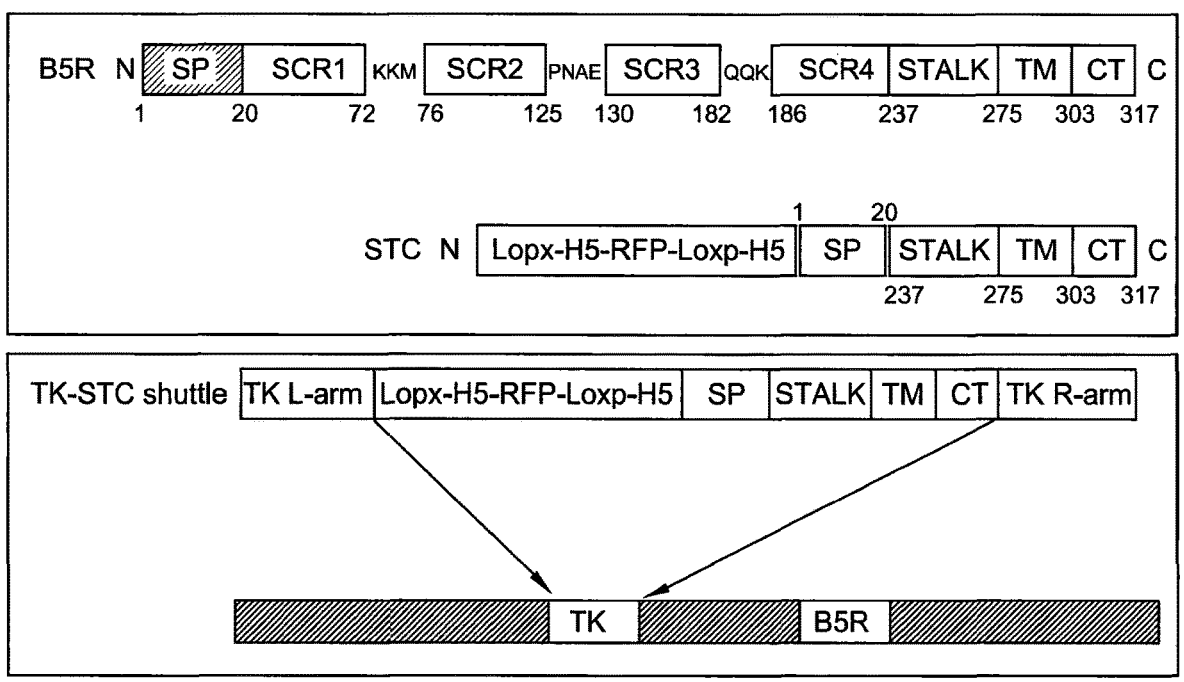
FIG. 3 shows expression cassette and TK-STC shuttle vector and homologous recombination. Top panel: The first H5 promoter (from left) drives the RFP expression, the second H5 promoter drives the STC expression. SP: signal peptide (from B5R); STC: Stalk(S), TM (T), CT (C). TM is the transmembrane domain of B5R protein, CT is the cytoplasmic tail of B5R protein. Bottom panel: Homologous recombination section of TK-STC shuttle vector. TK left arm (L-arm) is to target the left side (L089) of the TK gene, TK right arm (R-arm) is to target the right side (L091) of the TK gene. Expression cassette (Loxp-H5-RFP-Loxp-H5-SP+STC) is located between TK L-arm and TK-R arm in the TK region.

FIG. 30 shows the nucleic acid sequence for the construct TK-STC from FIGS. 2 and 3 including the corresponding amino acid sequence encoded by the nucleic acid sequence. The construct comprises the domains (Loxp-H5-RFP-Lox-H5)-SP-STALK-TM-CT. The domain (Loxp-H5-RFP-Lox-H5) consists of two Loxp elements (a) (SEQ ID NO:54) and (d) (SEQ ID NO:58), an H5 promoter (b) (SEQ ID NO:55) and (e) (SEQ ID NO:59) and an optional nucleic acid sequence encoding Red Fluorescent Protein (RFP) (c) expressed by the construct when present consisting of amino acid residues 1-225 (SEQ ID NO:56) encoded by the nucleic acid sequence as indicated (SEQ ID NO:57). The Loxp elements and H5 promoter have the nucleic acid sequences shown. (f) The signal peptide domain SP consists of amino acid residues 1-19 (SEQ ID NO:60) encoded by the nucleic acid sequence as indicated (SEQ ID NO:61). (g) The domain STALK consists of amino acid residues 237-275 (SEQ ID NO:62) encoded by the nucleic acid sequence as indicated (SEQ ID NO:63). (h) The transmembrane domain TM consists of amino acid residues 276-303 (SEQ ID NO:64) encoded by the nucleic acid sequence as indicated (SEQ ID NO:65). (i) The C-terminal domain CT consists of amino acid residues 304-317 (SEQ ID NO:66) encoded by the nucleic acid sequence as indicated (SEQ ID NO:67). The numbering of the amino acid residues in the construct TK-STC is given with respect to the amino acid sequence of the native B5R protein encoded by the unmodified B5R gene.

FIG. 31 shows (a) the nucleic acid sequence for the construct STC (SEQ ID NO:68) and (b) the corresponding amino acid sequence encoded (SEQ ID NO:69).

MATERIALS AND METHODS

Cell Lines: All tumour cell lines used were stored in our lab, either from ATCC or Cancer Research UK Cell line Service Unit or kindly provided by or collaborators. All human cancer cell lines were genotyped by STR assay. The murine tumour cell lines used in this study include: The colorectal cancer cell line CT26 was derived from the BALB/c strain. DT6606 (pancreatic carcinoma) originated from a C57BL/6 strain transgenic mouse with mutations in the K-Ras and p53 genes conditional to the pancreas. This was a kind gift of Professor David Tuveson (CRUK, Cambridge Research Institute, Cambridge, UK). CV1 is an African Green Monkey "normal" kidney cell line obtained from the ATCC, VA, USA and was used as a stock cell line to facilitate the mass production of viruses as well as in all viral titration assays.

Viruses: VVL15 was constructed by the insertion of the lacZ reporter and the firefly luciferase genes into the TK region of the Lister vaccine strain of vaccinia virus (VV Lister) under the control of the synthetic early/late and p7.5 promoters respectively (Hung, C. F. et al., Gene Ther 14, 20-29 (2007))-using an in vitro intracellular recombination technique previously described. VVL15 TK-RFP was constructed previously (data not published) with RFP replacing TK gene.

Construction of VVL15 B5R-STC Shuttle Vector:

RFP was amplified by PCR from DsRed plasmid (Clontech) with H5-RFP forward primer (5'-<u>AGATCT</u>AAAAAT-TGAAAATAAATACAAAGGTTCTTGAGGGTTGTGT-TAAATTGAAAGCGAGAA ATAATCATAAATAGCTACCGGACTCAGATCCA-3') (BgLII is underlined) (SEQ ID NO:1) and H5 RFP reverse primer

```
(5'-ACGCGTCCCGGGAAGCTTTATTTATGATTATTTCTCGCTTTCA

ATTTAACACAACCCTCAAGAACCTTTGTATTTATTTTCAATTTTTCG

CCTTAAGATACATTGATGAG-3')
```

(M1UI, SmaI and HindIII sites are underlined) (SEQ ID NO:2). SP+STC+B5R right arm was amplified by PCR from WR-STC genome (from Rafeal Blasco, Spain) with left arm forward primer (5'-<u>AAGCTT</u>AAATAAAA ATGAAAAC-GATTTCC-3') (HindIII site is underlined) (SEQ ID NO:3) and right arm reverse primer (5'-<u>CCCGGGGAATTCA-GATCT</u>TTTTATTTATGAGCGTTAAAAATAGTATA-3') (SmaI and BgLII sites are underlined) (SEQ ID NO:4) B5R left arm was amplified from VV lister genome with forward primer (5'-TATACTGCGTGTATGACCG-3') (SEQ ID NO:5) and reverse primer (5'-<u>CCCGGGGAATTCA-GATCT</u>TTTTA TTTATGAGCGTTAAAAATAGTATA-3') (SmaI and BgLII sites are underlined) (SEQ ID NO:6). All PCR products were cloned into pGEMT-easy vector (Promega) following the manufacturer's instructions. Correct sequences were verified by sequencing. pGEMT-easy-B5R left arm was linearized with BgLII and SmaI restriction enzymes. H5-RFP-H5 was released from pGEMT-easy-H5-RFPH5 with BgLII and HindIII restriction enzymes. B5R right arm was released from pGEMT-easy-B5R right arm with HindIII and SmaI restriction enzymes. pGEMT-easy-left arm was linearized with BgLII and SmaI restriction enzymes. H5-RFP-H5 (BgLII+HindIII), STC+B5R right arm (HindIII+SmaI) were ligated into linearized pGEMT-easy B5R left arm (BgLII+SmaI). The resulted shuttle vector pGEMT-easy-B5R left arm+H5-RFP-H5+STC+B5R right arm was verified by sequencing. The shuttle vector is designated as VVL15 B5R STC shuttle vector hereafter. The illustration of expression cassette of VVL15 B5R STC shuttle vector is shown in FIG. 1

Construction of VVL15 B5R S-STC Shuttle Vector:

B5R S-STC (signal peptide/SP+SCR1+stalk+transmembrane domain+cytoplasmic tail/STC: SP-SCR1-STC). The left arm and SP+SCR1 were amplified by PCR from the VV lister genome with primers B5R left arm forward (5'-TATACTGCGTGTATGACCG-3') (SEQ ID NO:7) and B5R SCR1 reverse (5'-CTCGAGGAATTCAAGCTTGCATGGATTTTCGTATTTC-3') (XhoI and HindIII sites are underlined) (SEQ ID NO:8). STC was amplified by PCR with B5R stalk primer forward (5'-AAGCTTTGTGTACGAACTAACGAAAAA-3') (HindIII site is underlined) (SEQ ID NO:9) and cytoplasmic tail reverse primer (5'-AGATCTTCACGGTAGCAATTTATGG-3') (BgLII site is underlined) (SEQ ID NO:10). H5-RFP was amplified by PCR with forward primer (5'-AGATCTAAAAATT-GAAAATAAATACAAAGGTTCTTGAGGGT TGTGT-TAAATTGAAAGCGAGAAATAATCATAAATAGC-3') (BgLII site is underlined) (SEQ ID NO: 11) and reverse primer (5'-ACGCGTCGCCTTAAGATACATTGATGAG-3') (M1UI site is underlined) (SEQ ID NO:12). B5R right arm was amplified by PCR with B5R right arm forward primer (5'-ACGCGTCTACCGTGAA TATAAATCCGT-3') (M1UI site is underlined) (SEQ ID NO:13) and B5R right arm reverse primer (5'-CTCGAGGGATGTATATAC-CATCGTCGT-3') (XhoI site is underlined) (SEQ ID NO:14). All PCR products were cloned into pGEMT-easy vector (promega) following the manufacturer's instructions. The correct sequences were verified by sequencing. pGEMT-easy-B5R left arm+SP+SCR1 was linearized with XhoI and HindIII restriction enzymes. STC was released from pGEMT-easy-STC with HindIII and BgLII restriction enzymes. H5-RFP was released from pGEMT-easy-H5-RFP with BgLII and M1UI restriction enzymes. B5R right arm was released from pGEMT-easy-B5R right arm with M1UI and XhoI restriction enzymes. Digested STC (HindIII+BgLII), H5-RFP (BgLII+M1UI) and B5R right arm (M1UI+XhoI) were ligated into linearized pGEMT-easy-B5R left arm+SP+SCR1 (HindIII+XhoI). The resulted shuttle vector pGEMT-easy-B5R left arm+SP+SCR1+STC+H5-RFP+B5R right arm was verified by sequencing. The shuttle vector is designated as VVL15 B5R S-STC shuttle vector hereafter. The illustration of expression cassette of VVL15 B5R S-STC shuttle vector is shown in FIG. 1.

Construction of TK-STC Shuttle Vectors:

TK-directed shuttle vector containing RFP flanked by LoxP sites was constructed previously (Yuan, M. et al., Mol Ther-Meth Clin D 2 (2015)). Signal peptide of B5R gene (SP) was amplified by PCR using forward primer (5'-TTAATTAAAAATAAAAATGAAAACGATTTCCG-3') (PacI is underlined) (SEQ ID NO:15) and reverse primer (5'-GCTAGCGAATTCAAGCTTTGAATAAACAACAGC-3')

(NheI, EcoRI and HindIII are underlined) (SEQ ID NO:16). B5R STC fragment (STALK+TM+TC) was amplified by PCR using forward primer (5'-AAGCTTTGTGTACGAACTAACGAAAAA-3') (HindIII is underlined) (SEQ ID NO:17) and reverse primer (5'-GCTAGCTCACGGTAGCAATTTATGGAACT-3') (NheI is underlined) (SEQ ID NO: 18). The SP fragment was cloned into the pGEMT easy vector, designated as pEGMT easy-SP. STC fragment was cloned into HindIII and NheI sites of pGEMT easy-SP to obtain pEGMT easy-SP+STC. SP+STC was released from pEGMT easy-SP+STC using PacI and NheI restriction enzymes and cloned into PacI and NheI sites of the TK-directed shuttle vector containing RFP flanked by LoxP sites. The resulted shuttle vector is named as TK STC shuttle vector. The illustration of expression cassette of TK STC shuttle vector is shown in FIG. 3.

Figure 22:
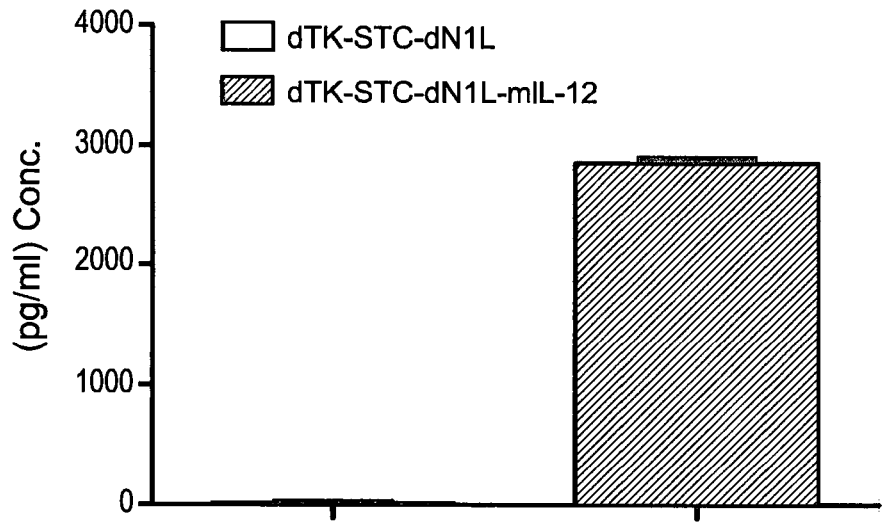
FIG. 22 shows confirmation of mIL-12 expression in the TK-STC mIL-12 virus. The expression of mIL-12 in Suit-2 cells was measured by ELISA three days post infection of TK-STC vaccinia virus (dTK-STC-dN1L), TK-STC mIL-12 (dTK-STC-dN1L-mIL-12). VVL-DD is also named as VVDTK-DN1L, VVL-DD STC is also named as VVDTK-STC-DN1L.

Construction of Cytokine N1L-mIL-12 and N1L-hIL12 Shuttle Vectors:

The N1L-directed shuttle vector containing RFP flanked by FRT sites for homologous recombination was generated previously (Yuan et al., Mol Ther-Meth Clin D 2 (2015)), this shuttle vector is designated as N1L shuttle vector hereafter. mIL-12 and hIL-12 were cloned into PmeI and NheI sites of the N1L shuttle vector to obtain N1L-mIL-12 and N1L-hIL 12 shuttle vectors (FIG. 22).

Figure 14:
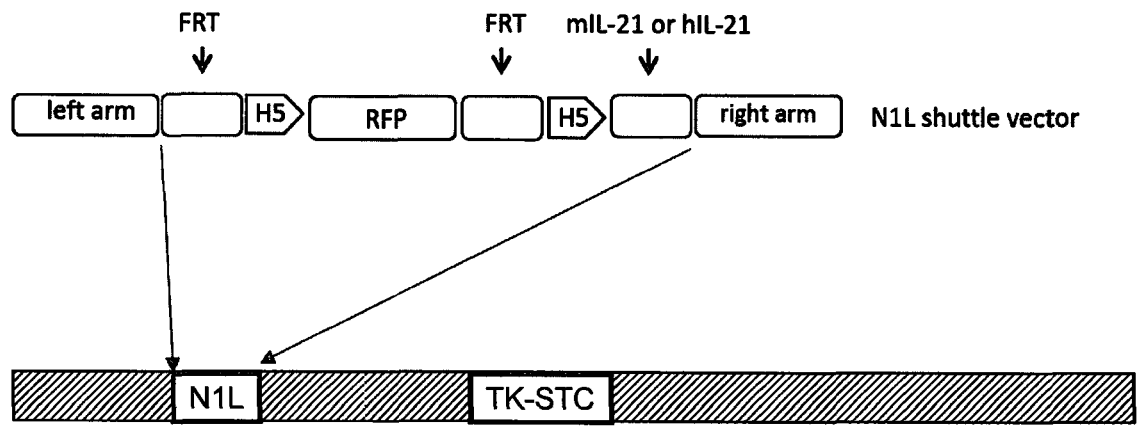
FIG. 14 shows expression cassette and N1L shuttle vector expressing mIL-21 or hIL-21 and homologous recombination. Modified VV TK-STC with RFP excised by Cre recombinase was used for making a virus expressing a cytokine transgene in the N1L region. Expression of mIL-21 or hIL-21 and RFP in the N1L shuttle vector was driven by the H5 promoter. RFP and its promoter H5 was flanked by FRT, thus RFP and its promoter H5 can be excised by Flipase acting on FRT in the final modified virus to create a modified, marker-free virus.

Construction of N1L-mIL-21 and N1L-hIL21 Shuttle Vectors:

mIL-21 and hIL-21 were cloned into SalI and BglII sites of the N1L shuttle vector to obtain N1L-mIL-21 and N1L-hIL21 shuttle vectors (FIG. 14).

Cas9-Mediated Homologous Recombination as Stated Previously:

Briefly, $3 \times 10^5$ CV-1 cells were seeded into one well of a six-well plate the day before transfection. gRNA vector (N1LgRNA for targeting N1L region, TK gRNA for targeting TK region) was co-transfected with Cas9 into CV-1 cells in the six-well plate. The next day, the transfected well was infected with 0.01 PFU/cell of backbone virus. The shuttle vector for homologous recombination was transfected into infected wells 2 hours after virus infection. Cells were harvested 24 hours later, and frozen at −80° C. for plaque purification.

Purification of Desired Virus:

Thaw the cell lysates collected from Cas9-mediated homologous recombination, and 1 µl of this lysates was used to infect all 6 wells of a six well plate containing CV1 cells grown to 80-90% confluence. This low viral load would ensure the emergence of well separated PFUs. A further 48 hr later, each well was carefully scrutinized under green light searching for those viral PFUs that fluoresced red. Upon identification of positive colonies, their location was marked on the under surface of the plate with a fine tipped permanent marker. The colony was carefully picked with a 20 µl tip after aspirating the media from the well. The tip was then submerged into a cryotube containing 250 µl of 5% FCS CM. Following further freeze-thaw cycles, 5-20 µl of this virus solution was added to each well of a new 6-WP containing CV1 cells as before. This process was repeated until every PFU fluoresced red i.e. all viral colonies were due to recombinant virus. In general it took between 6-10 rounds of plaque purification to obtain a pure batch of recombinant virus. At this point, the viral lysate was scrape-harvested and viral DNA was extracted via a column based system (i.e. the Blood Mini Kit from Qiagen). The purity of virus was confirmed by PCR amplification of the target gene from extracted viral DNA. Its presence would indicate contamination with the parental virus, VVL (Wang et al., J Clin Invest 119, 1604-1615 (2009)).

Once preliminary investigations had confirmed the likely creation of a pure recombinant virus that expressed the STC, 50 µl of viral lysate was added to a T175 flask containing CV1 cells, again grown to 80-90% confluence in approximately 30 ml of 5% FCS CM. Cells and media were scrape-harvested 48 hr later and kept as a "primary viral expansion".

Verification of TK STC VACV:

VACV DNA was extracted using a DNeasy Blood & Tissue Kit (Qiagen) according to the manufacturer's protocol. To verify the insertion of STC in the TK region, forward primer (5'-AAATAAAAATGAAAACGATTTCCG-3')

(SEQ ID NO: 19) targeting SP part of SP-STC and reverse primer (5'-GGATGTATATACCATCGTCGT-3') SEQ ID NO:20) targeting right arm side of TK gene. A control DNA fragment spanning the A46R and A47L genes was amplified by PCR using forward primer (5'-TTGGCTAT-TAAACAGTATGGA-3') (SEQ ID NO:21) and reverse primer (5'-GGATCCCGATAACAAATG-3') (SEQ ID NO:22). Extensor Long PCR ReddyMix Master Mix was used for all PCR reactions. The PCR products were analysed by 1% agarose gel electrophoresis.

Verification of Mutant N1L VACV:

CV-1 Cells were infected with purified plaques. Infected cells were harvested after 2 days of infection. VACV DNA was extracted using DNeasy Blood & Tissue Kit according to the manufacturer's protocol. To verify the deletion of the N1L gene, a DNA fragment spanning the N1L gene and the L026 gene was amplified by PCR using forward primer (5'-TATCTAGCA ATGGACCGT-3') (within the N1L gene) (SEQ ID NO:23) and reverse primer (5'-CCGAAGGTAGTAGCATGGA-3') (within the L026 gene) (SEQ ID NO:24). A control DNA fragment spanning the A46R and A47L genes was amplified by PCR using forward primer (5'-TTGGCTATTAAACAGTATGGA-3') (SEQ ID NO: 25) and reverse primer (5'-GGATCCCGA-TAACAAATG-3') (SEQ ID NO:26). Extensor Long PCR ReddyMix Master Mix was used for all PCR reactions. The PCR products were analysed by 1% agarose gel electrophoresis.

Excision of RFP Using Cre Recombinase:

pCAG-Cre (from Addgene) was transfected into CV-1 cells in one well of six-well plate. Twenty-four hours after transfection with pCAG-Cre, CV-1 cells were infected with 100-200 PFU of Cre-RFP VACV. Two days later, RFP-negative plaques were picked, and used to infect CV-1 cells in six-well plates to purify RFP-negative plaques. Then RFP-negative plaques were picked and CV-1 cells were infected until no RFP-positive plaques were seen under fluorescence microscopy every 2 days. The excision of RFP from the virus by Cre recombinase was tested by PCR of RFP gene.

Excision of RFP Using Flp Recombinase:

pCAG-Flpe (from Addgene) was transfected in CV-1 cells in one well of six-well plate. Twenty-four hours after transfection with pCAG-Flpe, CV-1 cells were infected with 100-200 PFU of Flp-RFP VACV. Two days later, RFP-negative plaques were picked, and used to infect CV-1 cells in six-well plates to purify RFP-negative plaques. Then RFP-negative plaques were picked and CV-1 cells were infected until no RFP-positive plaques were seen under fluorescence microscopy every 2 days.

Generation of VVL-DD and WL-DD STC Viruses:

The generation of VVL-DD virus without RFP was described previously (Yuan, M. et al., Mol Ther-Meth Clin D 2 (2015)). The VVL-DD STC was created in the same way as with the VVL-DD virus, but using TK-STC shuttle vector (FIG. 3) instead of TK shuttle (Yuan, M. et al., Mol Ther-Meth Clin D 2 (2015)). VVL-DD STC virus is a FRP-negative virus with N1L deletion and STC inserted into TK region.

Enzyme-Linked Immunosorbent Assay:

The expression of mIL-12, hIL-12, mIL-21 and hIL-21 was detected by enzyme-linked immunosorbent assay (eBioscience, UK) following the manufacturer's instructions.

Mass Viral Production:

The primary viral expansion from above was rapidly freeze-thawed twice and diluted into the necessary volume of 5% FCS CM required to infect between 36-40 T175 flasks containing CV1 cells (at 80-90% confluence). 48 hr later, infected CV1 cells were scrape harvested and through repeated rounds of centrifugation at a speed of 2,000 rpm (at 4° C.), collected into a single pellet. The pellet was washed in PBS, re-suspended in 12 mls of 10 mM Tris-HCl (pH 9) buffer and stored at −80° C. for purification at a later date.

Viral Purification:

The concentrated viral lysate suspension from above was freeze-thawed twice and transferred to a dounce homogeniser (Thermofisher) and homogenised via 60 strokes. It was then ultrasonicated for 30 seconds. Following centrifugation at 2,000 rpm at 4° C. for 5 minutes, the supernatant (containing released virion particles) was collected and diluted to a total volume of 30 mls with 10 mM Tris-HCl buffer. The solution was divided into four; each layered gently onto 17 ml of a 36% glucose solution in a 36 ml Beckman ultracentrifuge tube and centrifuged at 13,500 rpm for 80 minutes at 4° C. The resulting pellets were re-suspended to a total of 16 mls in 10 mM Tris-HCl, divided into 4 again and carefully layered onto another four glucose gradients, this time graded from 25% w/m near the surface to 40% at the base of each tube. A second round of ultracentrifugation was performed. This was necessary to remove further particulate cellular debris, which could be toxic when administered intravenously into mice. The final pellets were re-suspended in 1-4 mls of viral re-suspension buffer (PBS; 10% glycerol; 138 mM NaCl; pH 7.4). A sample of purified virus was titrated via a TCID50 assay as described below.

Viral Replication

Cells were seeded at 2 to $4\times10^5$ cells per well, depending on growth rates, in three wells of 6-well plates in media with 10% FCS, and infected with 1 PFU/cell of vaccinia viruses 16-18 hours later. Samples were harvested in triplicate at 24-hour intervals up to 144 hours. Viral replication was detected by TCID50 (50% tissue culture infective dose) as previously described (Wang, Y. et al., J. Clin. Invest. 119, 1604-1615 (2009)).

Evaluation of Viral Cytotoxicity In Vitro

Cells were seeded at $1\times10^3$ and $1\times10^4$ cells per well, depending on growth rates, in 96-well plates, and infected with viruses 16-18 hours later. Cell survival on day 6 after viral infection was determined by MTS assay and EC50 value (viral dose killing 50% of tumour cells) was calculated as previously described (Wang, Y. et al., J. Clin. Invest. 119, 1604-1615 (2009)). All assays were performed at least three times.

In Vivo Efficacy Experiments for Comparison of Different Strain VVs:

Flank tumours were established in 10 mice per treatment group through subcutaneous injection of $1\text{-}5\times10^6$ cancer cells and allowed to reach 0.4-0.5 cm in diameter, then the mice were regrouped by tumour size and received three 50 μl IT injections of $1.0\times10^7$ PFU (nude mice) or $1\times10^8$ PFU (immunocompetent mice) or PBS on days 1, 3 and 5 or days 1, 2, 3, 4, 5. Tumour volumes were estimated (Volume= (length× width$^2$×π)/6) twice weekly until mice were sacrificed when tumour volume reached 1.00 cm3 or had been present for three months. 4-5 week male mice strains BALB/c and C57BL/6 were obtained from Harlan UK Ltd.

Efficacy of IT Injected VVL Recombinant Against Pancreatic and Colorectal Flank Tumour Models:

Either $2\times10^6$ CT26 cells or $3\times10^6$ DT6606 cells were subcutaneously implanted into the shaved right flanks of BALB/c or C57BL/6 male mice. Once tumour volumes had reached approximately 100 mm$^3$, they were randomised into three groups and a dose of 1×10⁸ PFU of virus in 50 μl PBS or 50 μl PBS vehicle buffer control was injected as per the treatment schedules outlined in Table 3 (schedule 1 and 2). Tumour volumes were monitored via twice weekly calliper measurement and mice were weighed weekly.

Efficacy of IV Injected VVL Recombinant Against Pancreatic Tumour Models:

3×10⁶ DT6606 were subcutaneously implanted into the shaved right flanks of C57BL/6 male mice. DT6606 cells (3×10⁶ cells/mouse) were implanted subcutaneously into the right flanks of eight week-old male C57/Bl6 mice. When the tumours were palpable mice were stratified into treatment groups. Mice received 10 mg/kg CAL101 or vehicle buffer via oral gavage three hours prior to virus (or PBS) injection at 1×10⁸ PFU/injection on days 1, 3 and 5 and tumour growth measured twice a week. Viruses were re-suspended in PBS injected intravenously via a tail vein. αPD-1 antibody was re-suspended in PBS at final concentration of 200 μg/mouse and injected at day 3, 6 and 8. Tumour volumes were monitored via twice weekly calliper measurement and mice were weighed weekly.

Efficacy of Intraperitoneally (IP) Injected VVL Recombinant Against Disseminated Pancreatic Tumour Models in Syrian Hamsters:

1×10⁷ SHPC6 cells were seeded into the lower right peritoneal cavity of Syrian hamsters. Four days later, 10 hamsters per group were injected i.p with 500 μl PBS or 2×10⁷ PFU virus on days 0, 2, 4. The survival of hamsters was monitored.

Quantitative Polymerase Chain Reaction to Assess Viral Load in Tumours:

Viral DNA extraction was performed using the Qiagen DNeasy Blood & Tissue Kit. Quantification of viral genome copy number was achieved using the TaqMan@ PCR system provided by Applied Biosystems. For VV quantification, the primers and probe were designed for the Vaccinia virus late transcription factor 1 (VLTF-1) gene: Forward; 5'-AAC-CATAGAAGCCAACGAATCC (SEQ ID NO: 70), reverse; 5'-TGAGACATACAAGGGTGGTGAAGT (SEQ ID NO:71), probe; sequence ATTTTAGAACAGAAATACCC (SEQ ID NO:72). The primers were supplied by Sigma-Aldrich. The standard was WT VV DNA, and 40 ng of DNA was used per sample as the template. Viral genome copy number was normalised by total DNA loaded.

Statistical Analysis:

Unless otherwise mentioned, Graphpad Prism 5 was used for comparative statistical analysis. Dual condition comparisons were made using the unpaired student t test. For more than one condition or for an additional variable such as time, a 1 or 2-way ANOVA respectively was performed. Post hoc tests (Knewman-Keuls for 1-way ANOVA and Bonferroni for 2-way ANOVA) compared specific pairs of conditions within the experiment. Survival data was represented as a Kaplan-Meier plot with log rank analysis to delineate whether any differences between groups were statistically significant.

Example 1: Comparison of the Plaque and Comet Tail Formation of VVL15, VVL15-B5R-STC and VVL15 B5R S-STC VV In Vitro To generate a virus which produces more EEV than the VVL15 virus, VVL15-B5R-STC and VVL15 B5R S-STC VV were created. B5R-STC in VVL15-B5R-STC virus or B5R S-STC in VVL15 B5R S-STC replaces the full length of B5R gene respectively (FIG. 1). CV-1 cells in 6-well plates were infected by equal amount of control virus VVL15, VVL15-B5R-STC and VVL15 B5R S-STC VV. Three days post infection, the infected cells were stained using crystal violet as described previously 16. VVL15-B5R-STC and VVL15 B5R S-STC VV formed smaller size plaques and more comet tails indicating that they produced more EEV compared to VVL15 (FIG. 2).

Example 2: Generation of VVL15 TK-STC Virus

Figure 4:
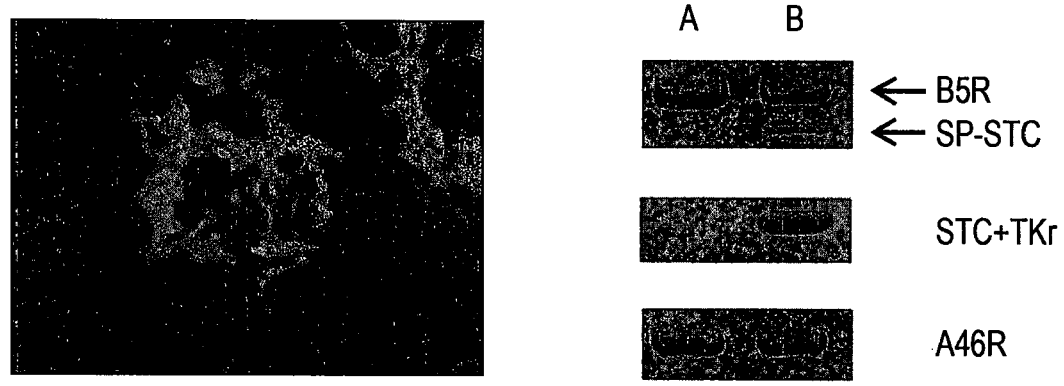
FIG. 4 shows confirmation of VVL15 TK-STC virus. A: VVL15 RFP virus. B: VVL15 TK-STC virus. Final round of VVL15 TK-STC plaque purification confirmed that all colonies within a well of CV1 cells were expressed RFP. The specific primer pairs to amplify the STC gene and part of the downstream TK gene by PCR from viral DNA extracted from CV1 lysates were used. The PCR product was absent in the VVL15 RFP DNA but present in the VVL15 TK-STC DNA, which indicates a TK gene deletion in the VVL15 TK-STC and the presence of STC in the TK region. Forward primer on SP of B5R gene and reverse primer on B5R cytoplasmic tail were used in the PCR to amplify the whole B5R gene and mutant B5R STC. Full length B5R was present in VVL15 RFP and VVL15 TK-STC, while mutant SP-STC only was present in VVL15 TK-STC as expected.

The modified VVL15-B5R-STC and VVL15 B5R S-STC VV (FIG. 1) formed smaller sized plaques and more comet tails (FIG. 2) than the control virus VVL15. To make a modified VV which produces normal plaque size and more EEV compared to the backbone virus VVL15, the VVL TK-STC vaccinia virus was generated as illustrated in FIG. 3, the STC replacing the TK gene (Stalk, TM and CT), and this virus retains an intact copy of B5R. For purification of the VVL TK-STC vaccinia virus, visual inspection (under red fluorescent light) of the final round of plaque purification confirmed that all plaques within a well of infected CV1 cells expressed RFP from the STC-TK shuttle vector (FIG. 4). The specific primer pairs to amplify the STC gene and partial of TK downstream gene by PCR from viral DNA extracted from CV1 lysates were used for validation of the virus. The PCR product was absent in the VVL15 RFP DNA but present in the VVL15 TK-STC DNA, which indicated the TK gene was deleted in the VVL15 TK-STC and the STC was in the TK region. Forward primer designed against SP of B5R gene and reverse primer recognising the B5R cytoplasmic tail were used in the PCR to amplify the whole B5R gene and STC. Full length B5R was present in VVL15 RFP and VVL15 TK-STC, while STC was only present in VVL15 TK-STC as expected (FIG. 4).

Figure 5:
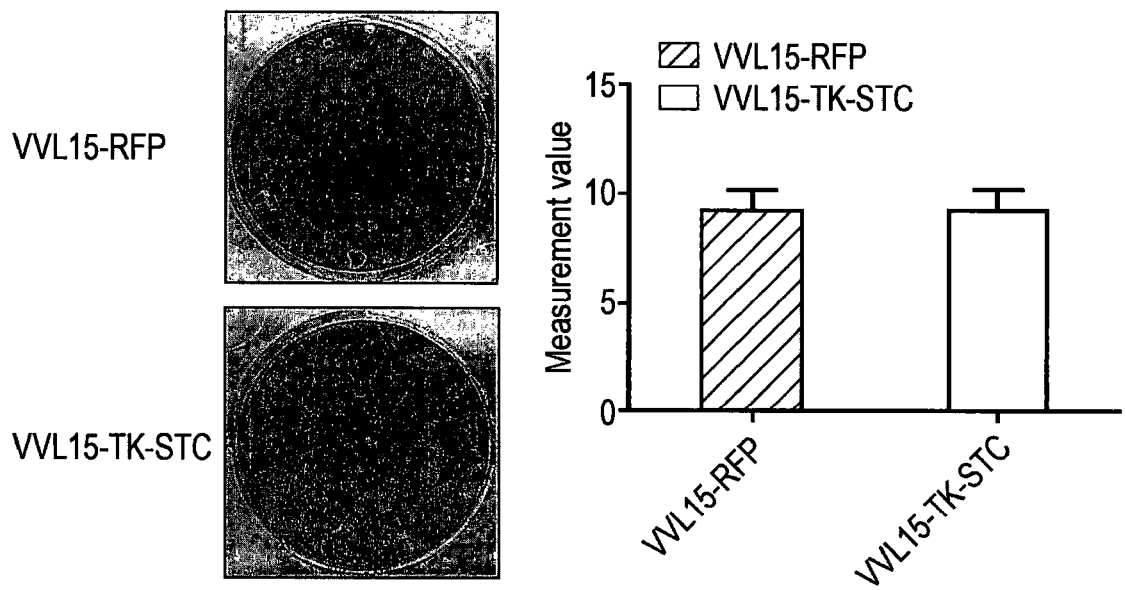
FIG. 5 shows a comparison of the plaques of vaccinia viruses. CV-1 cells in 6-well plates were infected by diluted control virus VVL15 RFP, recombinant VVL15 TK-STC and overlayed with agarose gel. Three days later, the agarose gel was removed and the cells stained using crystal violet. Plates were photo scanned shown on the left. The size of plaques was measured using Image J shown on the right.
Figure 6:
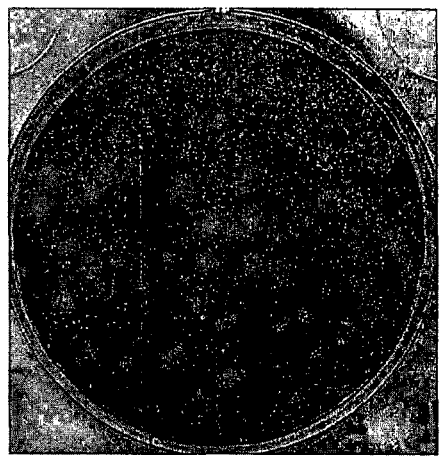
FIG. 6 shows a comparison of the plaque and comet tail formation of vaccinia viruses. CV-1 cells in 6-well plates were infected by control virus VVL15 RFP and recombinant VVL15TK STC. Three days post infection, the cells were stained using crystal violet and the plates photo scanned.
Figure 6:
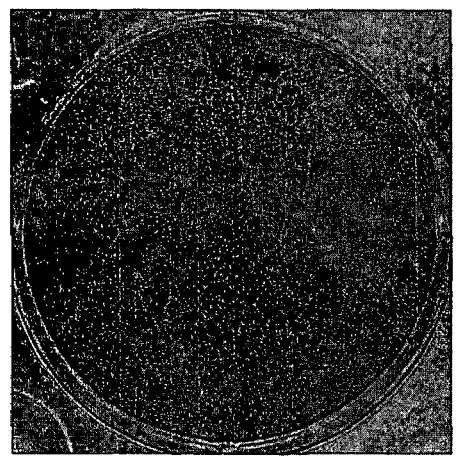

Example 3: Comparison of the Plaque and Comet Tail Formation of VVL15 TK-RFP and VVL TK-STC VVin Vitro The VVL15 TK-STC virus retains its copy of the B5R gene intact and has an additional STC insertion into the TK gene region, inactivating viral TK for tumour selectivity. To evaluate the plaque and comet tail formation of the VVL15 TK-STC virus, CV-1 cells in 6-well plates were infected by equal amount of control virus VVL15 TK-RFP and VVL15 TK-STC. Three days post infection, the infected cells were stained using crystal violet as described previously 16, and the plates were photo scanned (FIGS. 5 and 6). VVL15 TK-STC generated normal sized plaques (FIG. 5) and produced more comet tails (FIG. 6) compared to VVL15 TK-RFP.

Example 4: Assessment of EEV Production in Recombinant VVL15 TK-STC

Figure 7:
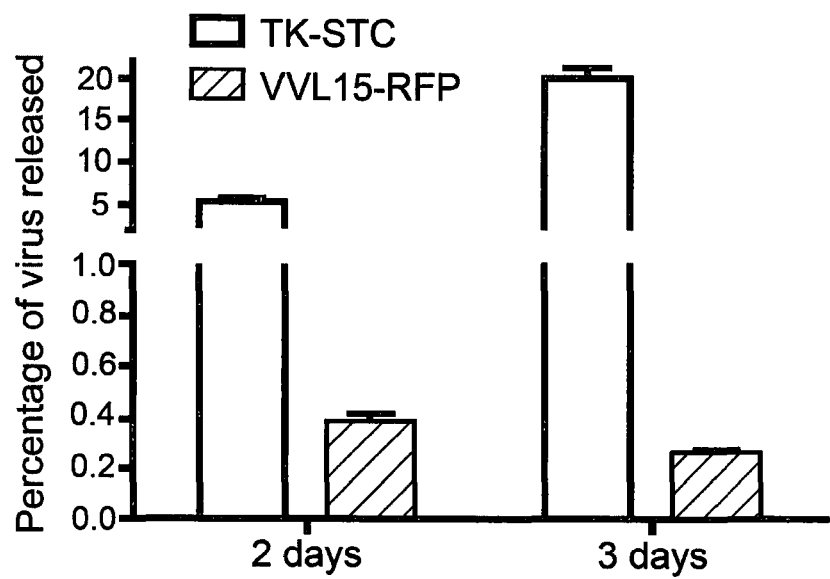
FIG. 7 shows EEV production by VVL15 RFP and VVL15TK STC viruses in CV1 cell line. 0.01 PFU/cell VV was used to infect CV-1 cells in 6-well plates. Cell culture medium and the infected cells were collected into separate tubes 48 and 72 hours post infection and viruses were titrated respectively. The ratio of EEV produced was calculated by comparing the total amount of virus recovered from the cell culture medium with the total amount of virus recovered from infected cells.

To quantify the EEV produced in the VVL15 TK-STC virus and its control virus, 0.01 pfu/cell of vaccinia viruses were used to infect CV-1 cells in a 6-well plate. Cell culture medium and the infected cells were collected into separate tubes 48 and 72 hours post infection and viruses were titrated respectively. The amount of EEV produced was calculated by comparing the total amount of VV in the cell culture medium with the total amount of VV produced by the infected cells. VVL15 TK-STC produces 10 times more EEV at 48-hour post-infection and 30 times more EEV at the 72 hour time-point compared to its parental virus VVL15 RFP (FIG. 7).

Example 5: Assessment of EEV Production in Recombinant VVL-DD STC

Figure 8:
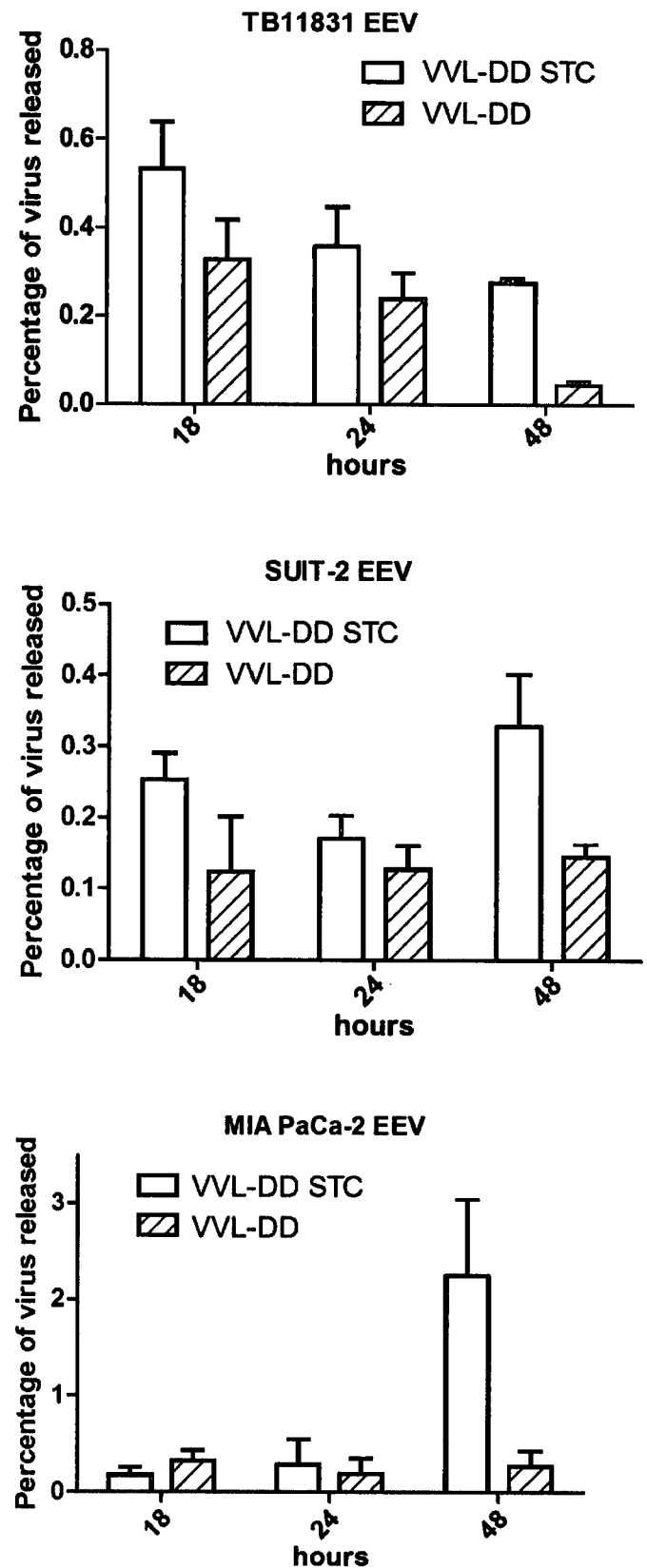
FIG. 8 shows EEV production by VVL-DD and VVL-DD STC viruses in pancreatic cancer cell lines. 0.01 PFU/cell VV was used to infect cells in 6-well plates. Cell culture medium and the infected cells were collected into separate tubes 18, 24 and 48 hours post infection and viruses were titrated respectively. The ratio of EEV produced was calculated by comparing the total amount of virus recovered from the cell culture medium with the total amount of virus recovered from infected cells. TB11831: mouse pancreatic cancer cell line, STUIT-2 and MIA PaCa-2 are human pancreatic cancer cell lines.
Figure 8:
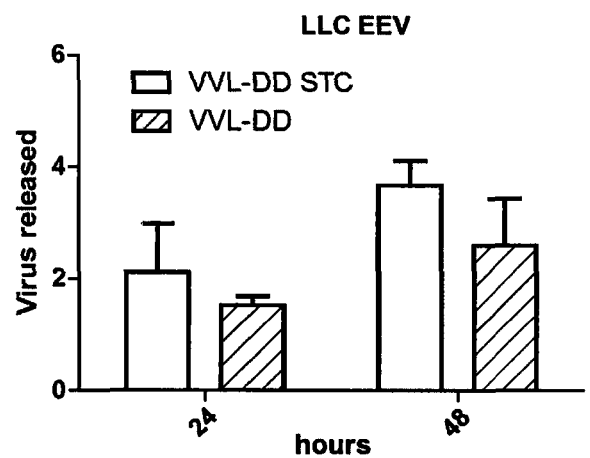
Figure 8:
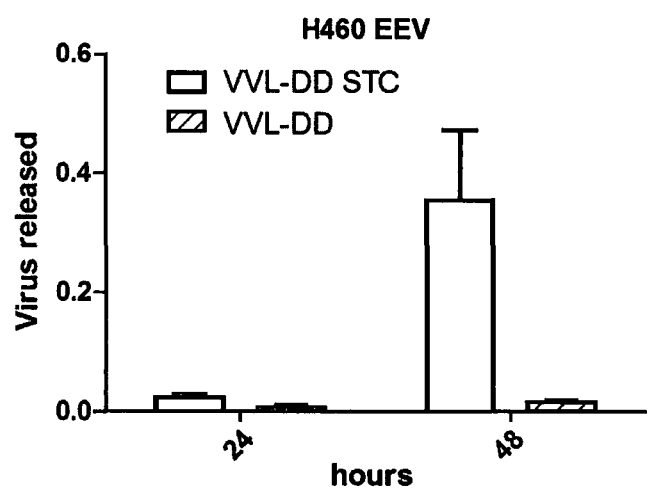
Figure 9:
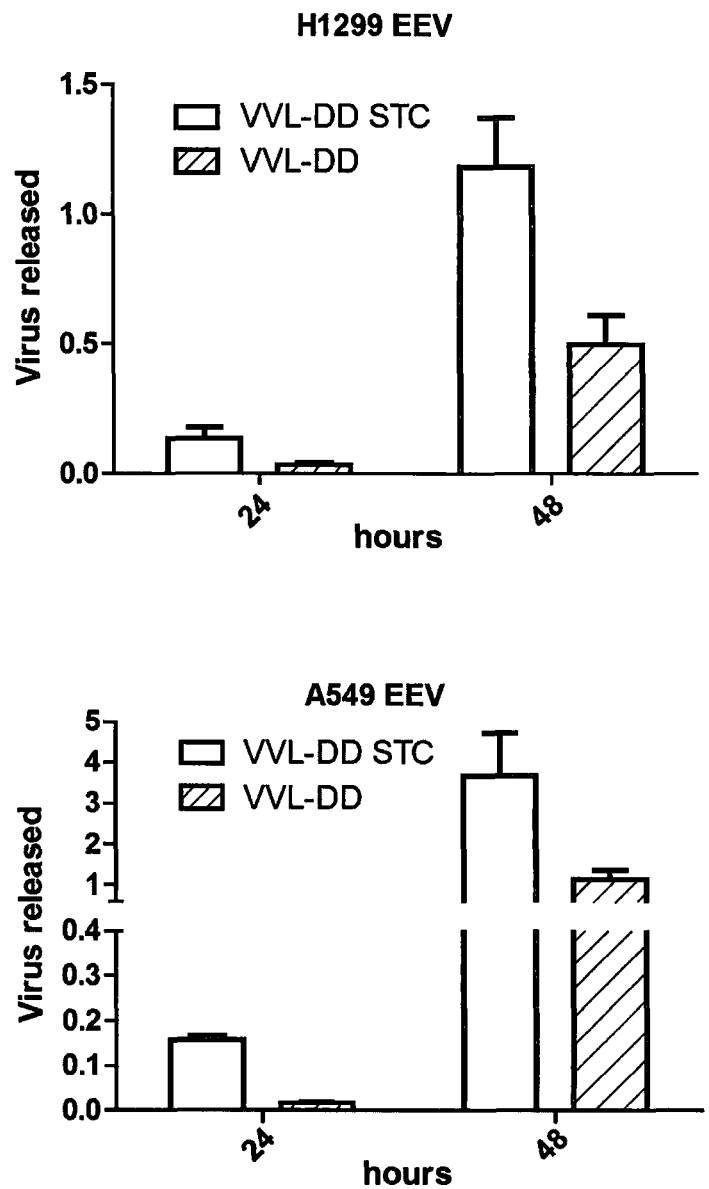
FIG. 9 shows EEV production by VVL-DD and VVL-DD STC viruses in lung cancer cell lines. 0.01 PFU/cell VV was used to infect cells in 6-well plates. Cell culture medium and the infected cells were collected into separate tubes 18, 24 and 48 hours post infection and viruses were titrated respectively. The ratio of EEV produced was calculated by comparing the total amount of virus recovered from the cell culture medium with the total amount of virus recovered from infected cells. LLC: mouse lung cancer cell line. H460, H1299MIA and A549 are human lung cancer cell lines.

Recombinant VVL-DD and VVL-DD STC viruses were created. VVL-DD is the virus with TK and N1L regions deleted (also named as VVΔTK-ΔN1L). VVL-DD STC is the virus with TK and N1L regions deleted and STC inserted into TK region (also named as VVΔTK-STC-ΔN1L). To quantify the EEV produced in the VVL-DD STC virus and its control virus (VVL-DD), 0.01 pfu/cell of vaccinia viruses were used to cells in a 6-well plate. Cell culture medium and the infected cells were collected into separate tubes 48 and 72 hours post infection and viruses were titrated respectively. The amount of EEV produced was calculated by comparing the total amount of VV in the cell culture medium with the total amount of VV produced by the infected cells. VVL-DD STC virus produces more EEV at the indicated time-points post-infection compared to its parental virus VVL-DD in pancreatic cancer cells (FIG. 8) and in lung cancer cells (FIG. 9).

Example 6: Comparison of the Replication and Cytotoxicity of VV In Vitro

Figure 10:
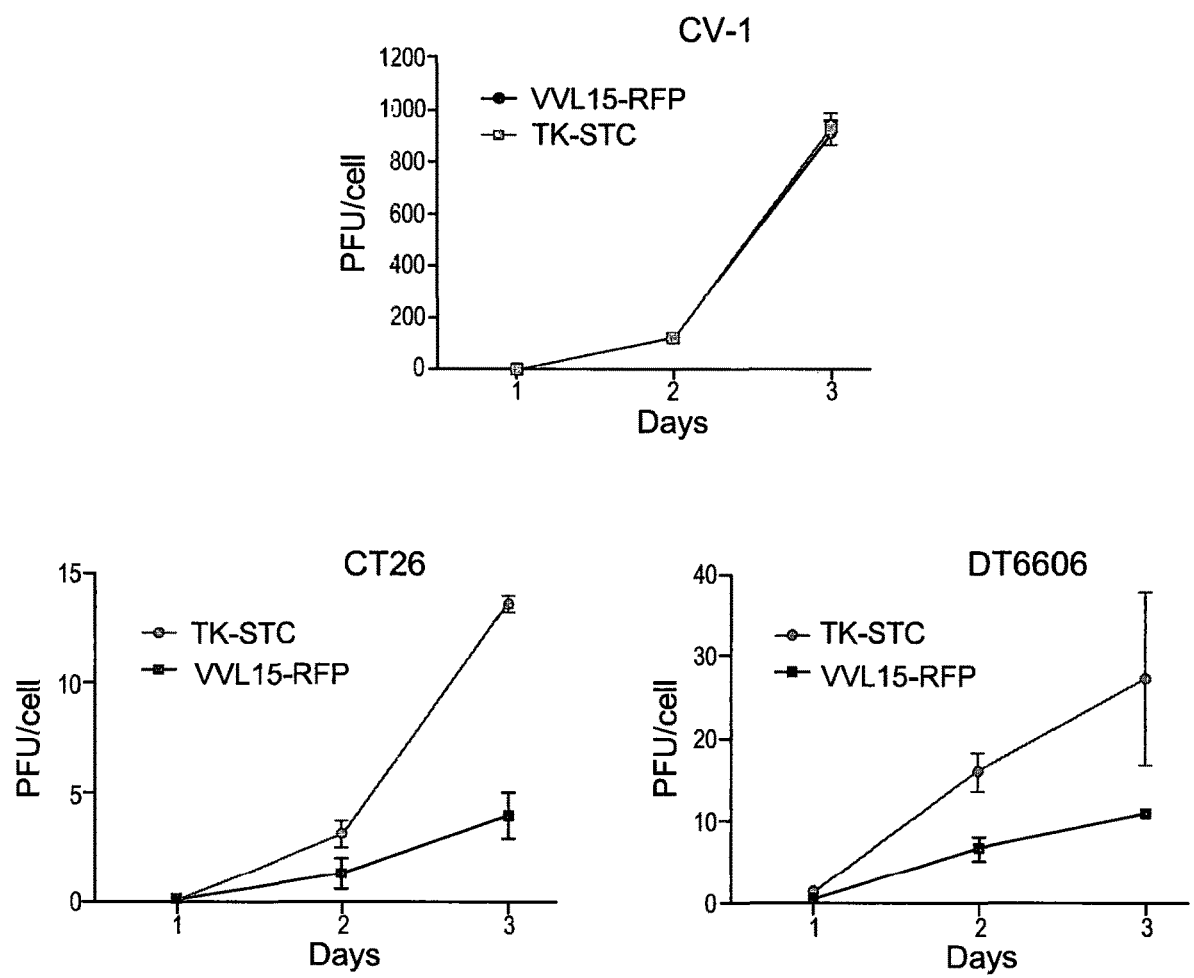
FIG. 10 shows replication VVL15 RFP and VVL15TK STC viruses in CV1 cell line. Viral titres in PFU/cell were determined by performing TCID50 assays on viral lysates collected at 24, 48 and 72 hours after infection with 1 PFU/tumour cell. Each assay was performed in triplicate.

The replication of VVL15 TK-STC and its parental VVL15 RFP virus was compared (FIG. 10). VVL15 TK-STC replicates more effectively than VVL15 RFP in CT26 (mouse colon cancer cell line) and DT6606 (mouse pancreatic cancer cell line) cancer cell lines.

Figure 11:
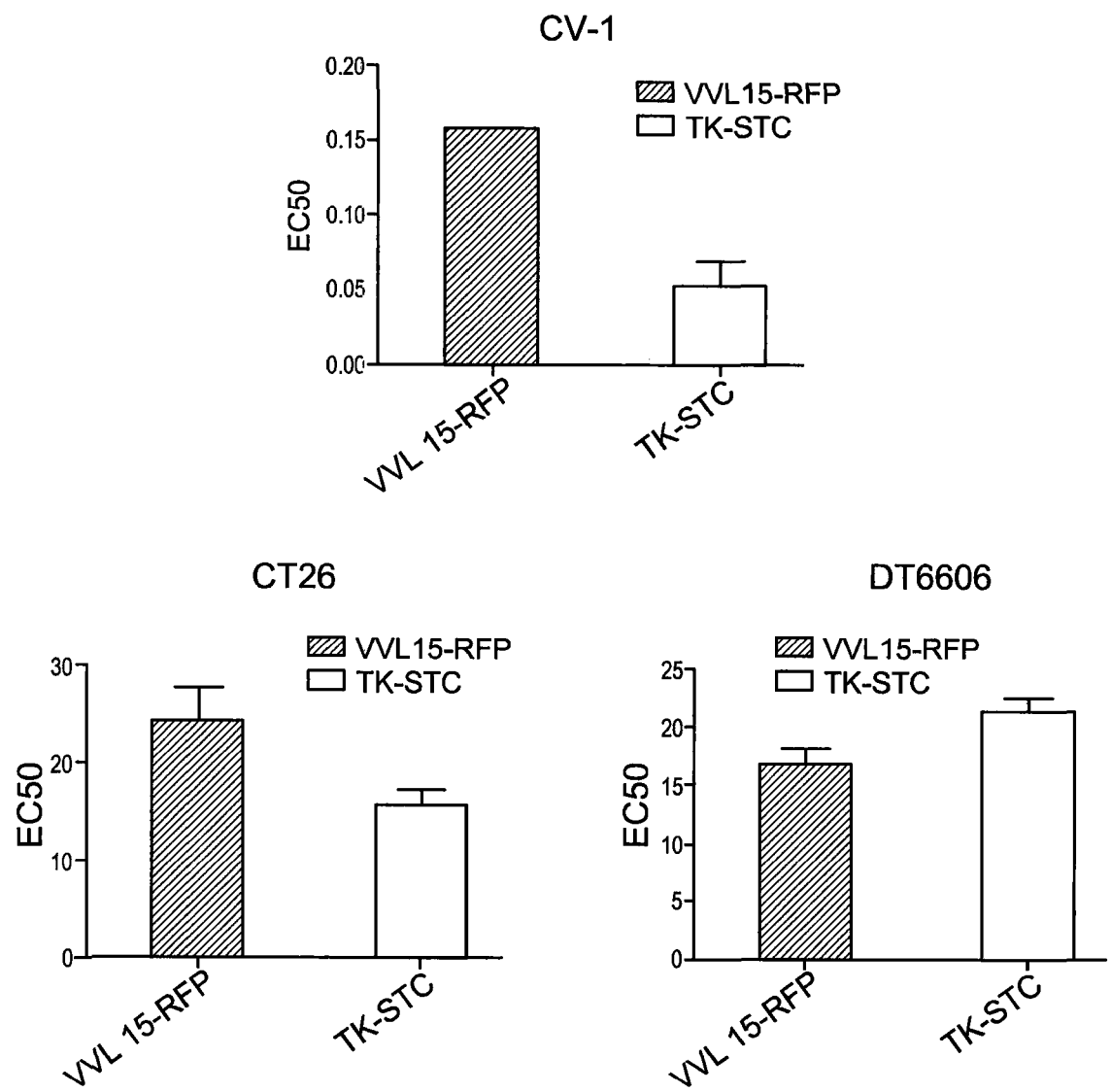
FIG. 11 shows a comparison of lytic potency between VVL15 RFP and VVL15TK STC viruses. MTS assays were performed to measure the cytotoxic potency of VVL15 RFP and VVL15TK STC viruses on cell lines CV1, CT26 and DT6606. The graph is a plot of EC50 values (virus doses used to kill 50% of the cells) taken from corresponding viral dose-response (percentage cell death) curves (not shown).

The cytotoxicity of VVL15 TK-STC and VVL15 RFP were measured in CV1, CT26 and DT6606 cell lines (FIG. 10). There was no significant difference in cytotoxicity between the two viruses in DT6606 cells. VVL15 TK-STC was significantly more potent than the parental VVL15 RFP at killing CV-1 and CT26 cells (FIG. 11).

Example 7: Comparison of the Anti-Tumour Potency of VV In Vivo

Figure 12:
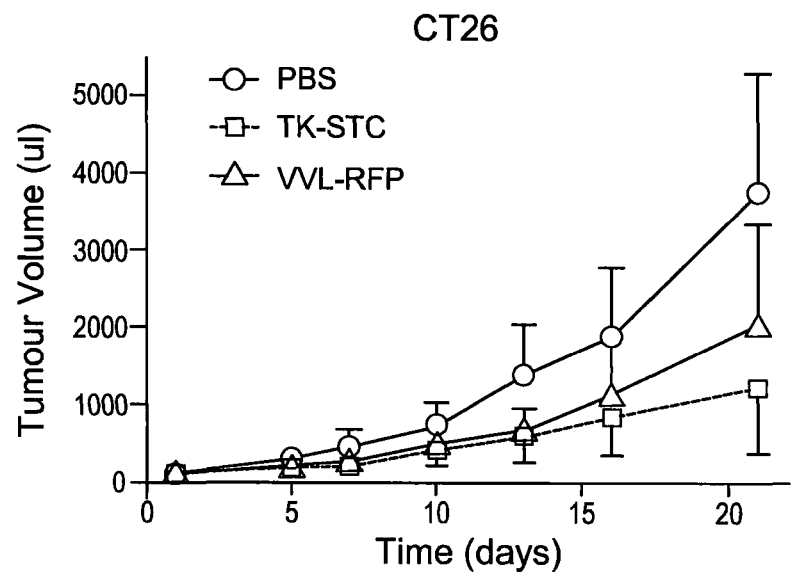
FIG. 12 shows VVL15TK STC was more efficacious than VVL15 RFP in a colon cancer model. Syngeneic CT26 subcutaneous flank models were established in Balb/C immunocompetent mice. When tumour volumes reached an average of 100 mm$^3$, daily doses (5 in total) of $1\times10^8$ PFUs of virus or the equivalent volume of vehicle buffer (50 μl of PBS) were injected IT (n=5-7 per group). Tumour growth was followed up via twice weekly calliper measurement.
Figure 13:
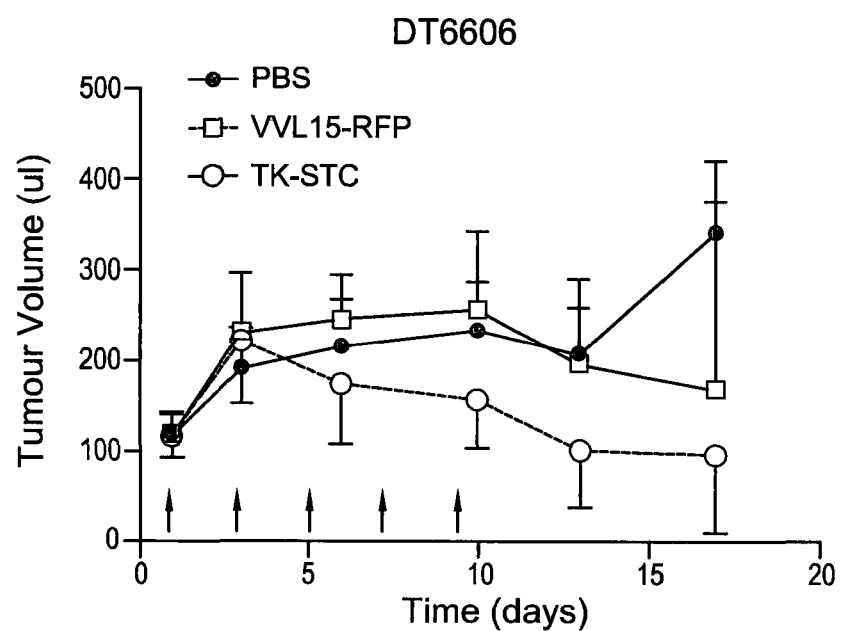
FIG. 13 shows VVL15TK STC was more efficacious than VVL15 RFP in a pancreatic cancer model. Syngeneic DT6606 subcutaneous flank models were established in immunocompetent C57/Bl6 mice. When tumour volumes reached an average of 100 mm$^3$, daily doses (5 in total) of $1\times10^8$ PFUs of virus or the equivalent volume of vehicle buffer (50 μl of PBS) were injected IT (n=5-7 per group). Tumour growth was followed up via twice weekly calliper measurement.

To test the anti-tumour potency of VVL15 TK-STC virus, subcutaneous models of CT26 colon cancer CT26 (FIG. 12) and DT6606 pancreatic cancer models (FIG. 13) were used. VVL15 RFP and VVL15 TK-STC viruses were injected intra-tumourally (FIGS. 12 and 13). For the CT26 tumour model, three doses of viruses at 2×107 PFU/injection were used at day 1, day 3 and day 5. For the DT6606 tumour model, five doses of viruses at 2×108 PFU/injection were used at the indicated time points (FIG. 13). VVL15 TK-STC consistently demonstrates improved anti-tumour efficacy compared to the control virus VVL15 RFP.

Figure 15:
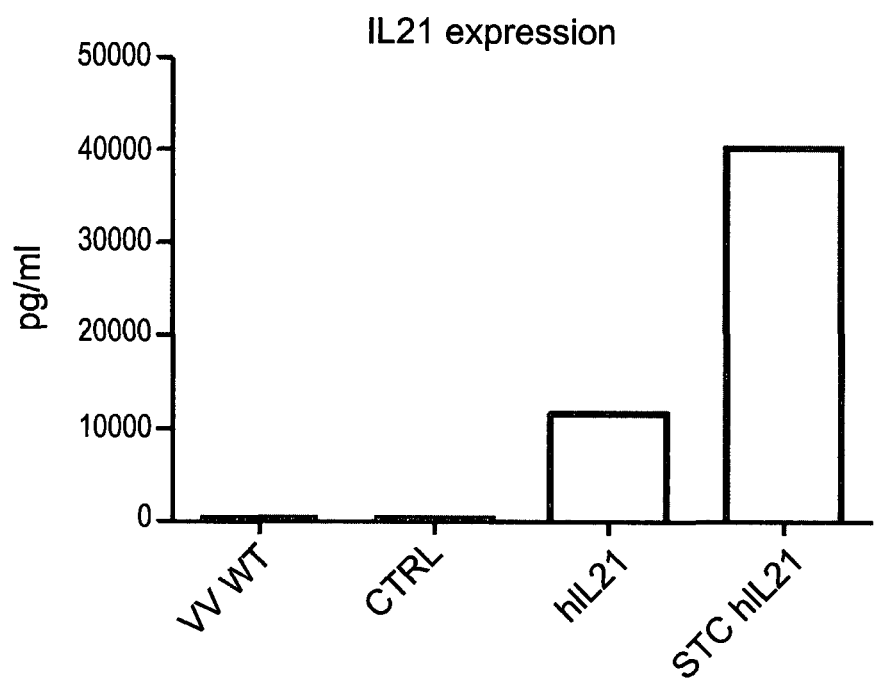
FIG. 15 shows confirmation of hIL-21 expression in the VTK-STC hIL-21 virus. The expression of hIL-21 in CV-1 cells was measured by ELISA three days post infection of wild-type VV (VV WT), TK-STC VV (CTRL), VVL12 N1L hIL-21 (hHIL21) and TK STC hIL-21.
Figure 16:
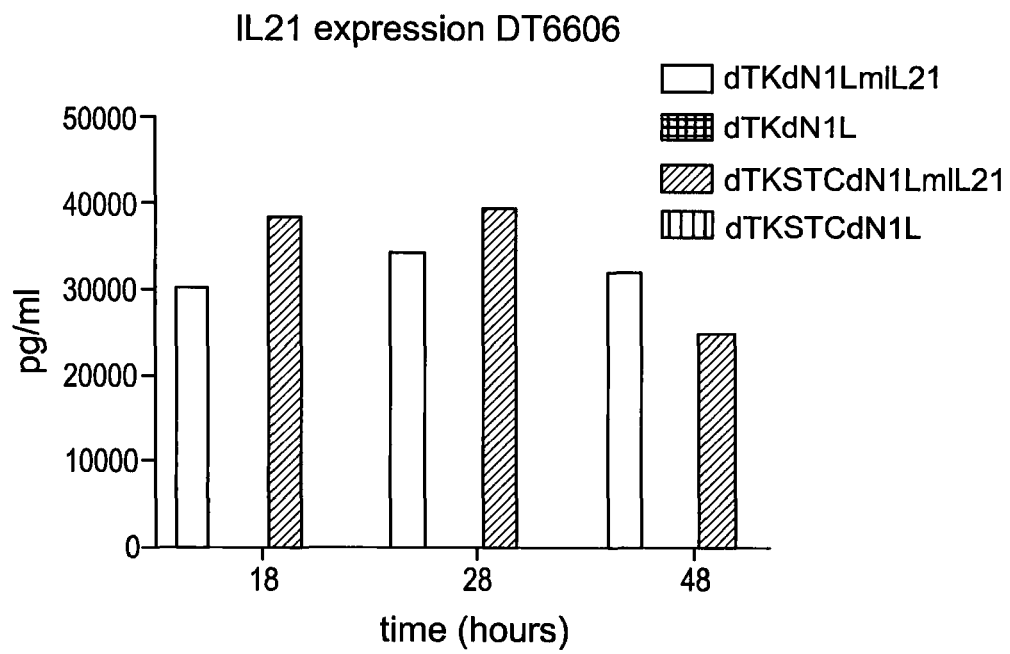
FIG. 16 shows confirmation of mIL-21 expression in the TK-STC mIL-21 virus. The expression of mIL-21 in DT6606 cells at indicated post infection time was measured by ELISA All the viruses used are TK and N1L gene deleted. mIL21 is expressed in the cells after virus infection. d=deletion.

Example 8: Creation of Human IL-21 (hIL-21) and Mouse IL-21 (mIL-21) Expressing VVL15 TK-STC Virus To improve anti-tumour immunity, VVL15 TK-STC virus was armed with interleukin-21 (IL-21), the NK cell and T cell stimulator cytokine. Human IL-21 (hIL-21) and mouse IL-21 (mIL-21) expressing viruses were created using the VVL15 TK-STC virus with RFP deletion as shown in FIG. 14, hIL-21 and mIL-21 were cloned into the N1L region (FIG. 14). The expression of hIL-21 and mIL-21 by the virus in infected cells was confirmed (FIGS. 15 and 16).

Example 9: Intravenous Injection of TK STC mIL-21 Virus Shows Superior Anti-Tumour Ability Compared the Control Virus without mIL-21

Figure 17:
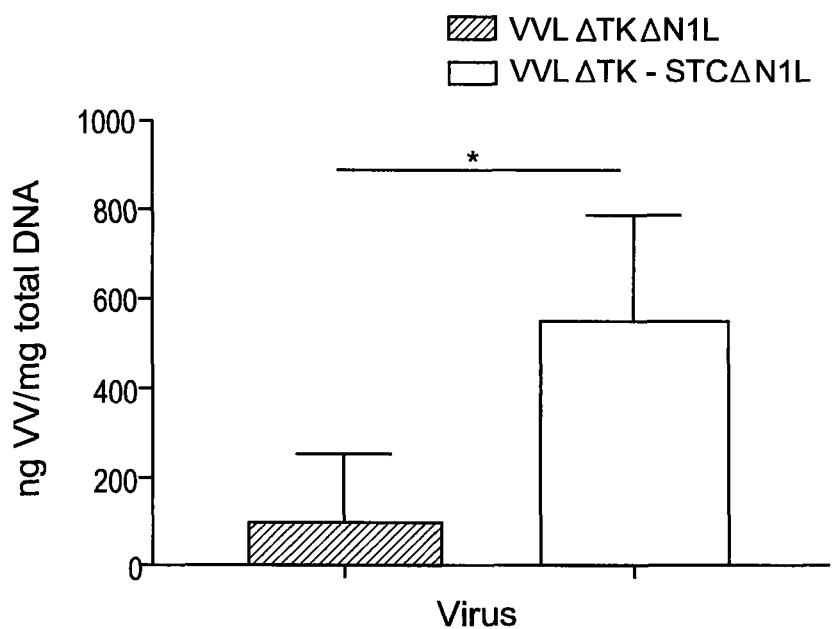
FIG. 17 shows VV presence within DT6606 tumours established subcutaneously in immunocompetent C57/B16 mice. Once palpable, mice were treated with CAL101 (10 mg/Kg) by oral gavage followed 3 hours later by intravenous injection using 1×10⁸ PFU/injection VVLΔTKΔN1L that doesn't contain a modified second copy of B5R, or VVLΔTK-STCΔN1L. Treatments were given on days 1, 3 and 5. 5 days following the last treatment, tumours were excised and viral load analysed using qPCR (n=3/group). A Students unpaired T test was used to compare viral load in the two groups (*p>0.05).
Figure 18:
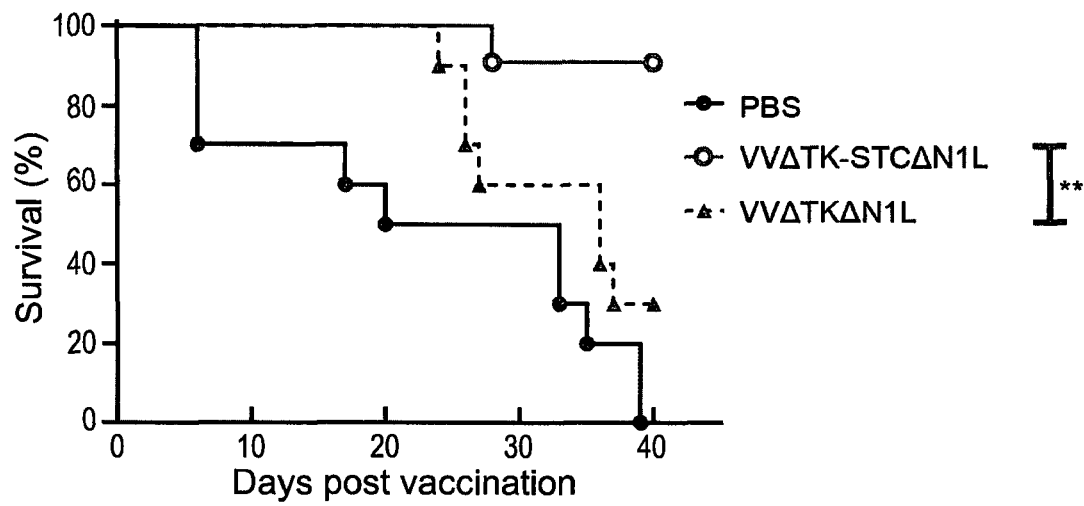
FIG. 18 shows SHPC6 tumours established intra-peritoneally in immunocompetent Syrian hamsters. Hamsters were treated with 1×10⁷ PFU/injection VVLΔTKΔN1L or VVLΔTK-STCΔN1L on days 4, 6 and 8 post tumour implantation. Kaplan-Meier survival analysis with Log rank (Mantel-cox) tests were used to assess survival (n=10/group).
Figure 19:
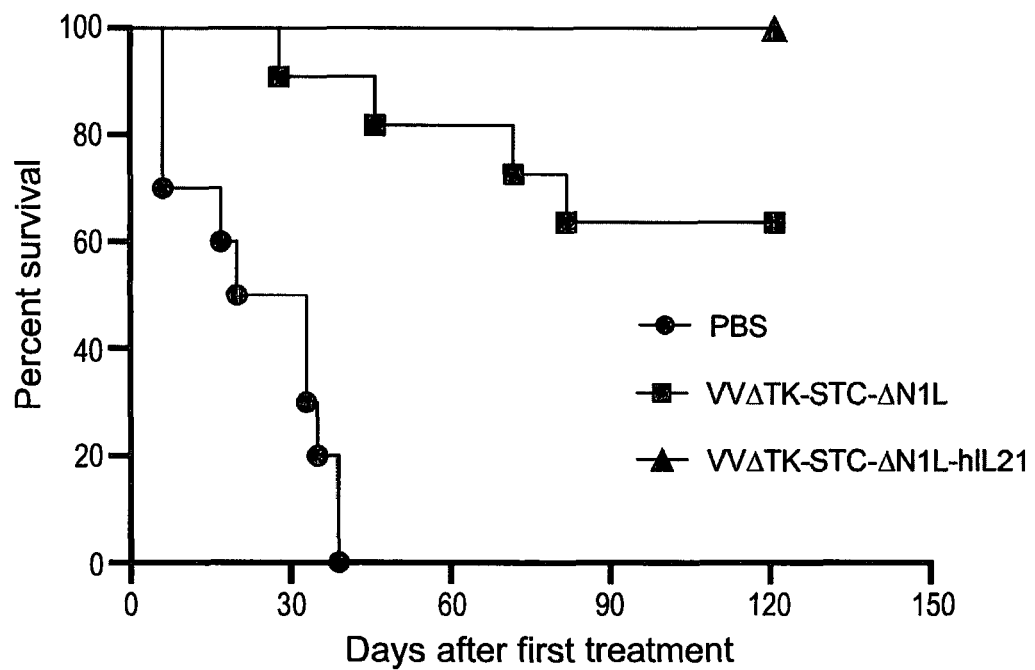
FIG. 19 shows SHPC6 tumours established intra-peritoneally in immunocompetent Syrian hamsters. Hamsters were treated with 1×10⁷ PFU/injection VVLΔTK-STCΔN1L and WVLΔTK-STC-ΔN1L-hIL21 on days 4, 6 and 8 post tumour implantation. Kaplan-Meier survival analysis with Log rank (Mantel-cox) tests were used to assess survival (n=10/group).
Figure 20:
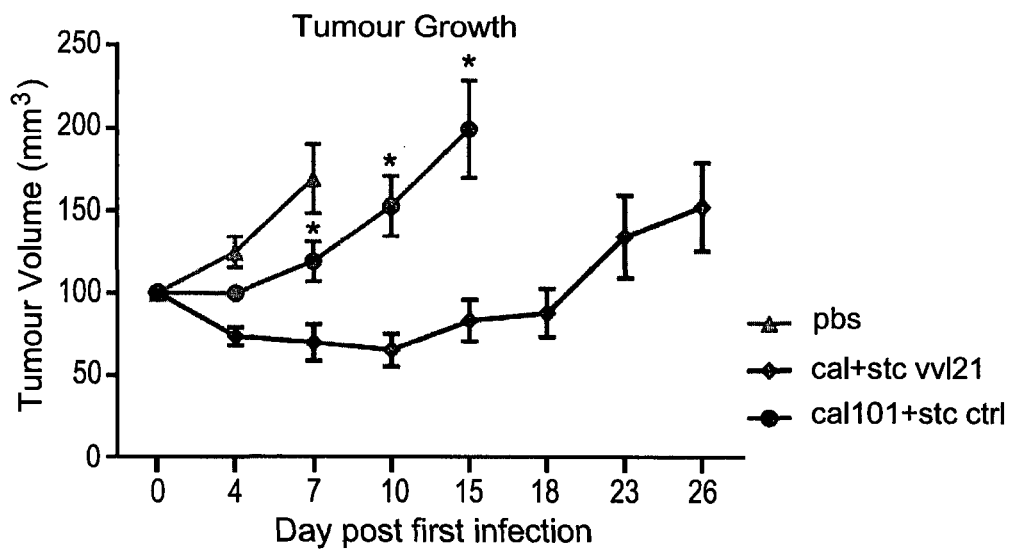
FIG. 20 shows treatment of cancer by combination of Cal101 (a transient inhibitor of macrophage) and VV. Cal 101 was administered by oral gavage 3 hours prior to i.v. injection of vaccinia virus, PBS, TK STC control virus (STC ctrl) and TK STC mIL-21 (STC VVI21). Tumour size was measured twice a week.

To prolong the persistence of VV after intravenous injection, a transient inhibitor of macrophage function, Cal101, was delivered three hours before VV was injected intravenously (i.v). The anti-tumour potency of TK STC mIL-21 was tested in the subcutaneous DT6606 tumour model. I.V delivery of TK STC mIL-21 shows improved anti-tumour potency compared to the unarmed TK STC control virus (no mIL-21 expression) (FIG. 16). Accumulation of Vaccinia virus DNA in tumours after injection was determined using qPCR 5 days after the last of 3 injections given on days 1, 3 and 5 (1×10$^8$ PFU/injection) (FIG. 17). The STC virus accumulated to higher levels compared to the control virus. The anti-tumour potency of TK STC mIL-21 was tested in the peritoneally disseminated SHPC6 pancreatic cancer model in Syrian hamsters. Intraperitoneal delivery of TK STC N1L deleted virus shows improved efficacy compared to the control virus in which no STC was present in the TK domain (FIG. 18). Furthermore, arming the TK-STC-N1L with IL-21 could cure the peritoneally disseminated pancreatic cancer in Syrian hamsters (FIG. 19).

Figure 21:
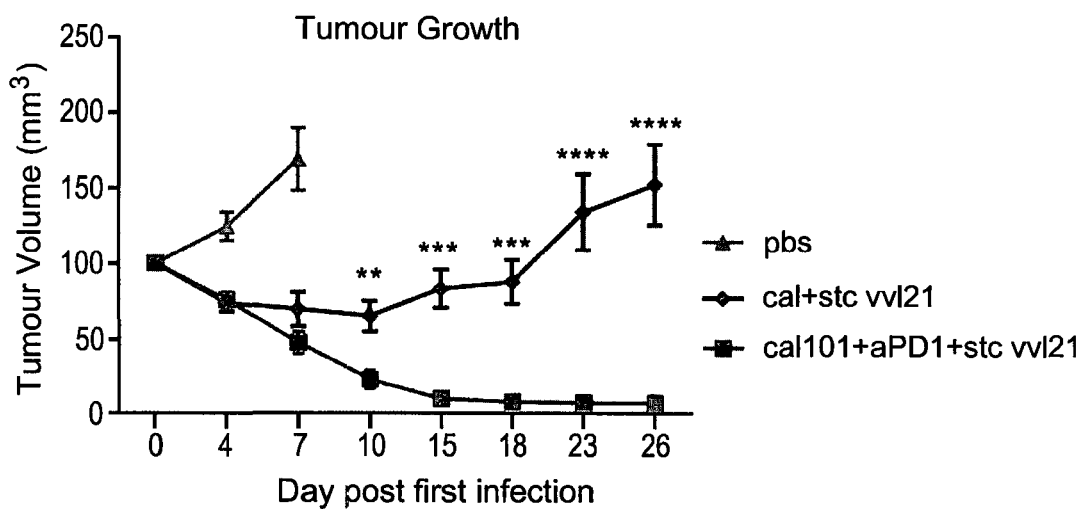
FIG. 21 shows treatment of cancer by combination of Cal101, anti-PD1 antibody and VV. Cal 101 was administered by oral gavage 3 hours prior to i.v. injection of PBS, TK STC control virus (STC ctrl) and TK STC mIL-21 (STC WVI21). Tumour size was measured twice a week. WVL-DD is also named as VVDTK-DN1L, VVL-DD STC is also named as VVDTK-STC-DN1L.

Example 10: Check Point Inhibitor Anti-PD-1 Antibody Improves the Anti-Tumour Effect of TK STC mIL-21 Virus Anti-PD-1 antibody is being widely used to enhance anti-tumour immunity in a range of tumour types and clinical evidence demonstrates a significant improval in survival of some cancer patients. To investigate whether anti-PD1 antibody could enhance the anti-tumour potency of TK STC mIL-21, anti-PD1 antibody was used in combination with Cal101 and i.v. injection of VV. The anti-PD1 antibody dramatically improves the anti-tumour potency of TK STC mIL-21 virus (FIG. 21). When the Cal101 and anti-PD1 antibody combination was used to treat tumours, inclusion of TK STC mIL-21 (STC VVI21) in the treatment regime significantly enhanced the anti-tumour effect of theCal101 and anti-PD1 antibody combination (FIG. 21).

Figure 23:
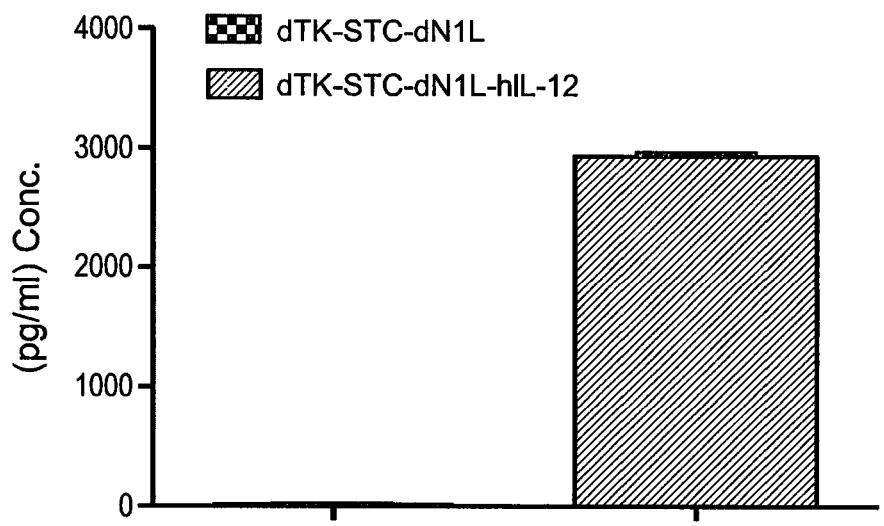
FIG. 23 shows confirmation of hIL-12 expression in the TK-STC hIL-12 virus. The expression of mIL-12 in CF Pac1 cells was measured by ELISA three days post infection of TK-STC vaccinia virus (dTK-STC-dN1L), TK-STC hIL-12 (dTK-STC-dN1L-hIL-12). VVL-DD is also named as VVDTK-DN1L, VVL-DD STC is also named as VVDTK-STC-DN1L.

Example 11: Creation of Human IL-12 (hIL-12) and Mouse IL-12 (mIL-12) Expressing TK STC Virus To improve anti-tumour immunity, VVL15 TK-STC virus was armed with interleukin-12 (IL-12), which stimulates most cells of the adaptive and innate immune system. Human IL-12 (hIL-12) and mouse IL-12 (mIL-12) expressing viruses were created using the VVL15 TK-STC virus with RFP deletion as the same strategy of making VVL15 TK-STC expressing IL-21 shown in FIG. 14, hIL-12 and mIL-12 were cloned into the N1L region (FIG. 14). The expression of mIL-12 and hIL-12 in infected cells by the virus was confirmed (FIGS. 22 and 23).

Figure 24:
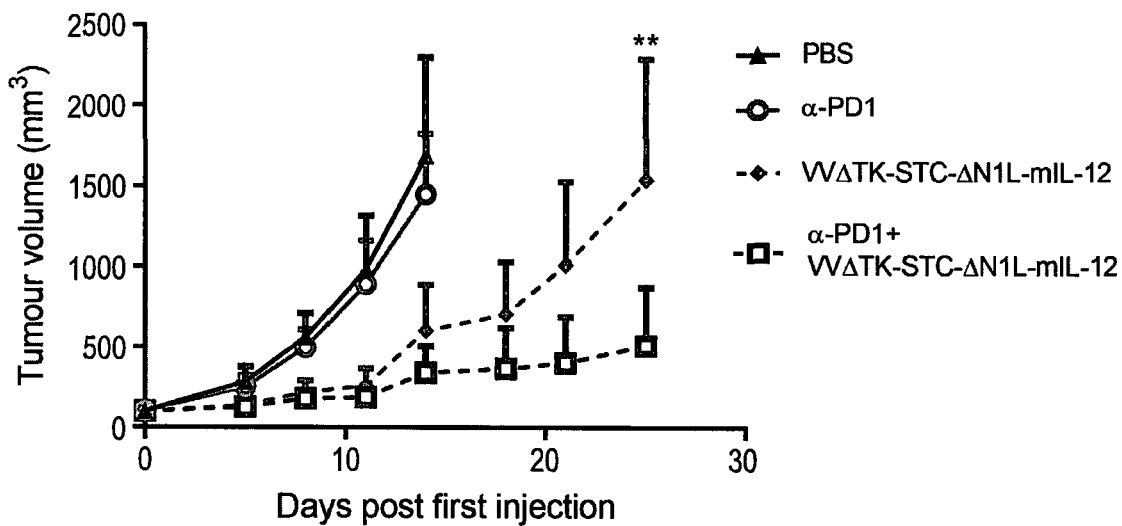
FIG. 24 show LLC lung cancer tumours established subcutaneously in immunocompetent C57/B16 mice. Once palpable, mice were treated with PBS intratumorally on days 1, 3, 5, 7, 9, 11 or αPD-1 antibody administered intraperitoneally at 200 µg/injection on days 1, 4, 7 or intertumoral injections of 1×108PFU/injection VVLΔTK-STCΔN1L-mIL12 on days 1, 3, 5 (followed by intraperitoneal injections of PBS on days 7, 9, 11) or VVLΔTK-STCΔN1L-mIL12 on days 1, 3, 5 followed by intraperitoneal injections of αPD-1 antibody on days 7, 9, 11). Tumour growth was monitored and is shown until the death of the first animal in each group. A two-way ANOVA with Bonferroni post-test was used to compare the significance at each timepoint.
Figure 25:
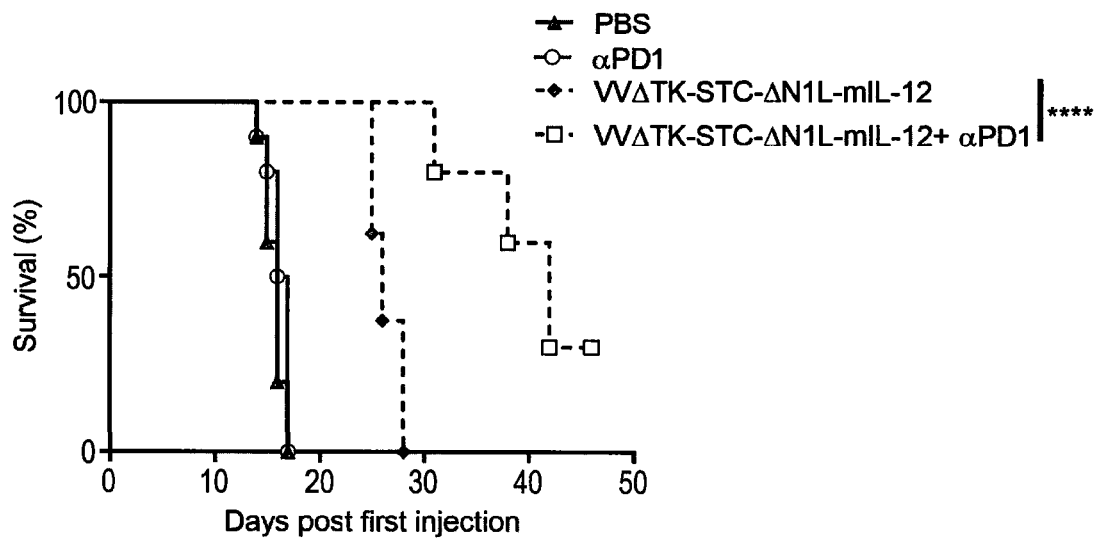
FIG. 25 show LLC lung cancer tumours established subcutaneously in immunocompetent C57/B16 mice. Once palpable, mice were treated with PBS intratumorally on days 1, 3, 5, 7, 9, 11 or αPD-1 antibody administered intraperitoneally at 200 µg/injection on days 1, 4, 7 or intertumoral injections of 1×10⁸ PFU/injection VVLΔTK-STCΔN1L-mIL12 on days 1, 3, 5 (followed by intraperitoneal injections of PBS on days 7, 9, 11) or VVLΔTK-STCΔN1L-mIL12 on days 1, 3, 5 followed by intraperitoneal injections of αPD-1 antibody on days 7, 9, 11). Kaplan-Meier survival analysis with Log rank (Mantel-cox) tests were used to assess survival (n=10/group).

Example 12: IL-12 Expressing TK STC Virus is Effective in Lung Cancer Models after Intratumoral Administration and Enhanced the Antitumour Efficacy of Checkpoint Inhibitor Anti-PD1 Antibody A subcutaneous lung cancer model was established in immunocompetent mice using Lewis Lung Carcinoma cells (LLC). Mice were treated intratumorally three times with STC-mIL12 virus (1×10$^8$ PFU/injection) on days 1,3,5. Where appropriate, α-PD1 antibody was administered on days 7, 9, 11 (200 μg/mouse). STC-mIL12 virus was more effective than PBS or α-PD1 antibody therapy alone at reducing tumor growth rate. Addition of α-PD1 antibody to the virus treatment further enhanced long term efficacy (FIGS. 24 and 25).

Example 13

Figure 26:
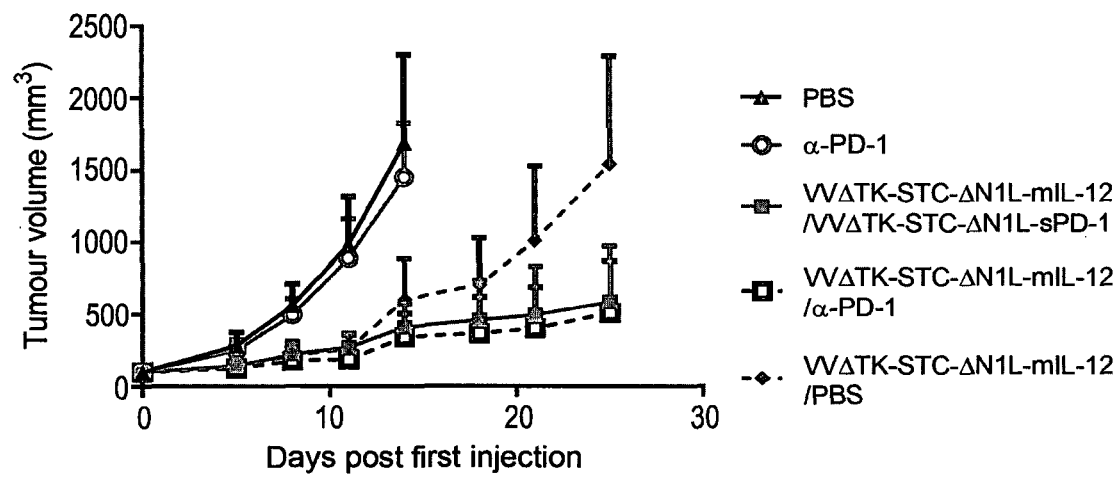
FIG. 26 shows LLC lung cancer tumours established subcutaneously in immunocompetent C57/BI6 mice. Once palpable, mice were treated with PBS intratumorally on days 1, 3, 5, 7, 9, 11 or αPD-1 antibody administered intraperitoneally at 200 µg/injection on days 1, 4, 7 or intertumoral injections of 1×10⁸PFU/injection VVLΔTK-STCΔN1L-mIL12 on days 1, 3, 5 (followed by intraperitoneal injections of PBS on days 7, 9, 11) or VVLΔTK-STCΔN1L-mIL12 on days 1, 3, 5 followed by intraperitoneal injections of αPD-1 antibody on days 7, 9, 11) or VVLΔTK-STCΔN1L-mIL12 on days 1, 3, 5 followed by VVLΔTKΔN1L-sPD1 (that expressed soluble PD1) on days 7, 9, 11. Tumour growth was monitored and is shown until the death of the first animal in each group.

The sequential use of viruses, first expressing IL12 and second expressing soluble PD1 is as effective as using virus expressing IL12 followed by α-PD1 antibody. The use of a virus expressing soluble PD1 was as effective as the use of an α-PD1 antibody (FIG. 26).

Example 14

Figure 27:
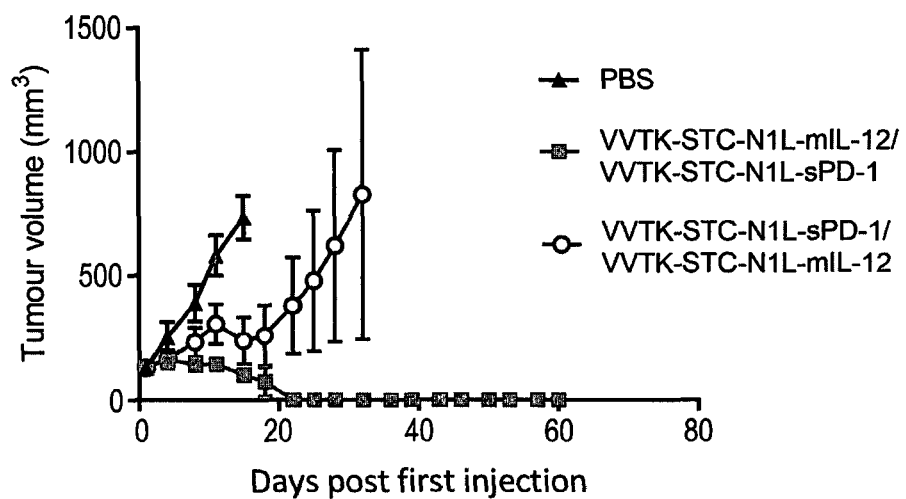
FIG. 27 shows CMT64 lung cancer tumours established subcutaneously in immunocompetent C57/B16 mice. Once palpable, mice were treated with PBS intratumorally on days 1, 3, 5, 7, 9, 11 or with 1×10⁸ PFU/injection WVLΔTK-STCΔN1L-mIL 12 on days 1, 3, 5 followed with VVLΔTKΔN1L-sPD1 on days 7, 9, 11 or vice versa. Tumour growth was monitored and is shown until the death of the first animal in each group.

Administration of the viruses expressing different immune-modulator molecules in certain orders is important (FIG. 27), i.e virus expressing mIL-12 must be delivered before the virus expressing soluble PD1 (sPD1) as if they are given in the other way round the superior anti-tumour effect is lost.

The invention claimed is:

1. A vaccinia virus vector comprising an intact native B5R gene and a nucleic acid sequence encoding a SCR1-, SCR2-, SCR3-, and SCR4- domain deleted B5R gene (B5R SCR1-SCR2-SCR3-SCR4) having at least 90% sequence identity with the nucleic acid sequence of SEQ ID NO:68 inserted into the TK gene of the vaccinia virus, and wherein the vaccinia virus produces 10- to 30-fold more infectious extracellular enveloped virus (EEV) than a native vaccinia virus while the total replication of the vaccinia virus is not attenuated.

2. A vaccinia virus vector according to claim 1 which further comprises a nucleic acid sequence encoding a biologically active protein inserted into the N1L gene of the vaccinia virus.

3. A vaccinia virus vector according to claim 2, in which the biologically active protein is selected from the group consisting of cytokines, antibodies, antibody fragments, cytokine receptors and cytokine receptor fragments.

4. A vaccinia virus vector according to claim 3, in which the biologically active protein is a cytokine.

5. A vaccinia virus vector according to claim 4, in which the cytokine is selected from the group consisting of IL-21, GM-CSF, IL-2, IL-7, IL-12, IL-15, IL-18 and IFN-α, or any combinations thereof.

6. A vaccinia virus vector according to claim 3, in which the biologically active protein is an immune checkpoint inhibitor molecule.

7. A vaccinia virus vector according to claim 6, in which the immune checkpoint inhibitor molecule is selected from the group consisting of soluble PD1, soluble PD-L1, soluble TIM-3, soluble CTLA-4, or any combinations thereof.

8. A vaccinia virus vector according to claim 6, in which the nucleic acid sequence encoding a SCR1-, SCR2-, SCR3-, and SCR4- domain deleted B5R gene (B5R SCR1-SCR2-SCR3-SCR4-) is SEQ ID NO:68.

9. A composition comprising a vaccinia virus vector according to claim 6.

10. A kit comprising a vaccinia virus vector according to claim 6 and a pharmaceutically acceptable adjuvant, diluent and/or buffer.

11. A composition comprising a vaccinia virus vector according to claim 1.

12. A kit comprising a vaccinia virus vector according to claim 1 and a pharmaceutically acceptable adjuvant, diluent and/or buffer.

13. A vaccinia virus vector according to claim 1, wherein the nucleic acid sequence encoding a SCR1-, SCR2-, SCR3-, and SCR4- domain deleted B5R gene (B5R SCR1-SCR2-SCR3-SCR4) has at least 95% sequence identity with the nucleic acid sequence of SEQ ID NO:68.

* * * * *

SEQUENCE LISTING

<160> NUMBER OF SEQ ID NOS: 72

<210> SEQ ID NO 1
<211> LENGTH: 95
<212> TYPE: DNA
<213> ORGANISM: Artificial
<220> FEATURE:
<223> OTHER INFORMATION: forward primer

<400> SEQUENCE: 1
agatctaaaa attgaaaata aatacaaagg ttcttgaggg ttgtgttaaa ttgaaagcga    60
gaaataatca taaatagcta ccggactcag atcca                              95

<210> SEQ ID NO 2
<211> LENGTH: 110
<212> TYPE: DNA
<213> ORGANISM: Artificial
<220> FEATURE:
<223> OTHER INFORMATION: reverse primer

<400> SEQUENCE: 2
acgcgtcccg ggaagcttta tttatgatta tttctcgctt tcaatttaac acaaccctca    60
agaacctttg tatttatttt caatttttcg ccttaagata cattgatgag              110

<210> SEQ ID NO 3
<211> LENGTH: 29
<212> TYPE: DNA
<213> ORGANISM: Artificial
<220> FEATURE:
<223> OTHER INFORMATION: forward primer

<400> SEQUENCE: 3
aagcttaaat aaaaatgaaa acgatttcc                                     29

<210> SEQ ID NO 4
<211> LENGTH: 47
<212> TYPE: DNA
<213> ORGANISM: Artificial
<220> FEATURE:
<223> OTHER INFORMATION: reverse primer

<400> SEQUENCE: 4
cccggggaat tcagatcttt ttatttatga gcgttaaaaa tagtata                 47

<210> SEQ ID NO 5
<211> LENGTH: 19
<212> TYPE: DNA
<213> ORGANISM: Artificial
<220> FEATURE:
<223> OTHER INFORMATION: forward primer

<400> SEQUENCE: 5
tatactgcgt gtatgaccg                                                19

<210> SEQ ID NO 6
<211> LENGTH: 47
<212> TYPE: DNA
<213> ORGANISM: Artificial
<220> FEATURE:
<223> OTHER INFORMATION: reverse primer

<400> SEQUENCE: 6
cccggggaat tcagatcttt ttatttatga gcgttaaaaa tagtata         47

<210> SEQ ID NO 7
<211> LENGTH: 19
<212> TYPE: DNA
<213> ORGANISM: Artificial
<220> FEATURE:
<223> OTHER INFORMATION: forward primer

<400> SEQUENCE: 7
tatactgcgt gtatgaccg         19

<210> SEQ ID NO 8
<211> LENGTH: 37
<212> TYPE: DNA
<213> ORGANISM: Artificial
<220> FEATURE:
<223> OTHER INFORMATION: reverse primer

<400> SEQUENCE: 8
ctcgaggaat tcaagcttgc atggattttc gtatttc         37

<210> SEQ ID NO 9
<211> LENGTH: 27
<212> TYPE: DNA
<213> ORGANISM: Artificial
<220> FEATURE:
<223> OTHER INFORMATION: forward primer

<400> SEQUENCE: 9
aagctttgtg tacgaactaa cgaaaaa         27

<210> SEQ ID NO 10
<211> LENGTH: 25
<212> TYPE: DNA
<213> ORGANISM: Artificial
<220> FEATURE:
<223> OTHER INFORMATION: reverse primer

<400> SEQUENCE: 10
agatcttcac ggtagcaatt tatgg         25

<210> SEQ ID NO 11
<211> LENGTH: 78
<212> TYPE: DNA
<213> ORGANISM: Artificial
<220> FEATURE:
<223> OTHER INFORMATION: forward primer

<400> SEQUENCE: 11
agatctaaaa attgaaaata aatacaaagg ttcttgaggg ttgtgttaaa ttgaaagcga         60
gaaataatca taaatagc         78

<210> SEQ ID NO 12
<211> LENGTH: 28
<212> TYPE: DNA

```
<213> ORGANISM: Artificial
<220> FEATURE:
<223> OTHER INFORMATION: reverse primer

<400> SEQUENCE: 12
acgcgtcgcc ttaagataca ttgatgag                                          28

<210> SEQ ID NO 13
<211> LENGTH: 27
<212> TYPE: DNA
<213> ORGANISM: Artificial
<220> FEATURE:
<223> OTHER INFORMATION: forward primer

<400> SEQUENCE: 13
acgcgtctac cgtgaatata aatccgt                                           27

<210> SEQ ID NO 14
<211> LENGTH: 27
<212> TYPE: DNA
<213> ORGANISM: Artificial
<220> FEATURE:
<223> OTHER INFORMATION: reverse primer

<400> SEQUENCE: 14
ctcgagggat gtatatacca tcgtcgt                                           27

<210> SEQ ID NO 15
<211> LENGTH: 32
<212> TYPE: DNA
<213> ORGANISM: Artificial
<220> FEATURE:
<223> OTHER INFORMATION: forward primer

<400> SEQUENCE: 15
ttaattaaaa ataaaaatga aaacgatttc cg                                     32

<210> SEQ ID NO 16
<211> LENGTH: 33
<212> TYPE: DNA
<213> ORGANISM: Artificial
<220> FEATURE:
<223> OTHER INFORMATION: reverse primer

<400> SEQUENCE: 16
gctagcgaat tcaagctttg aataaacaac agc                                    33

<210> SEQ ID NO 17
<211> LENGTH: 27
<212> TYPE: DNA
<213> ORGANISM: Artificial
<220> FEATURE:
<223> OTHER INFORMATION: forward primer

<400> SEQUENCE: 17
aagctttgtg tacgaactaa cgaaaaa                                           27

<210> SEQ ID NO 18
<211> LENGTH: 29
<212> TYPE: DNA
<213> ORGANISM: Artificial
<220> FEATURE:
<223> OTHER INFORMATION: reverse primer

<400> SEQUENCE: 18
gctagctcac ggtagcaatt tatggaact                                         29
```

```
<210> SEQ ID NO 19
<211> LENGTH: 24
<212> TYPE: DNA
<213> ORGANISM: Artificial
<220> FEATURE:
<223> OTHER INFORMATION: forward primer

<400> SEQUENCE: 19
aaataaaaat gaaaacgatt tccg                                              24

<210> SEQ ID NO 20
<211> LENGTH: 21
<212> TYPE: DNA
<213> ORGANISM: Artificial
<220> FEATURE:
<223> OTHER INFORMATION: reverse primer

<400> SEQUENCE: 20
ggatgtatat accatcgtcg t                                                 21

<210> SEQ ID NO 21
<211> LENGTH: 21
<212> TYPE: DNA
<213> ORGANISM: Artificial
<220> FEATURE:
<223> OTHER INFORMATION: forward primer

<400> SEQUENCE: 21
ttggctatta aacagtatgg a                                                 21

<210> SEQ ID NO 22
<211> LENGTH: 18
<212> TYPE: DNA
<213> ORGANISM: Artificial
<220> FEATURE:
<223> OTHER INFORMATION: reverse primer

<400> SEQUENCE: 22
ggatcccgat aacaaatg                                                     18

<210> SEQ ID NO 23
<211> LENGTH: 18
<212> TYPE: DNA
<213> ORGANISM: Artificial
<220> FEATURE:
<223> OTHER INFORMATION: forward primer

<400> SEQUENCE: 23
tatctagcaa tggaccgt                                                     18

<210> SEQ ID NO 24
<211> LENGTH: 19
<212> TYPE: DNA
<213> ORGANISM: Artificial
<220> FEATURE:
<223> OTHER INFORMATION: reverse primer

<400> SEQUENCE: 24
ccgaaggtag tagcatgga                                                    19

<210> SEQ ID NO 25
<211> LENGTH: 21
<212> TYPE: DNA
<213> ORGANISM: Artificial
<220> FEATURE:
```

<223> OTHER INFORMATION: forward primer

<400> SEQUENCE: 25
ttggctatta aacagtatgg a         21

<210> SEQ ID NO 26
<211> LENGTH: 18
<212> TYPE: DNA
<213> ORGANISM: Artificial
<220> FEATURE:
<223> OTHER INFORMATION: reverse primer

<400> SEQUENCE: 26
ggatcccgat aacaaatg         18

<210> SEQ ID NO 27
<211> LENGTH: 20
<212> TYPE: PRT
<213> ORGANISM: Artificial
<220> FEATURE:
<223> OTHER INFORMATION: signal peptide of B5R-S-STC (amino acid
      residues 1-19)

<400> SEQUENCE: 27

Met Lys Thr Ile Ser Val Val Thr Leu Leu Cys Val Leu Pro Ala Val
1               5                   10                  15

Val Tyr Ser Thr
            20

<210> SEQ ID NO 28
<211> LENGTH: 57
<212> TYPE: DNA
<213> ORGANISM: Artificial
<220> FEATURE:
<223> OTHER INFORMATION: signal peptide of B5R-S-STC

<400> SEQUENCE: 28
atgaaaacga tttccgttgt tacgttgtta tgcgtactac ctgctgttgt ttattca         57

<210> SEQ ID NO 29
<211> LENGTH: 52
<212> TYPE: PRT
<213> ORGANISM: Artificial
<220> FEATURE:
<223> OTHER INFORMATION: SCR1 domain of B5R-S-STC (amino acids 20-72)

<400> SEQUENCE: 29

Thr Cys Thr Val Pro Thr Met Asn Asn Ala Lys Leu Thr Ser Thr Glu
1               5                   10                  15

Thr Ser Phe Asn Asp Lys Gln Lys Val Thr Phe Thr Cys Asp Gln Gly
            20                  25                  30

Tyr His Ser Ser Asp Pro Asn Ala Val Cys Glu Thr Asp Lys Trp Lys
        35                  40                  45

Tyr Glu Asn Pro
    50

<210> SEQ ID NO 30
<211> LENGTH: 153
<212> TYPE: DNA
<213> ORGANISM: Artificial
<220> FEATURE:
<223> OTHER INFORMATION: SCR1 domain of B5R-S-STC

<400> SEQUENCE: 30

```
acaactgtac ccactatgaa taacgctaaa ttaacgtcta ccgaaacatc gtttaatgat     60
aaacagaaag ttacatttac atgtgatcag ggatatcatt cttcggatcc aaatgctgtc    120
tgcgaaacag ataaatggaa atacgaaaat cca                                 153
```

<210> SEQ ID NO 31
<211> LENGTH: 39
<212> TYPE: PRT
<213> ORGANISM: Artificial
<220> FEATURE:
<223> OTHER INFORMATION: STALK domain of B5R-S-STC (amino acids 237-275)

<400> SEQUENCE: 31

```
Cys Val Arg Thr Asn Glu Lys Phe Asp Pro Val Asp Asp Gly Pro Asp
1               5                   10                  15

Asp Glu Thr Asp Leu Ser Lys Leu Ser Lys Asp Val Val Gln Tyr Glu
            20                  25                  30

Gln Glu Ile Glu Ser Leu Glu
        35
```

<210> SEQ ID NO 32
<211> LENGTH: 117
<212> TYPE: DNA
<213> ORGANISM: Artificial
<220> FEATURE:
<223> OTHER INFORMATION: STALK domain of B5R-S-STC

<400> SEQUENCE: 32

```
tgtgtacgaa ctaacgaaaa atttgatcca gtggatgatg gtcccgacga tgagacagat     60
ttgagcaaac tctcgaaaga cgttgtacaa tatgaacaag aaatagaatc gttagaa       117
```

<210> SEQ ID NO 33
<211> LENGTH: 19
<212> TYPE: PRT
<213> ORGANISM: Artificial
<220> FEATURE:
<223> OTHER INFORMATION: transmembrane domain of B5R-S-STC (amino acids 276-303)

<400> SEQUENCE: 33

```
Ala Thr Tyr His Ile Ile Ile Val Ala Leu Thr Ile Met Gly Val Ile
1               5                   10                  15

Phe Leu Ile
```

<210> SEQ ID NO 34
<211> LENGTH: 57
<212> TYPE: DNA
<213> ORGANISM: Artificial
<220> FEATURE:
<223> OTHER INFORMATION: transmembrane domain of B5R-S-STC

<400> SEQUENCE: 34

```
gcaacttatc atataatcat agtggcgttg acaattatgg gcgtcatatt tttaatc        57
```

<210> SEQ ID NO 35
<211> LENGTH: 23
<212> TYPE: PRT
<213> ORGANISM: Artificial
<220> FEATURE:
<223> OTHER INFORMATION: C terminal domain of B5R-S-STC (amino acids 304-317)

<400> SEQUENCE: 35

```
Ser Val Ile Val Leu Val Cys Ser Cys Asp Lys Asn Asn Asp Gln Tyr
```

```
1               5                   10                  15
Lys Phe His Lys Leu Leu Pro
            20
```

<210> SEQ ID NO 36
<211> LENGTH: 72
<212> TYPE: DNA
<213> ORGANISM: Artificial
<220> FEATURE:
<223> OTHER INFORMATION: C terminal domain of B5R-S-STC

<400> SEQUENCE: 36

```
tccgttatag tattagtttg ttcctgtgac aaaaataatg accaatataa gttccataaa    60
ttgctaccgt ga                                                        72
```

<210> SEQ ID NO 37
<211> LENGTH: 70
<212> TYPE: DNA
<213> ORGANISM: Artificial
<220> FEATURE:
<223> OTHER INFORMATION: H5 promoter of B5R-S-STC

<400> SEQUENCE: 37

```
aaaaattgaa aataaataca aaggttcttg agggttgtgt taaattgaaa gcgagaaata    60
atcataaata                                                           70
```

<210> SEQ ID NO 38
<211> LENGTH: 225
<212> TYPE: PRT
<213> ORGANISM: Artificial
<220> FEATURE:
<223> OTHER INFORMATION: Red Fluorescent Protein (RFP) of B5R-S-STC
      (amino acids 1-255)

<400> SEQUENCE: 38

```
Met Ala Ser Ser Glu Asn Val Ile Thr Glu Phe Met Arg Phe Lys Val
1               5                   10                  15

Arg Met Glu Gly Thr Val Asn Gly His Glu Phe Glu Ile Glu Gly Glu
            20                  25                  30

Gly Glu Gly Arg Pro Tyr Glu Gly His Asn Thr Val Lys Leu Lys Val
        35                  40                  45

Thr Lys Gly Gly Pro Leu Pro Phe Ala Trp Asp Ile Leu Ser Pro Gln
    50                  55                  60

Phe Gln Tyr Gly Ser Lys Val Tyr Val Lys His Pro Ala Asp Ile Pro
65                  70                  75                  80

Asp Tyr Lys Lys Leu Ser Phe Pro Glu Gly Phe Lys Trp Glu Arg Val
                85                  90                  95

Met Asn Phe Glu Asp Gly Gly Val Ala Thr Val Thr Gln Asp Ser Ser
            100                 105                 110

Leu Gln Asp Gly Cys Phe Ile Tyr Lys Val Lys Phe Ile Gly Val Asn
        115                 120                 125

Phe Pro Ser Asp Gly Pro Val Met Gln Lys Lys Thr Met Gly Trp Glu
    130                 135                 140

Ala Ser Thr Glu Arg Leu Tyr Pro Arg Asp Gly Val Leu Lys Gly Glu
145                 150                 155                 160

Thr His Lys Ala Leu Lys Leu Lys Asp Gly Gly His Tyr Leu Val Glu
                165                 170                 175

Phe Lys Ser Ile Tyr Met Ala Lys Lys Pro Val Gln Leu Pro Gly Tyr
            180                 185                 190
```

Tyr Tyr Val Asp Ala Lys Leu Asp Ile Thr Ser His Asn Glu Asp Tyr
        195                 200                 205

Thr Ile Val Glu Gln Tyr Glu Arg Thr Glu Gly Arg His His Leu Phe
    210                 215                 220

Leu
225

<210> SEQ ID NO 39
<211> LENGTH: 678
<212> TYPE: DNA
<213> ORGANISM: Artificial
<220> FEATURE:
<223> OTHER INFORMATION: nucleic acid sequence of Red Fluorescent
      Protein (RFP) of B5R-S-STC

<400> SEQUENCE: 39
atggcctcct ccgagaacgt catcaccgag ttcatgcgct tcaaggtgcg catggagggc    60
accgtgaacg gccacgagtt cgagatcgag ggcgagggcg agggccgccc ctacgagggc   120
cacaacaccg tgaagctgaa ggtgaccaag ggcggccccc tgcccttcgc ctgggacatc   180
ctgtcccccc agttccagta cggctccaag gtgtacgtga agcaccccgc cgacatcccc   240
gactacaaga agctgtcctt ccccgagggc ttcaagtggg agcgcgtgat gaacttcgag   300
gacggcggcg tggcgaccgt gacccaggac tcctccctgc aggacggctg cttcatctac   360
aaggtgaagt tcatcggcgt gaacttcccc tccgacggcc ccgtgatgca gaagaagacc   420
atgggctggg aggcctccac cgagcgcctg taccccgcg acggcgtgct gaagggcgag   480
acccacaagg ccctgaagct gaaggacggc ggccactacc tggtggagtt caagtccatc   540
tacatggcca agaagcccgt gcagctgccc ggctactact acgtggacgc caagctggac   600
atcacctccc acaacgagga ctacaccatc gtggagcagt acgagcgcac cgagggccgc   660
caccacctgt cctgtag                                                  678

<210> SEQ ID NO 40
<211> LENGTH: 153
<212> TYPE: PRT
<213> ORGANISM: Artificial
<220> FEATURE:
<223> OTHER INFORMATION: SP(aa 1-19)-SCR1(aa 20-72)-STALK(aa 237-275)-
      TM(aa 276-303)-CT(aa 304-317)

<400> SEQUENCE: 40

Met Lys Thr Ile Ser Val Val Thr Leu Leu Cys Val Leu Pro Ala Val
1               5                   10                  15

Val Tyr Ser Thr Thr Cys Thr Val Pro Thr Met Asn Asn Ala Lys Leu
            20                  25                  30

Thr Ser Thr Glu Thr Ser Phe Asn Asp Lys Gln Lys Val Thr Phe Thr
        35                  40                  45

Cys Asp Gln Gly Tyr His Ser Ser Asp Pro Asn Ala Val Cys Glu Thr
    50                  55                  60

Asp Lys Trp Lys Tyr Glu Asn Pro Cys Val Arg Thr Asn Glu Lys Phe
65                  70                  75                  80

Asp Pro Val Asp Asp Gly Pro Asp Asp Glu Thr Asp Leu Ser Lys Leu
                85                  90                  95

Ser Lys Asp Val Val Gln Tyr Glu Gln Glu Ile Glu Ser Leu Glu Ala
            100                 105                 110

Thr Tyr His Ile Ile Ile Val Ala Leu Thr Ile Met Gly Val Ile Phe
        115                 120                 125

Leu Ile Ser Val Ile Val Leu Val Cys Ser Cys Asp Lys Asn Asn Asp
            130                 135                 140

Gln Tyr Lys Phe His Lys Leu Leu Pro
145                 150

<210> SEQ ID NO 41
<211> LENGTH: 456
<212> TYPE: DNA
<213> ORGANISM: Artificial
<220> FEATURE:
<223> OTHER INFORMATION: SP(aa 1-19)-SCR1(aa 20-72)-STALK(aa 237-275)-
      TM(aa 276-303)-CT(aa 304-317)

<400> SEQUENCE: 41
atgaaaacga tttccgttgt tacgttgtta tgcgtactac ctgctgttgt ttattcaaca      60
actgtaccca ctatgaataa cgctaaatta acgtctaccg aaacatcgtt taatgataaa    120
cagaaagtta catttacatg tgatcaggga tatcattctt cggatccaaa tgctgtctgc    180
gaaacagata aatggaaata cgaaaatcca tgtgtacgaa ctaacgaaaa atttgatcca    240
gtggatgatg gtcccgacga tgagacagat ttgagcaaac tctcgaaaga cgttgtacaa    300
tatgaacaag aaatagaatc gttagaagca acttatcata taatcatagt ggcgttgaca    360
attatgggcg tcatattttt aatctccgtt atagtattag tttgttcctg tgacaaaaat    420
aatgaccaat ataagttcca taaattgcta ccgtga                              456

<210> SEQ ID NO 42
<211> LENGTH: 70
<212> TYPE: DNA
<213> ORGANISM: Artificial
<220> FEATURE:
<223> OTHER INFORMATION: H5 promoter of B5R-STC

<400> SEQUENCE: 42
aaaaattgaa aataaataca aaggttcttg agggttgtgt taaattgaaa gcgagaaata     60
atcataaata                                                           70

<210> SEQ ID NO 43
<211> LENGTH: 225
<212> TYPE: PRT
<213> ORGANISM: Artificial
<220> FEATURE:
<223> OTHER INFORMATION: Red Fluorescent Protein (RFP) of B5R-STC (amino
      acids 1-225)

<400> SEQUENCE: 43

Met Ala Ser Ser Glu Asn Val Ile Thr Glu Phe Met Arg Phe Lys Val
1               5                   10                  15

Arg Met Glu Gly Thr Val Asn Gly His Glu Phe Glu Ile Glu Gly Glu
            20                  25                  30

Gly Glu Gly Arg Pro Tyr Glu Gly His Asn Thr Val Lys Leu Lys Val
        35                  40                  45

Thr Lys Gly Gly Pro Leu Pro Phe Ala Trp Asp Ile Leu Ser Pro Gln
    50                  55                  60

Phe Gln Tyr Gly Ser Lys Val Tyr Val Lys His Pro Ala Asp Ile Pro
65                  70                  75                  80

Asp Tyr Lys Lys Leu Ser Phe Pro Glu Gly Phe Lys Trp Glu Arg Val
                85                  90                  95

Met Asn Phe Glu Asp Gly Gly Val Ala Thr Val Thr Gln Asp Ser Ser
            100                 105                 110

Leu Gln Asp Gly Cys Phe Ile Tyr Lys Val Lys Phe Ile Gly Val Asn
    115                 120                 125

Phe Pro Ser Asp Gly Pro Val Met Gln Lys Lys Thr Met Gly Trp Glu
    130                 135                 140

Ala Ser Thr Glu Arg Leu Tyr Pro Arg Asp Gly Val Leu Lys Gly Glu
145                 150                 155                 160

Thr His Lys Ala Leu Lys Leu Lys Asp Gly Gly His Tyr Leu Val Glu
                165                 170                 175

Phe Lys Ser Ile Tyr Met Ala Lys Lys Pro Val Gln Leu Pro Gly Tyr
            180                 185                 190

Tyr Tyr Val Asp Ala Lys Leu Asp Ile Thr Ser His Asn Glu Asp Tyr
            195                 200                 205

Thr Ile Val Glu Gln Tyr Glu Arg Thr Glu Gly Arg His His Leu Phe
    210                 215                 220

Leu
225

<210> SEQ ID NO 44
<211> LENGTH: 678
<212> TYPE: DNA
<213> ORGANISM: Artificial
<220> FEATURE:
<223> OTHER INFORMATION: Red Fluorescent Protein (RFP) of B5R-STC

<400> SEQUENCE: 44
atggcctcct ccgagaacgt catcaccgag ttcatgcgct tcaaggtgcg catggagggc    60
accgtgaacg gccacgagtt cgagatcgag ggcgagggcg agggccgccc ctacgagggc   120
cacaacaccg tgaagctgaa ggtgaccaag ggcggccccc tgcccttcgc ctgggacatc   180 ctgtccccc agttccagta cggctccaag gtgtacgtga agcaccccgc cgacatcccc   240
gactacaaga agctgtcctt ccccgagggc ttcaagtggg agcgcgtgat gaacttcgag   300
gacggcggcg tggcgaccgt gacccaggac tcctccctgc aggacggctg cttcatctac   360
aaggtgaagt tcatcggcgt gaacttcccc tccgacggcc ccgtgatgca gaagaagacc   420
atgggctggg aggcctccac cgagcgcctg taccccgcg acggcgtgct gaagggcgag   480
acccacaagg ccctgaagct gaaggacggc ggccactacc tggtggagtt caagtccatc   540
tacatggcca agaagcccgt gcagctgccc ggctactact acgtggacgc caagctggac   600
atcacctccc acaacgagga ctacaccatc gtggagcagt acgagcgcac cgagggccgc   660
caccacctgt tcctgtag                                                  678

<210> SEQ ID NO 45
<211> LENGTH: 70
<212> TYPE: DNA
<213> ORGANISM: Artificial
<220> FEATURE:
<223> OTHER INFORMATION: H5 promoter

<400> SEQUENCE: 45
aaaaattgaa ataaataca aaggttcttg agggttgtgt taaattgaaa gcgagaaata    60
atcataaata                                                           70

<210> SEQ ID NO 46
<211> LENGTH: 20
<212> TYPE: PRT
<213> ORGANISM: Artificial
<220> FEATURE:

-continued

<223> OTHER INFORMATION: signal peptide of B5R-STC (amino acids 1-19)

<400> SEQUENCE: 46

Met Lys Thr Ile Ser Val Val Thr Leu Leu Cys Val Leu Pro Ala Val
1               5                   10                  15

Val Tyr Ser Thr
            20

<210> SEQ ID NO 47
<211> LENGTH: 57
<212> TYPE: DNA
<213> ORGANISM: Artificial
<220> FEATURE:
<223> OTHER INFORMATION: signal peptide of B5R-STC

<400> SEQUENCE: 47
atgaaaacga tttccgttgt tacgttgtta tgcgtactac ctgctgttgt ttattca 57

<210> SEQ ID NO 48
<211> LENGTH: 39
<212> TYPE: PRT
<213> ORGANISM: Artificial
<220> FEATURE:
<223> OTHER INFORMATION: STALK of B5R-STC (amino acids 237-275)

<400> SEQUENCE: 48

Cys Val Arg Thr Asn Glu Lys Phe Asp Pro Val Asp Asp Gly Pro Asp
1 5 10 15

Asp Glu Thr Asp Leu Ser Lys Leu Ser Lys Asp Val Val Gln Tyr Glu
20 25 30

Gln Glu Ile Glu Ser Leu Glu
35

<210> SEQ ID NO 49
<211> LENGTH: 117
<212> TYPE: DNA
<213> ORGANISM: Artificial
<220> FEATURE:
<223> OTHER INFORMATION: STALK of B5R-STC

<400> SEQUENCE: 49
tgtgtacgaa ctaacgaaaa atttgatcca gtggatgatg gtcccgacga tgagacagat 60
ttgagcaaac tctcgaaaga cgttgtacaa tatgaacaag aaatagaatc gttagaa 117

<210> SEQ ID NO 50
<211> LENGTH: 19
<212> TYPE: PRT
<213> ORGANISM: Artificial
<220> FEATURE:
<223> OTHER INFORMATION: transmembrane domain of B5R-STC (amino acids 276-303)

<400> SEQUENCE: 50

Ala Thr Tyr His Ile Ile Ile Val Ala Leu Thr Ile Met Gly Val Ile
1 5 10 15

Phe Leu Ile

<210> SEQ ID NO 51
<211> LENGTH: 57
<212> TYPE: DNA
<213> ORGANISM: Artificial
<220> FEATURE:
<223> OTHER INFORMATION: transmembrane domain of B5R-STC

<400> SEQUENCE: 51
gcaacttatc atataatcat agtggcgttg acaattatgg gcgtcatatt tttaatc    57

<210> SEQ ID NO 52
<211> LENGTH: 23
<212> TYPE: PRT
<213> ORGANISM: Artificial
<220> FEATURE:
<223> OTHER INFORMATION: C terminal domain of B5R-STC (amino acids 304-
      317)

<400> SEQUENCE: 52

Ser Val Ile Val Leu Val Cys Ser Cys Asp Lys Asn Asn Asp Gln Tyr
1               5                   10                  15

Lys Phe His Lys Leu Leu Pro
            20

<210> SEQ ID NO 53
<211> LENGTH: 72
<212> TYPE: DNA
<213> ORGANISM: Artificial
<220> FEATURE:
<223> OTHER INFORMATION: C terminal domain of B5R-STC

<400> SEQUENCE: 53
tccgttatag tattagtttg ttcctgtgac aaaaataatg accaatataa gttccataaa    60
ttgctaccgt ga    72

<210> SEQ ID NO 54
<211> LENGTH: 31
<212> TYPE: DNA
<213> ORGANISM: Artificial
<220> FEATURE:
<223> OTHER INFORMATION: Loxp elements of TK-STC

<400> SEQUENCE: 54
acttcgtata gcatacatta tacgaagtta t    31

<210> SEQ ID NO 55
<211> LENGTH: 70
<212> TYPE: DNA
<213> ORGANISM: Artificial
<220> FEATURE:
<223> OTHER INFORMATION: H5 promoter of TK-STC

<400> SEQUENCE: 55
aaaaattgaa aataaataca aaggttcttg agggttgtgt taaattgaaa gcgagaaata    60
atcataaata    70

<210> SEQ ID NO 56
<211> LENGTH: 225
<212> TYPE: PRT
<213> ORGANISM: Artificial
<220> FEATURE:
<223> OTHER INFORMATION: Red Fluorescent Protein (RFP) of TK-STC (amino
      acids 1-225)

<400> SEQUENCE: 56

Met Ala Ser Ser Glu Asn Val Ile Thr Glu Phe Met Arg Phe Lys Val
1               5                   10                  15

Arg Met Glu Gly Thr Val Asn Gly His Glu Phe Glu Ile Glu Gly Glu
            20                  25                  30

Gly Glu Gly Arg Pro Tyr Glu Gly His Asn Thr Val Lys Leu Lys Val

```
                35                  40                  45
Thr Lys Gly Gly Pro Leu Pro Phe Ala Trp Asp Ile Leu Ser Pro Gln
 50                  55                  60

Phe Gln Tyr Gly Ser Lys Val Tyr Val Lys His Pro Ala Asp Ile Pro
65                  70                  75                  80

Asp Tyr Lys Lys Leu Ser Phe Pro Glu Gly Phe Lys Trp Glu Arg Val
                85                  90                  95

Met Asn Phe Glu Asp Gly Gly Val Ala Thr Val Thr Gln Asp Ser Ser
            100                 105                 110

Leu Gln Asp Gly Cys Phe Ile Tyr Lys Val Lys Phe Ile Gly Val Asn
        115                 120                 125

Phe Pro Ser Asp Gly Pro Val Met Gln Lys Lys Thr Met Gly Trp Glu
    130                 135                 140

Ala Ser Thr Glu Arg Leu Tyr Pro Arg Asp Gly Val Leu Lys Gly Glu
145                 150                 155                 160

Thr His Lys Ala Leu Lys Leu Lys Asp Gly Gly His Tyr Leu Val Glu
                165                 170                 175

Phe Lys Ser Ile Tyr Met Ala Lys Lys Pro Val Gln Leu Pro Gly Tyr
            180                 185                 190

Tyr Tyr Val Asp Ala Lys Leu Asp Ile Thr Ser His Asn Glu Asp Tyr
        195                 200                 205

Thr Ile Val Glu Gln Tyr Glu Arg Thr Glu Gly Arg His His Leu Phe
    210                 215                 220

Leu
225

<210> SEQ ID NO 57
<211> LENGTH: 678
<212> TYPE: DNA
<213> ORGANISM: Artificial
<220> FEATURE:
<223> OTHER INFORMATION: Red Fluorescent Protein (RFP) of TK-STC

<400> SEQUENCE: 57
atggcctcct ccgagaacgt catcaccgag ttcatgcgct tcaaggtgcg catggagggc      60
accgtgaacg gccacgagtt cgagatcgag ggcgagggcg agggccgccc ctacgagggc     120
cacaacaccg tgaagctgaa ggtgaccaag gcggcccccc tgcccttcgc ctgggacatc     180
ctgtcccccc agttccagta cggctccaag gtgtacgtga agcaccccgc cgacatcccc     240
gactacaaga agctgtcctt ccccgagggc ttcaagtggg agcgcgtgat gaacttcgag     300
gacggcggcg tggcgaccgt gacccaggac tcctccctgc aggacggctg cttcatctac     360
aaggtgaagt tcatcggcgt gaacttcccc tccgacggcc ccgtgatgca gaagaagacc     420
atgggctggg aggcctccac cgagcgcctg taccccgcg acggcgtgct gaagggcgag      480
acccacaagg ccctgaagct gaaggacggc ggccactacc tggtggagtt caagtccatc     540
tacatggcca agaagcccgt gcagctgccc ggctactact acgtggacgc caagctggac     600
atcacctccc acaacgagga ctacaccatc gtggagcagt acgagcgcac cgagggccgc     660
caccacctgt tcctgtag                                                   678

<210> SEQ ID NO 58
<211> LENGTH: 31
<212> TYPE: DNA
<213> ORGANISM: Artificial
<220> FEATURE:
<223> OTHER INFORMATION: Loxp of TK-STC
```

```
<400> SEQUENCE: 58
acttcgtata gcatacatta tacgaagtta t                                    31

<210> SEQ ID NO 59
<211> LENGTH: 70
<212> TYPE: DNA
<213> ORGANISM: Artificial
<220> FEATURE:
<223> OTHER INFORMATION: H5 promoter of TK-STC

<400> SEQUENCE: 59
aaaaattgaa aataaataca aaggttcttg agggttgtgt taaattgaaa gcgagaaata    60
atcataaata                                                           70

<210> SEQ ID NO 60
<211> LENGTH: 20
<212> TYPE: PRT
<213> ORGANISM: Artificial
<220> FEATURE:
<223> OTHER INFORMATION: signal peptide of TK-STC (amino acids 1-19)

<400> SEQUENCE: 60

Met Lys Thr Ile Ser Val Val Thr Leu Leu Cys Val Leu Pro Ala Val
1               5                   10                  15

Val Tyr Ser Thr
            20

<210> SEQ ID NO 61
<211> LENGTH: 57
<212> TYPE: DNA
<213> ORGANISM: Artificial
<220> FEATURE:
<223> OTHER INFORMATION: signal peptide of TK-STC

<400> SEQUENCE: 61
atgaaaacga tttccgttgt tacgttgtta tgcgtactac ctgctgttgt ttattca       57

<210> SEQ ID NO 62
<211> LENGTH: 39
<212> TYPE: PRT
<213> ORGANISM: Artificial
<220> FEATURE:
<223> OTHER INFORMATION: STALK domain of TK-STC (amino acids 237-275)

<400> SEQUENCE: 62

Cys Val Arg Thr Asn Glu Lys Phe Asp Pro Val Asp Asp Gly Pro Asp
1               5                   10                  15

Asp Glu Thr Asp Leu Ser Lys Leu Ser Lys Asp Val Val Gln Tyr Glu
            20                  25                  30

Gln Glu Ile Glu Ser Leu Glu
        35

<210> SEQ ID NO 63
<211> LENGTH: 117
<212> TYPE: DNA
<213> ORGANISM: Artificial
<220> FEATURE:
<223> OTHER INFORMATION: STALK domain of TK-STC

<400> SEQUENCE: 63
tgtgtacgaa ctaacgaaaa atttgatcca gtggatgatg gtcccgacga tgagacagat    60
ttgagcaaac tctcgaaaga cgttgtacaa tatgaacaag aaatagaatc gttagaa      117
```

<210> SEQ ID NO 64
<211> LENGTH: 19
<212> TYPE: PRT
<213> ORGANISM: Artificial
<220> FEATURE:
<223> OTHER INFORMATION: transmembrane domain of TK-STC (amino acids 276-303)

<400> SEQUENCE: 64

Ala Thr Tyr His Ile Ile Ile Val Ala Leu Thr Ile Met Gly Val Ile
1               5                   10                  15

Phe Leu Ile

<210> SEQ ID NO 65
<211> LENGTH: 57
<212> TYPE: DNA
<213> ORGANISM: Artificial
<220> FEATURE:
<223> OTHER INFORMATION: transmembrane domain of TK-STC

<400> SEQUENCE: 65
gcaacttatc atataatcat agtggcgttg acaattatgg gcgtcatatt tttaatc        57

<210> SEQ ID NO 66
<211> LENGTH: 23
<212> TYPE: PRT
<213> ORGANISM: Artificial
<220> FEATURE:
<223> OTHER INFORMATION: C terminal domain of TK-STC (amino acids 304-317)

<400> SEQUENCE: 66

Ser Val Ile Val Leu Val Cys Ser Cys Asp Lys Asn Asn Asp Gln Tyr
1               5                   10                  15

Lys Phe His Lys Leu Leu Pro
            20

<210> SEQ ID NO 67
<211> LENGTH: 72
<212> TYPE: DNA
<213> ORGANISM: Artificial
<220> FEATURE:
<223> OTHER INFORMATION: C terminal domain of TK-STC

<400> SEQUENCE: 67
tccgttatag tattagtttg ttcctgtgac aaaaataatg accaatataa gttccataaa     60
ttgctaccgt ga                                                        72

<210> SEQ ID NO 68
<211> LENGTH: 246
<212> TYPE: DNA
<213> ORGANISM: Artificial
<220> FEATURE:
<223> OTHER INFORMATION: STC construct

<400> SEQUENCE: 68
tgtgtacgaa ctaacgaaaa atttgatcca gtggatgatg gtcccgacga tgagacagat     60
ttgagcaaac tctcgaaaga cgttgtacaa tatgaacaag aaatagaatc gttagaagca    120
acttatcata taatcatagt ggcgttgaca attatgggcg tcatattttt aatctccgtt    180
atagtattag tttgttcctg tgacaaaaat aatgaccaat ataagttcca taaattgcta    240
ccgtga                                                              246

<210> SEQ ID NO 69
<211> LENGTH: 84
<212> TYPE: PRT
<213> ORGANISM: Artificial
<220> FEATURE:
<223> OTHER INFORMATION: STC construct

<400> SEQUENCE: 69

Cys Val Arg Thr Asn Glu Lys Phe Asp Pro Val Asp Gly Pro Asp
1               5                   10                  15

Asp Glu Thr Asp Leu Ser Lys Leu Ser Lys Asp Val Val Gln Tyr Glu
            20                  25                  30

Gln Glu Ile Glu Ser Leu Glu Ser Leu Glu Ala Thr Tyr His Ile Ile
        35                  40                  45

Ile Val Ala Leu Thr Ile Met Gly Val Ile Phe Leu Ile Ser Val Ile
    50                  55                  60

Val Leu Val Cys Ser Cys Asp Lys Asn Asn Asp Gln Tyr Lys Phe His
65                  70                  75                  80

Lys Leu Leu Pro

<210> SEQ ID NO 70
<211> LENGTH: 22
<212> TYPE: DNA
<213> ORGANISM: Artificial
<220> FEATURE:
<223> OTHER INFORMATION: forward primer

<400> SEQUENCE: 70
aaccatagaa gccaacgaat cc                                        22

<210> SEQ ID NO 71
<211> LENGTH: 24
<212> TYPE: DNA
<213> ORGANISM: Artificial
<220> FEATURE:
<223> OTHER INFORMATION: reverse primer

<400> SEQUENCE: 71
tgagacatac aagggtgg tgaagt                                      24

<210> SEQ ID NO 72
<211> LENGTH: 20
<212> TYPE: DNA
<213> ORGANISM: Artificial
<220> FEATURE:
<223> OTHER INFORMATION: probe

<400> SEQUENCE: 72
attttagaac agaaataccc                                           20